Nov. 11, 1947. A. SOWDEN 2,430,622
WEIGHING MACHINE
Filed Jan. 2, 1945 25 Sheets-Sheet 3
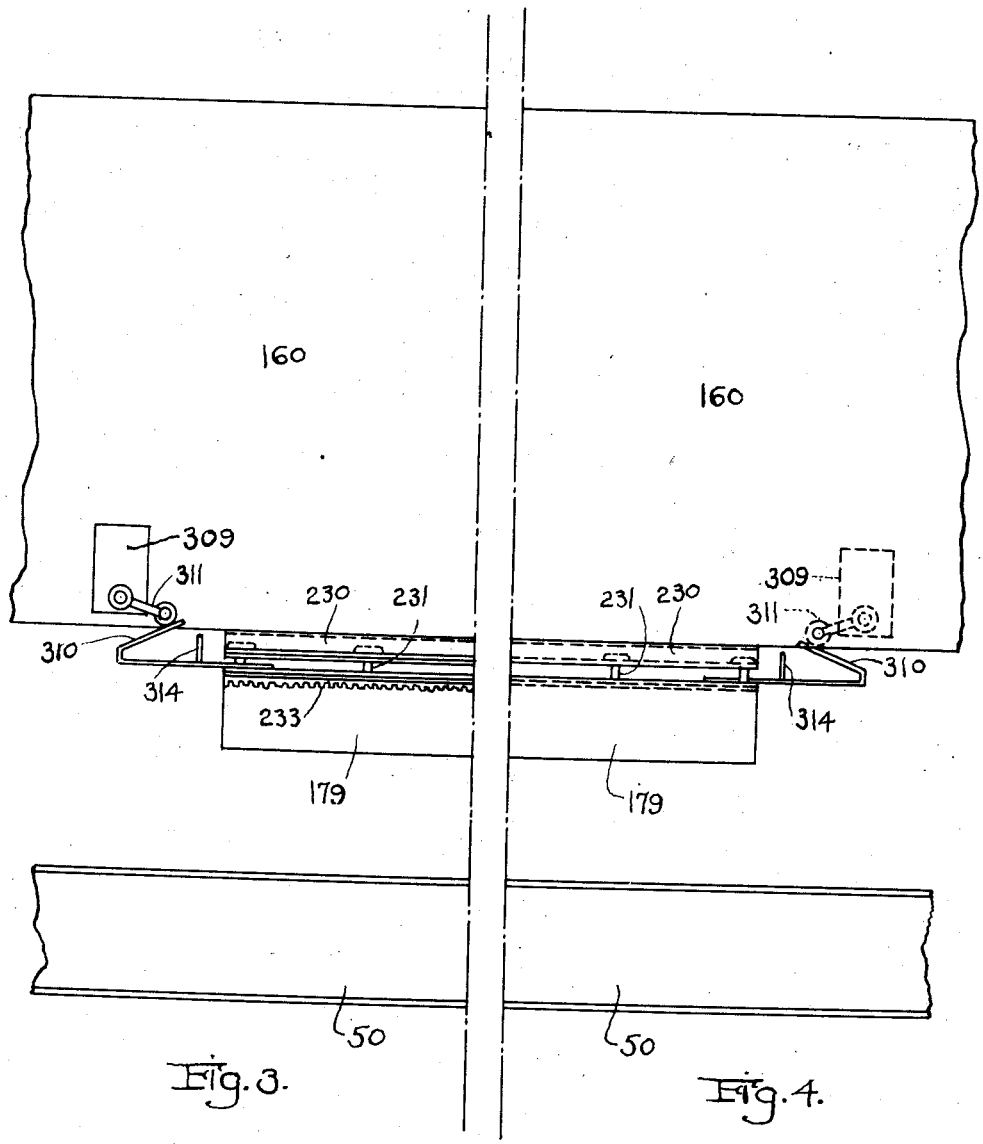

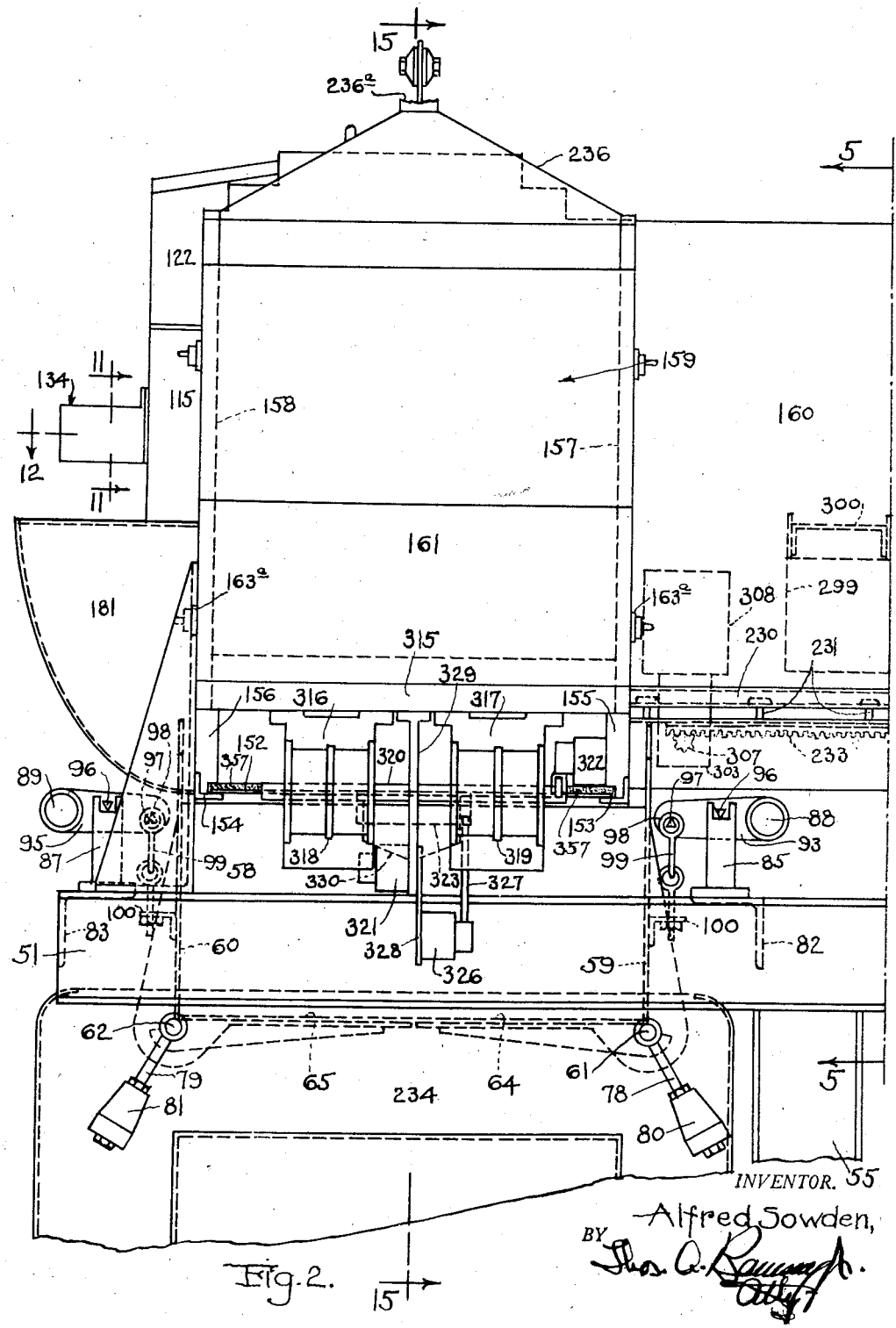

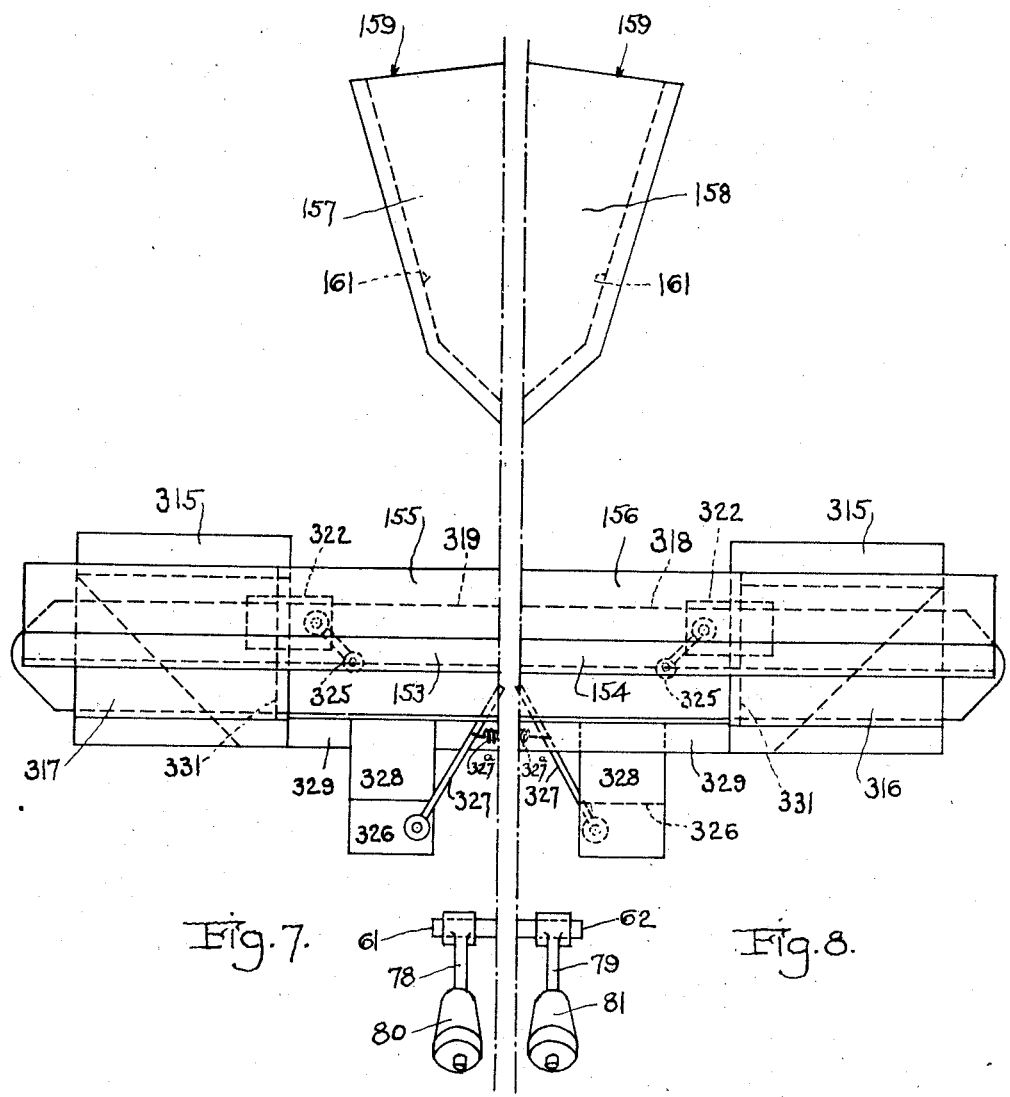

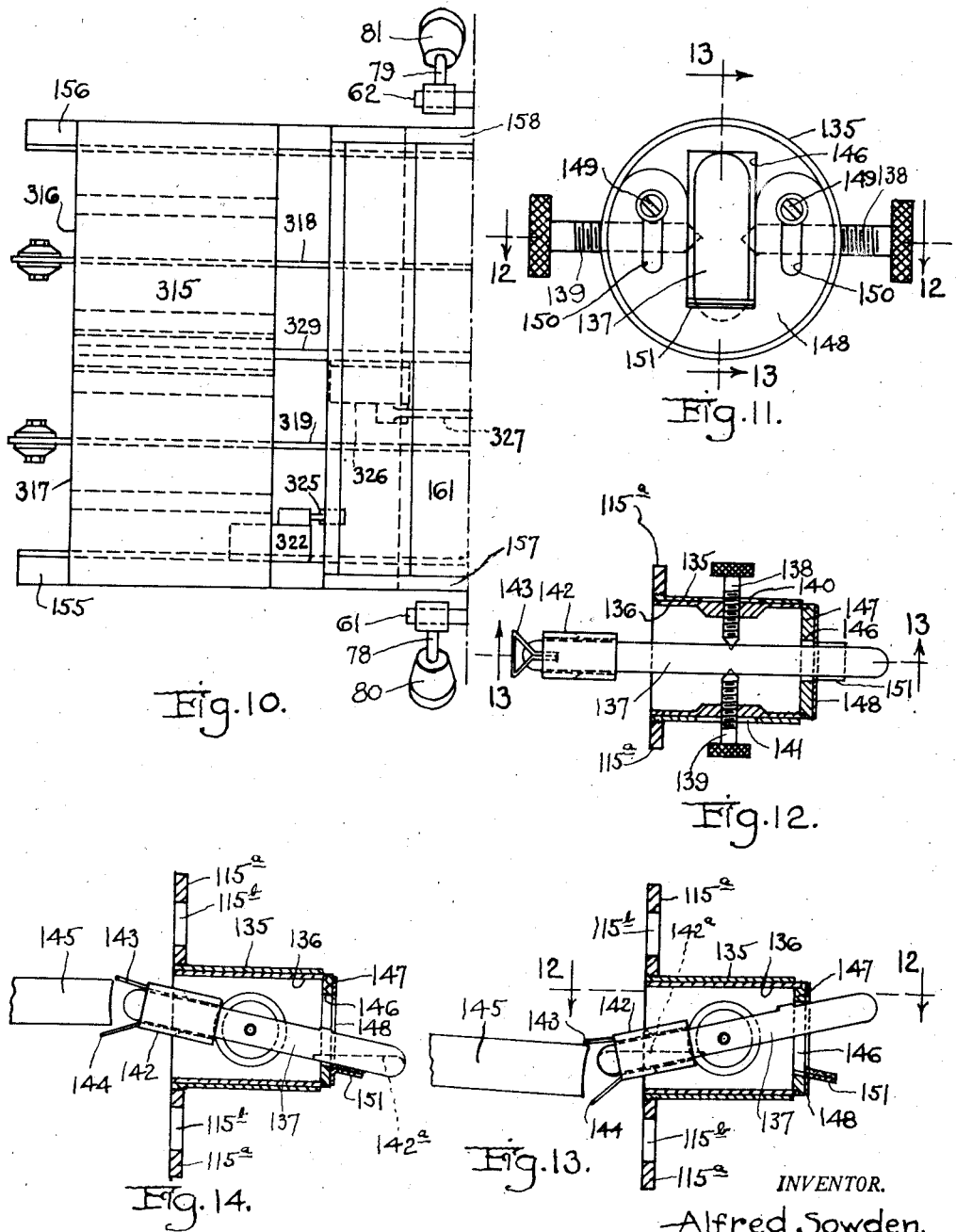

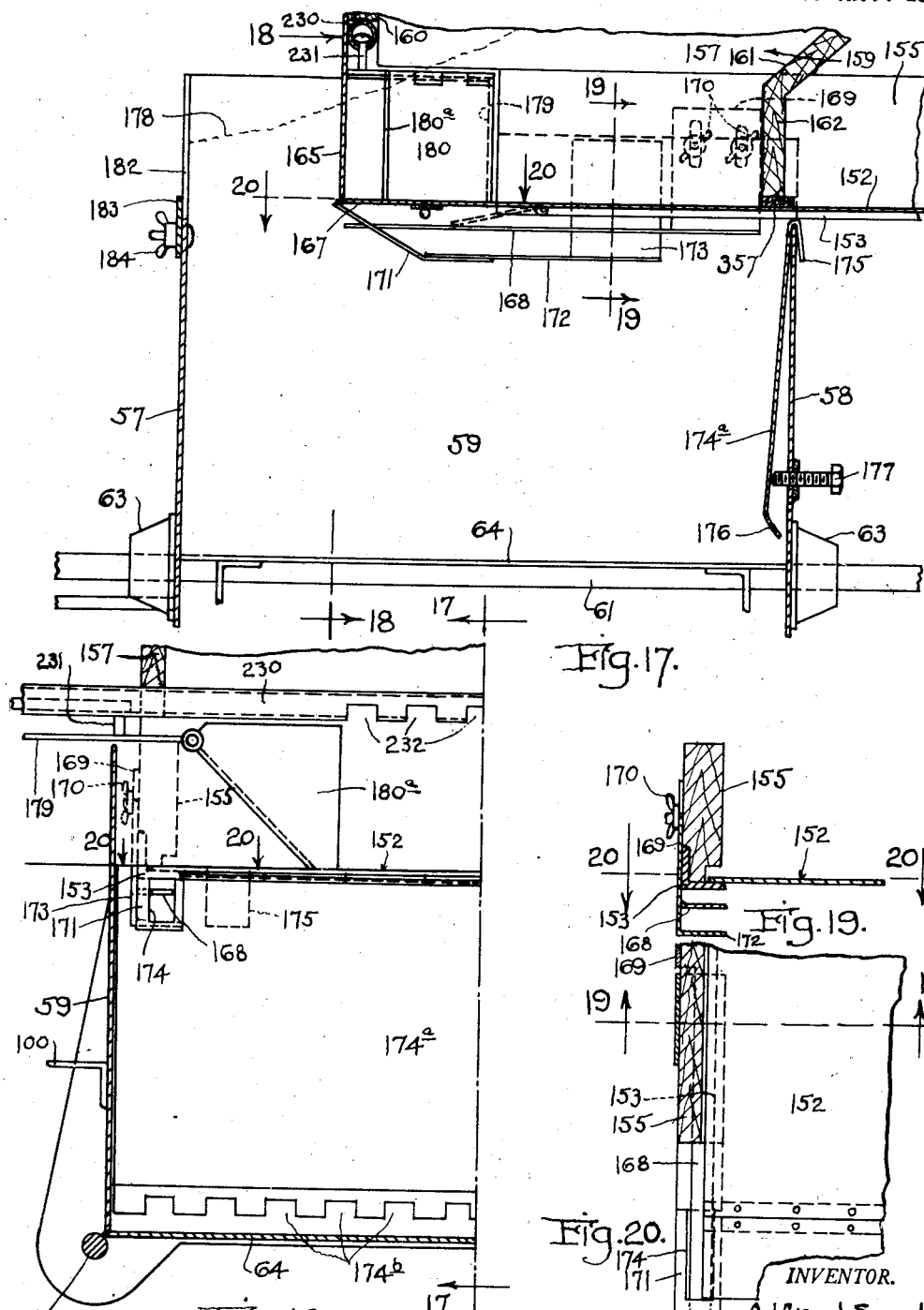

INVENTOR.
Alfred Sowden,

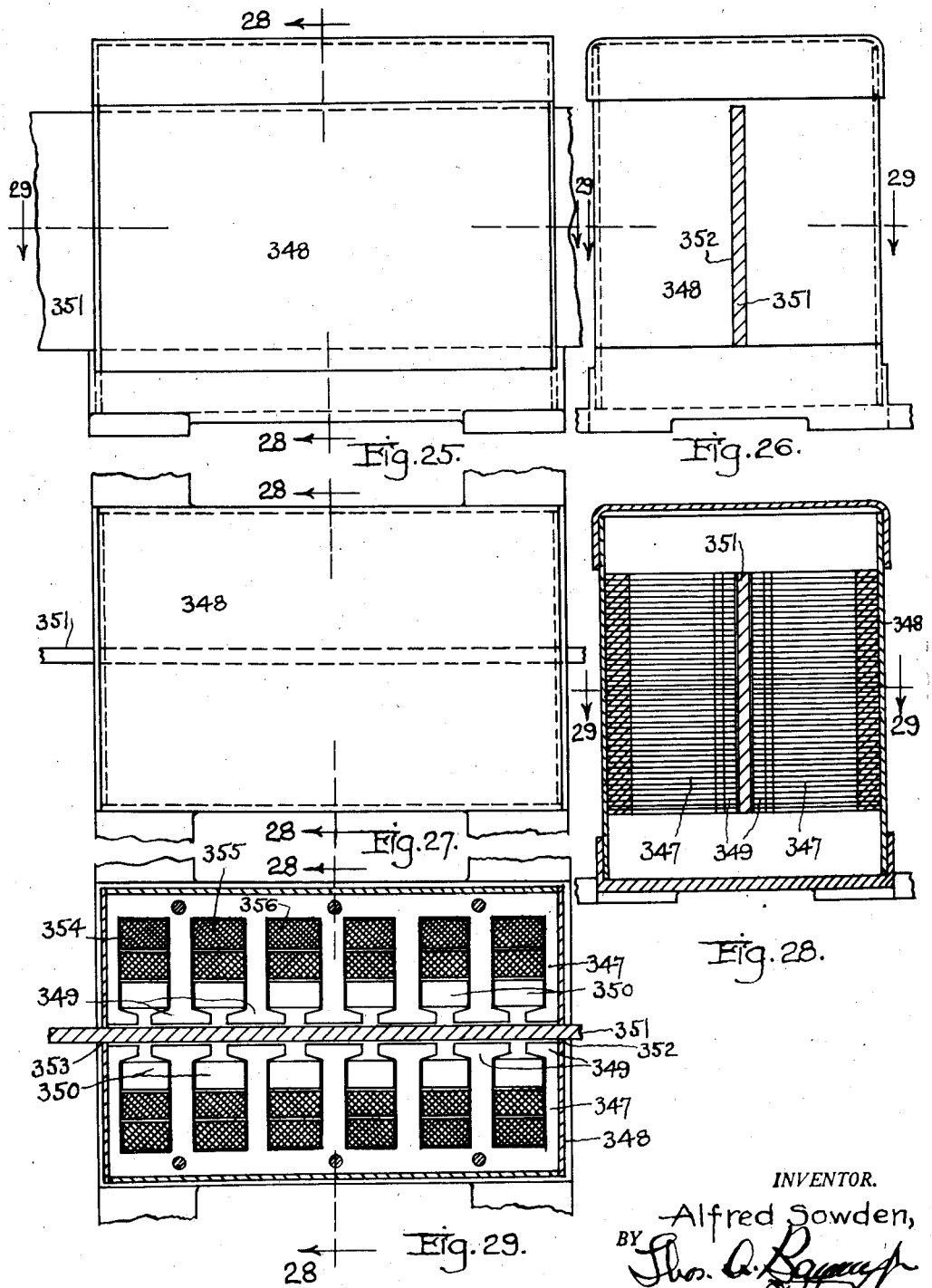

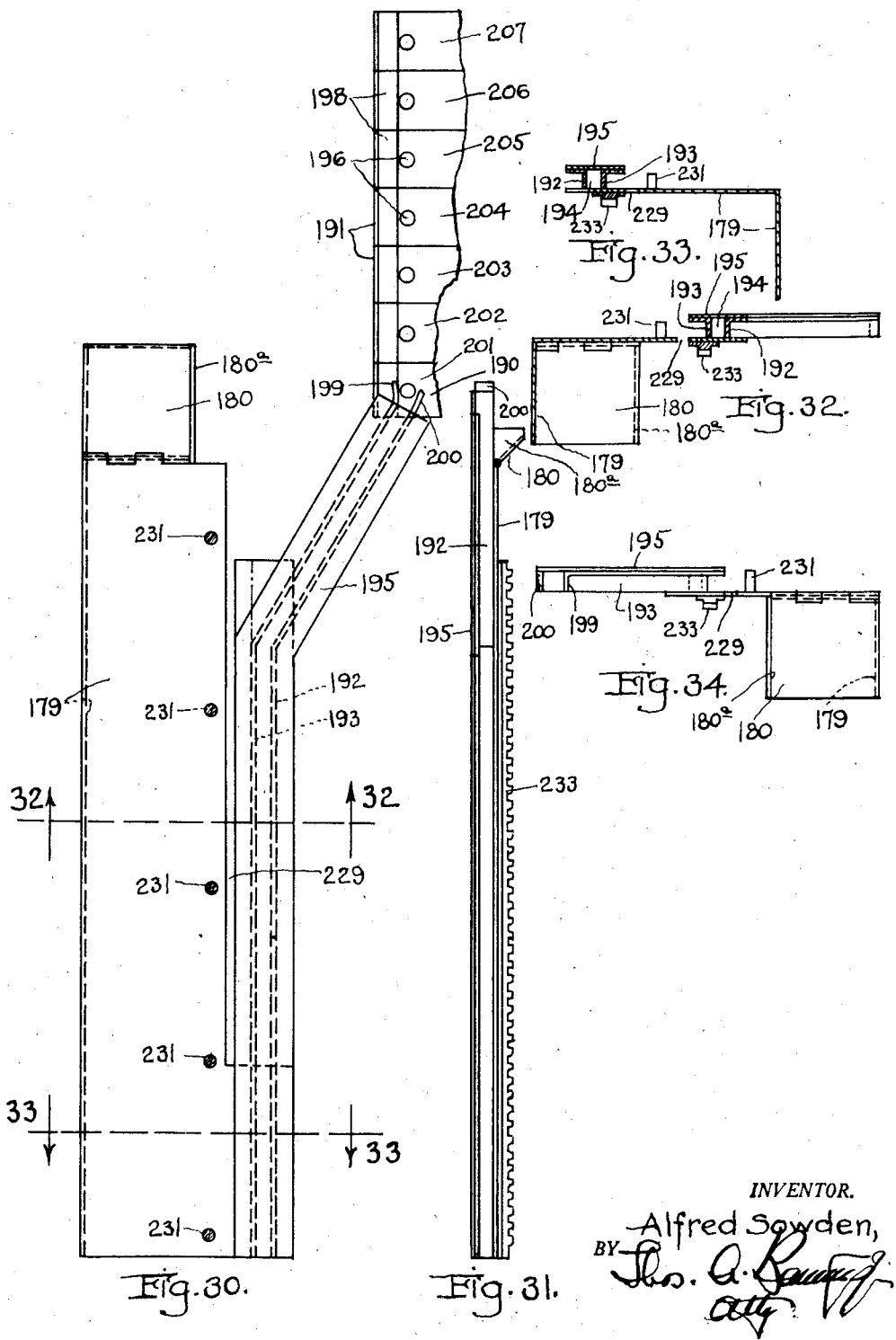

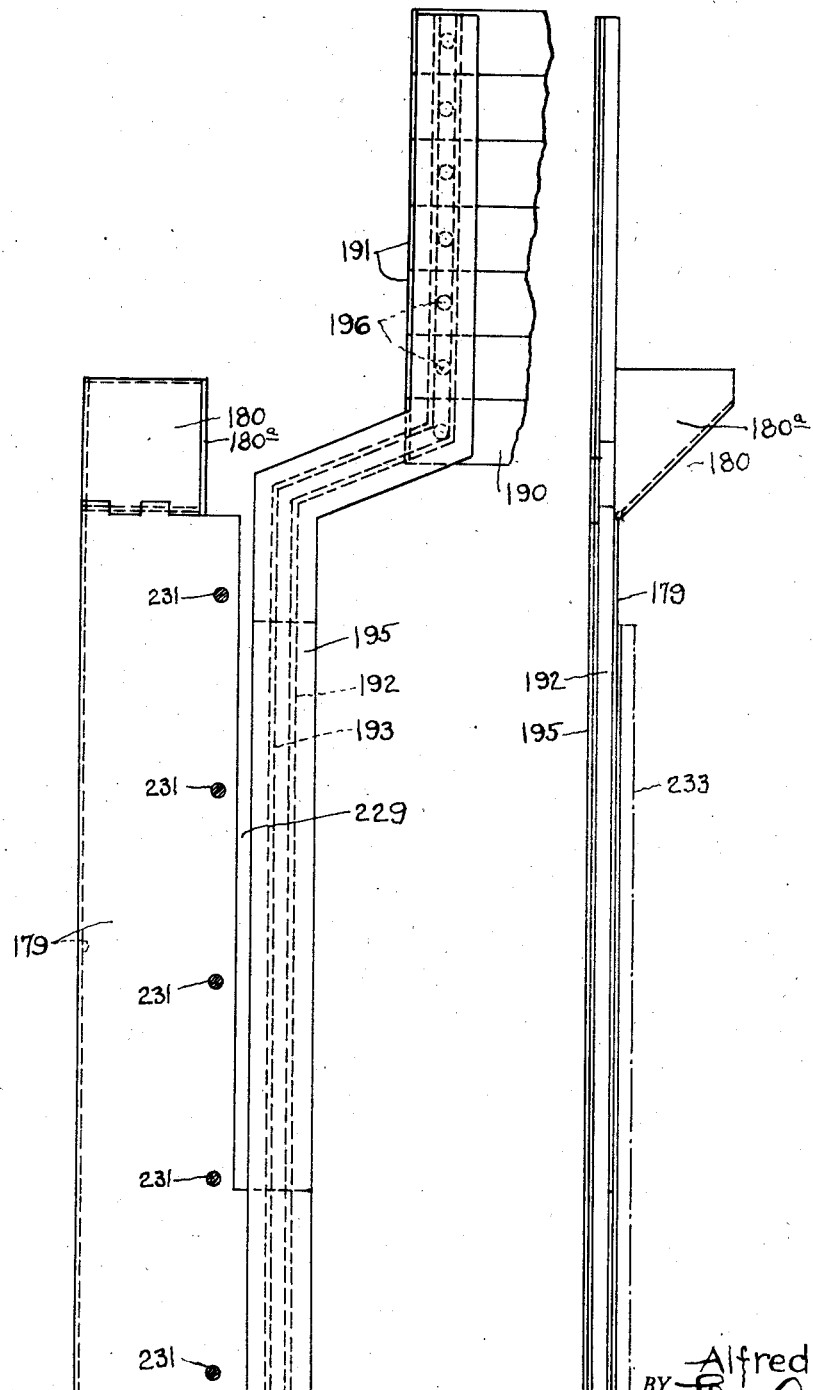

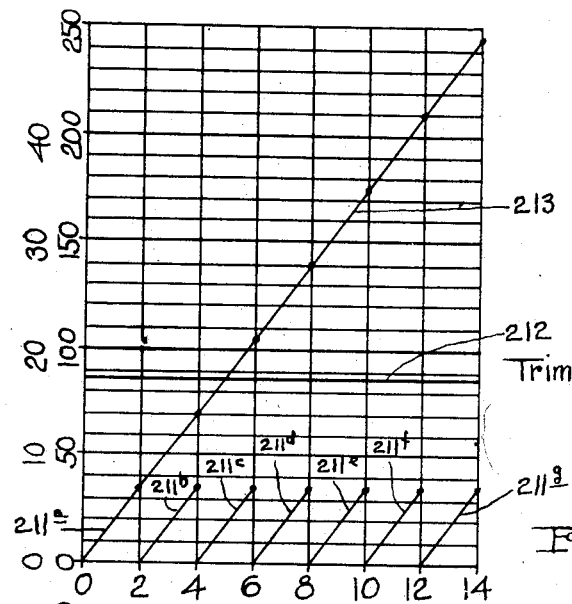
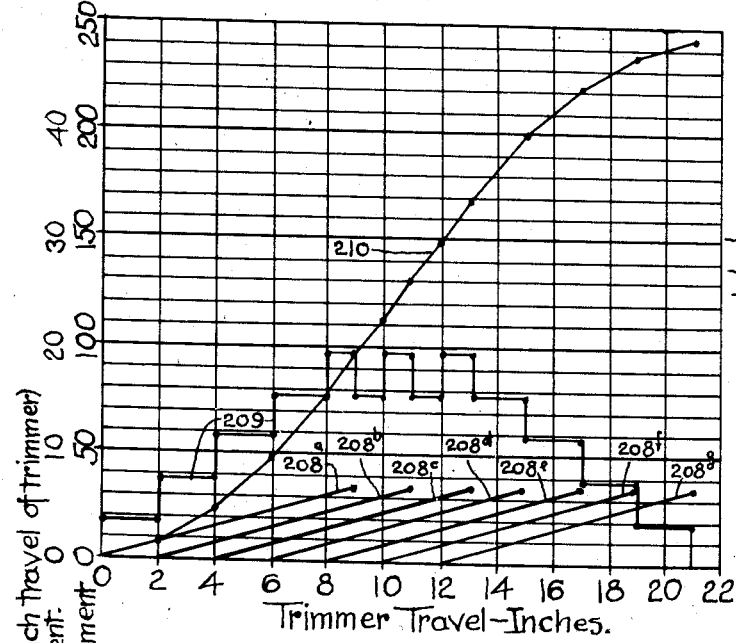

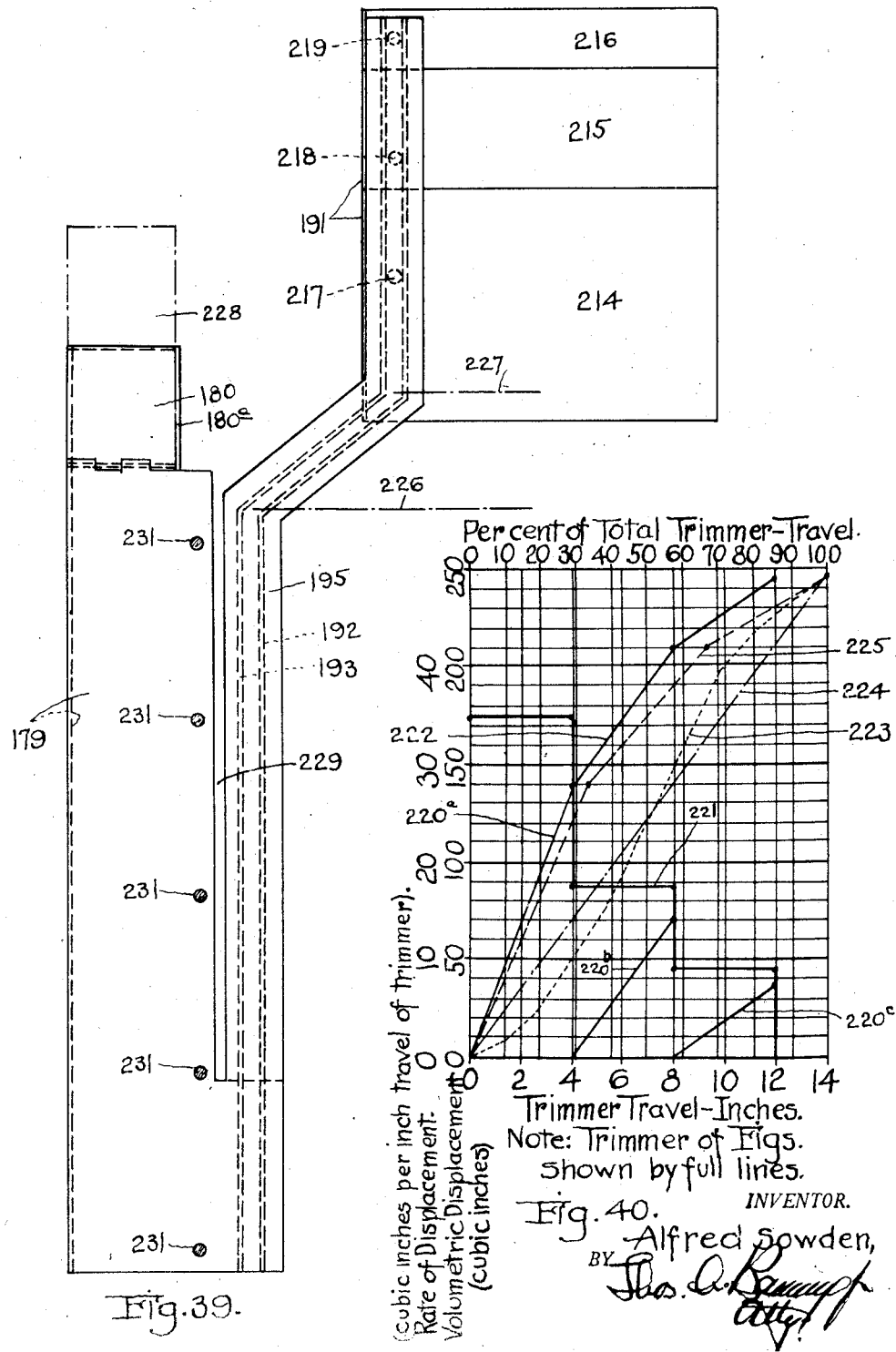

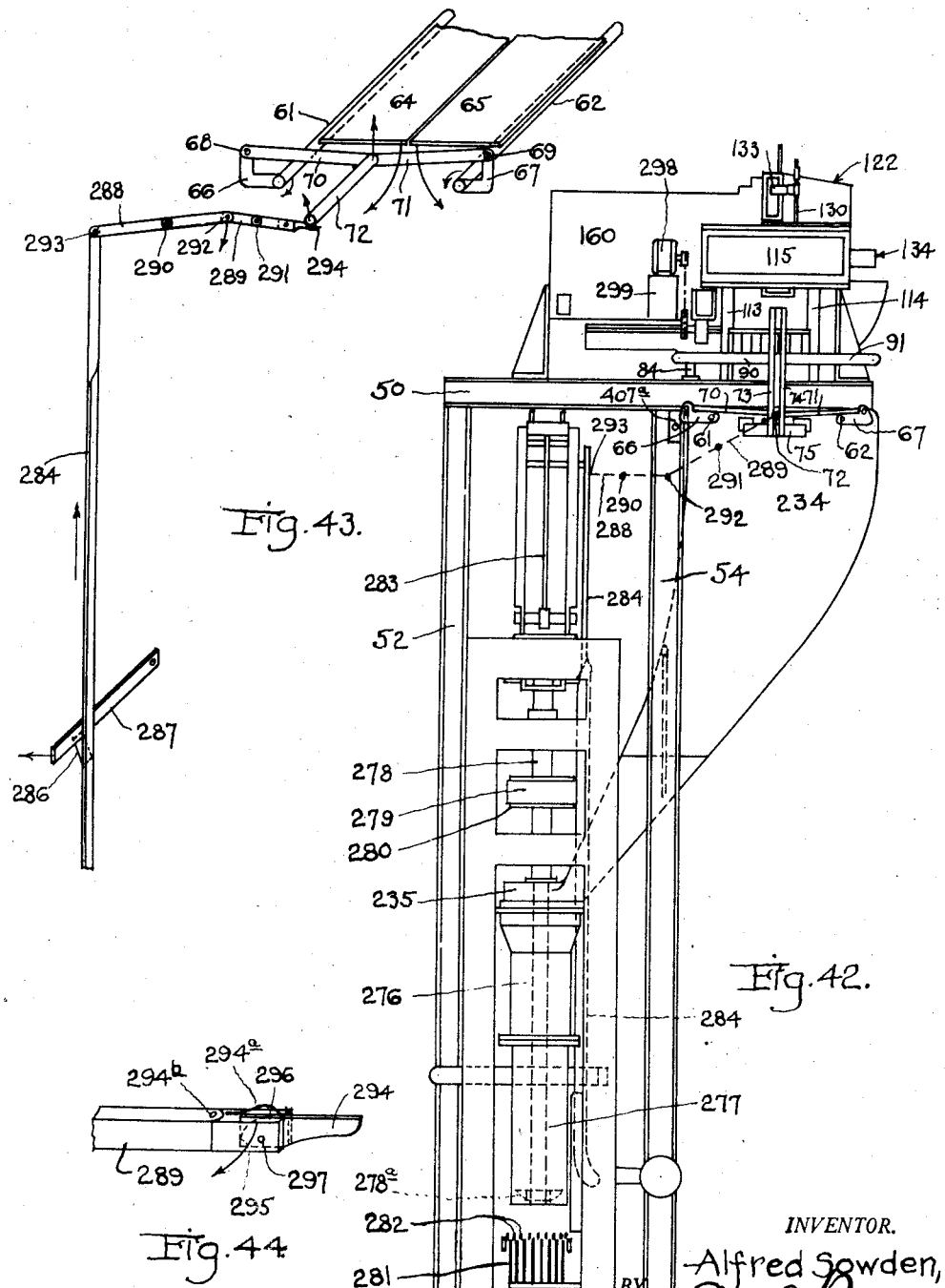

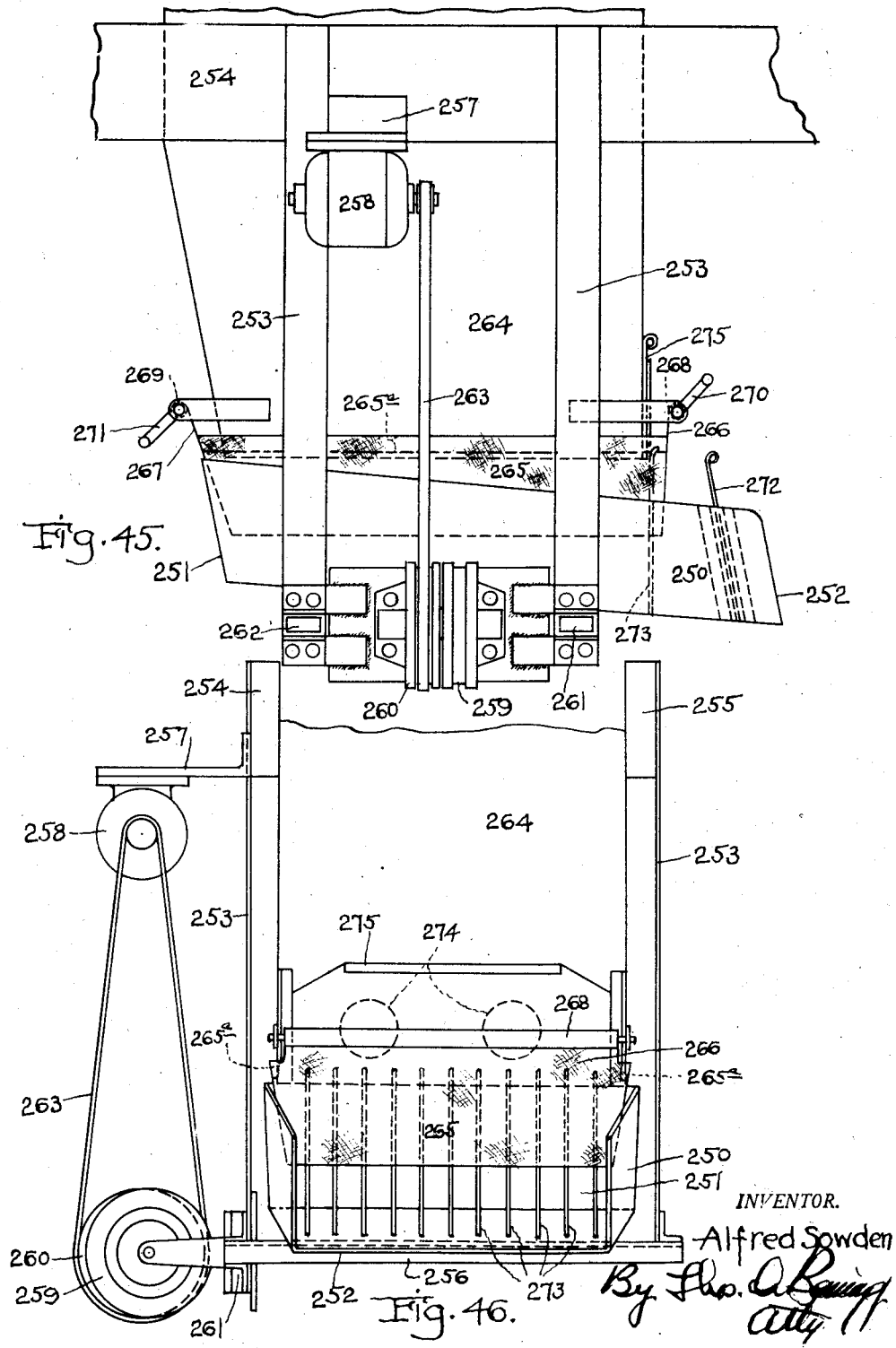

Nov. 11, 1947.  A. SOWDEN  2,430,622
WEIGHING MACHINE
Filed Jan. 2, 1945  25 Sheets-Sheet 21

INVENTOR.
Alfred Sowden,

Nov. 11, 1947.   A. SOWDEN   2,430,622
WEIGHING MACHINE
Filed Jan. 2, 1945   25 Sheets-Sheet 22
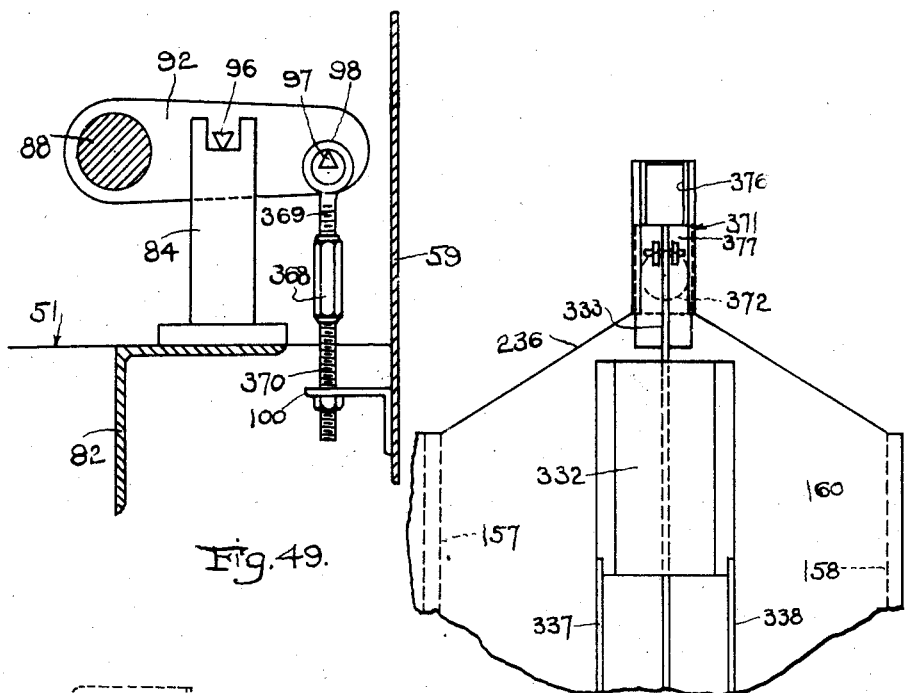
Fig.49.
Fig.51.
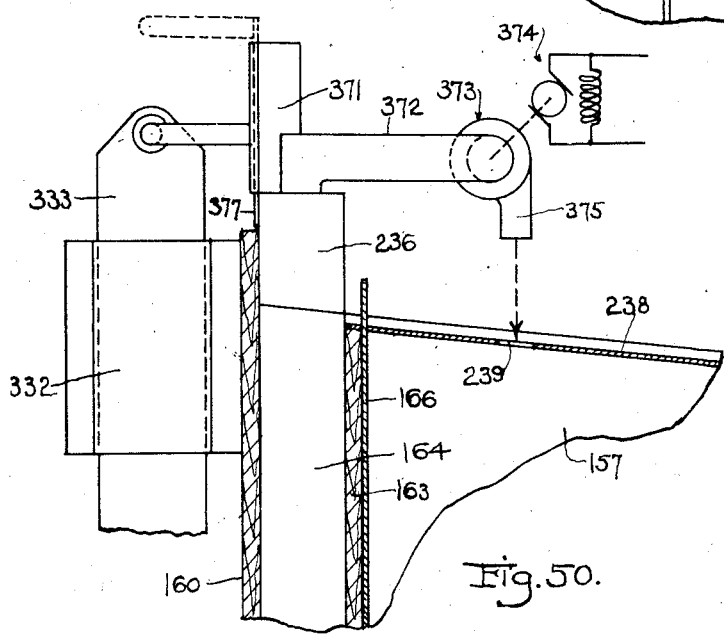
Fig.50.
INVENTOR.
Alfred Sowden, INVENTOR.
Alfred Sowden, INVENTOR.
Alfred Sowden, Patented Nov. 11, 1947

2,430,622

UNITED STATES PATENT OFFICE 2,430,622

WEIGHING MACHINE

Alfred Sowden, Arkansas City, Kans.

Application January 2, 1945, Serial No. 571,061

27 Claims. (Cl. 249—7)

This invention has to do with improvements in machines for weighing batches of material such as flour, mill feeds, shorts, and other materials, and delivering such weighed batches to suitable packing units or the like. The weighing machines herein disclosed also have to do with improvements in means to trim the amount of material contained in each weighed batch so that said batch is brought to an exact prescribed weight prior to delivery of said batch to the packer or other machine for subsequent treatment. Thus, the present improvements have to do with means to pre-weigh batches of material to exact trimmed amounts so that batches of exactly uniform prescribed weight will be delivered from the weigher.

The present improvements are also intended to make possible very rapid pre-weighing and trimming operations, so that the pre-weighed and trimmed batches of great uniformity of weight can be very rapidly weighed, trimmed, and delivered as individual batches to the packer or other machine for subsequent treatment. For example, batches of one hundred pounds of material can be pre-weighed, trimmed to an accuracy within substantially two ounces each, and delivered at the rate of ten or more per minute, or a rate of not over six seconds for each batch, in continuous operations, thus meeting the demands of packing machines which are capable of such a high sustained rate of packing operations.

It should be here noted that the weighing machine herein disclosed may be used as a weighing unit irrespective of the form or nature of the machine to which such pre-weighed batches are to be delivered, and this weigher is a self-contained unit; but it is to be here noted that in the design and construction of this weigher I have nevertheless made specific provision for use of such weigher directly in connection with packers of a type and design heretofore developed by me, and disclosed in various Letters Patent of the United States heretofore issued on my applications. Included in such Letters Patent of the United States relating to packers, and the like are No. 2,184,474, issued December 26, 1939, No. 2,258,631, issued October 14, 1941, No. 2,216,786, issued October 8, 1940, No. 2,311,706, issued February 23, 1943, and No. 2,352,663, issued July 4, 1944. Weighers incorporating features of my present application may also be advantageously used in connection with other forms of packers than those disclosed in the aforesaid issued Letters Patent, or for other purposes than for delivery to packers of pre-weighed batches of material.

Generally speaking, weighers embodying my present invention are provided with weigh hoppers to receive the batches of material, means to deliver into such weigh hoppers an overweight of material, and means to trim from such overweight batch sufficient material to restore the weight of the batch retained in the weigh hopper to the exact value which is prescribed. A weigher of this general type is disclosed in my previously filed application for Letters Patent of the United States, Serial No. 414,773, filed October 13, 1914; and in that application I have disclosed one form of trimmer for trimming out the excess or overweight material down to the desired net value. In general that form of trimmer incorporates means to transfer the excess material laterally from the upper portion of the over-weight batch and back into the bulk of the material to be afterwards weighed, together with means to create a space within said bulk of material into which such trimmed material may be thus transferred. The present application includes trimming means of the general form just mentioned; but I have herein disclosed improvements in such trimmers making possible greater speed of trim combined with greater accuracy thereof. In this connection, it is noted that as the trimming proceeds to reduce the weight of material in the weigh hopper towards the exact net weight desired, the out trimming operation for removal of over-weight material from the mass contained in the weigh hopper must cease when the bulk of material in the weigh hopper has been reduced to the exact prescribed net weight. I have herein made provision to assure this result. To increase the accuracy of this trimming operation it may be found desirable that the rate of trim be relatively slow in the later stages of trimming and one form of trimmer herein disclosed is well adapted to accomplish this result.

It is also noted that in order to secure uniformly accurate pre-weigh trimming operations the weigh hopper should always be over-filled to substantially the same extent or amount, so that the out-trimming operations will be substantially equal in amount. I have provided means to over-fill the weigh hopper during the initial filling operation, and to then trim out the material contained in this hopper down to a pre-determined bulk or volumetric amount representing substantially the desired amount of over-weight; after which the weigh trimmer serves to trim out material down to the exact pre-determined net weight value. Since the volume required to establish this original amount of over-weight depends on the specific weight of the material being handled it follows that for different materials the original bulk thus retained in the weigh hopper should be established according to the kind and specific weight of the material being handled; and one feature of the present invention comprises the provision of means to adjust or control the exact level at which this original over-weight bulk trimming operation takes place prior to weigh-trimming. Having made possible this original adjustment according to the kind or nature of the material being handled, and its specific weight, I have thus provided the most advantageous conditions under which the subsequent weigh-out-trimming operation may be conducted to bring the net weight down to the exact prescribed value, and at a very high rate of operations.

Specifically, this bulk trimming operation is performed by means of a horizontal damper which closes over the main portion of the weigh-hopper when the over-weight condition has been established in such weigh-hopper; and I have provided on the main portion of the horizontal damper an adjustable lip or scraper which serves, during the closing operation of such damper to trim off the top portion of the bulk of material contained in the weigh-hopper down to the level established by such scraper edge. That level I have made adjustable, so that the bulk retained within the weigh-hopper is thus adjustable within the limits of adjustment of such scraper edge. However, in order that the best results may be secured in this operation, the changes of adjustment required in this scraper edge should be relatively small. In order to provide for relatively large changes in specific weights of various materials handled by the weigher from time to time I have then made provision for also adjusting the height at which the weigh-hopper as a whole may be set with respect to the horizon at which the damper travels, so that the bulk of material retained beneath said damper may thus be varied within considerable limits to thereby make the weigher usable with a wide variety and range of specific weights of materials. Then, in each case for which the weigher is used, or for each specific material, the scraping edge may also be adjusted to effect trim of bulk to the desired amount of over-weight, so as to enable the weigh-trimmer to finally effect its trimming operations under best conditions for fast and exact operations.

The weigh-trimmer itself is mounted for horizontal movements substantially at and just above the level of the horizontal damper above referred to; and this trimmer is supported independently of the weigh-hopper itself. Since I have made provision for slight vertical adjustments of the elevation at which the weigh-hopper is sustained, it follows that these adjustments will affect the position of the weigh-hopper relatively to the elevation of the trimmer. To compensate for this relative positioning, I have also provided for corresponding adjustments of the elevation of the upper edge of the wall of the weigh-hopper at and adjacent to the trimmer location so that correct relations will always be possible as between these elements of the combination.

In connection with the relation of the trimmer to the horizontal damper above referred to, it is here noted that as the trimmer is moved inwardly during its trimming operation the trimmed material is moved over onto the top face of the horizontal damper, where said trimmed material is then retained and sustained by the horizontal damper, with corresponding reduction of amount of material contained in the weigh hopper, and with the weight of the so-trimmed material being sustained by the damper. Since this operation includes this transfer of trimmed material onto the horizontal damper it follows that the elevation of the horizontal damper during this trimming operation should be the same as that at which the trimming operation is taking place. I have therefore made provision for always bringing the scraping edge of this horizontal damper to the correct final elevation corresponding to the elevation of the trimmer just prior to commencing of the weigh trimming action, so that the trimmed material will be properly received onto the horizontal damper during the trimming operation. This result is secured in combination with adjustability of the level or horizon at which the bulk trimming takes place during the closing of the horizontal damper, and by means of the scraping action of the leading edge of said horizontal damper as aforesaid.

At conclusion of the trimming operation it is desirable to completely cut off the material retained in the weigh hopper from the material sustained by the horizontal damper so closed, preliminary to delivery of the weighed material down to the packer or other receiving machine. For this purpose I have provided a vertically movable damper in position to co-operate with the horizontal damper, when closed, to cut-off or segregate the weighed material from the not-yet-weighed material. This vertically movable damper travels downwardly adjacent to the trimmed position of the trimmer elements, but with proper clearance between these parts.

When the vertical damper is moved down to closed position where it also co-operates with the previously closed horizontal damper the space within the weigh hopper is sealed and segregated from the space above the weigh hopper so that no further material can be weigh-trimmed from the weigh hopper and returned to the space above the horizontal damper. Thus the weigh trimming operation has been stopped. The weigh trimmer should cease its trimming movement at this time and be restored to its initial or non-trimming position. I have therefore made provision for stopping the trimming movement of the weigh trimmer either at the same time that the vertical damper closes or just after such closure occurs, and for promptly restoring the weigh trimmer to its initial position.

When the horizontal damper has been closed it occupies a position above the body of material contained in the weigh hopper. The weigh hopper with its contained material must be nicely supported so that its weight can be accurately measured and so that slight vertical movements of the weigh hopper and its contained material will not cause the top surface of such contained material to come into contact with the bottom face of the horizontal damper. Any such contacts between the material contained in the weigh hopper and the bottom face of the horizontal damper, whether due to slight vertical movements of the weigh hopper itself or to other causes (such as slight expansion of the bulk of material in the weigh hopper) would impair the accuracy of the weighing operation.

The lip or scraper edge of the leading edge portion of the horizontal damper serves to establish a slight space or clearance between the top surface of the bulk of material retained in the weigh hopper and the bottom face of the horizontal damper so that complete freedom of the material in the weigh hopper from the bottom face of the horizontal damper is assured; and so that no interference between these elements will occur during the weigh trimming and weighing operations.

I have previously mentioned that I have provided means to provide a space within which the trimmed material may be moved by the weigh-trimmer during the trimming operation. That space is created within the bulk of material above the horizontal damper; and the vertical damper when moved down during the closing operation after the trimming has been completed occupies a position between the inner end of the weigh-trimmer and the space so vacated as aforesaid, so that correct functioning of the parts is assured.

After the weigh-trimming and damper closing operations have been completed as aforesaid the weigh-trimmer is drawn back to its original position, after which the so-pre-weighed material contained in the weigh hopper is to be delivered downwardly, as aforesaid. This operation I effect in very rapid manner so as to reduce the time interval consumed by this portion of the cycle of movements. To this end I have provided a weigh-hopper having its bottom formed by a pair of co-operating blades, rockingly mounted adjacent to opposite edges of the bottom of the weigh-hopper. These blades stand in horizontal co-operating position when the bottom is closed, and can be released to rock quickly down into vertical position to drop the pre-weighed batch of material to the packer or other unit. Such operations are very quickly and positively secured in the structure herein disclosed by provision of a toggle arrangement which normally sustains the blades in co-operating horizontal closed position, and which toggle may be readily broken to permit sudden release and delivery of the material as aforesaid. Provision is also made for counter-balancing these blades so that they will naturally and promptly return to horizontal closed position, with the toggle again cocked after complete delivery of the weighed batch.

The pre-weighed batch thus suddenly released from the full area of the bottom of the weigh-hopper by down swing of the bottom blades of that weigh-hopper immediately falls down through a chute of large cross-sectional area on its way to the packer or other machine. In the case of movement to a packer such as shown in my previously listed Letters Patent said chute continues to the inlet head above the packing tube or cylinder of such packer; and packers of the type shown in said Letters Patent are so constructed that they exert a drawing action on the material supplied to the packing tube or cylinder, tending to draw said material down from the chute and into the packer-tube of the packer. In the case of such packers as shown in said Letters Patent such drawing action is produced by the continuous rotation of the packer auger at high speed, causing a considerable down draft to occur from the supply chute through which the pre-weighed batch is coming, to the packer tube itself.

The initial release of the pre-weighed batch into a chute of large cross-sectional area ensures that said material will initially be in loose condition as it commences its descent through the chute; and any tendency which might exist for such material to pack or impact as it moves down into the more constricted portions of the chute and towards the packer head and tube, will be resisted and neutralized by the considerable down drawing action exerted by the continuous high speed rotation of the packer auger. Thus the weigher herein disclosed bears a special relation to auger packers of the type disclosed in my aforesaid Letters Patent.

I have spoken of the creation of a space into which the trimmed material may be moved. The creation of this space in itself requires that the material moved in the creation of this space be received into a suitable receptacle; and a further feature of the present invention relates to the provision of such a receptacle of suitable form for this moved material. During the weigh-trimming operation material may move into this receptacle rising therein, and afterwards, when the pilot of the weigh-trimmer is restored to its initial position such material may again move back into the space above the horizontal damper and be included in the bulk of not-yet-weighed material.

Suitable power means is provided for effecting the damper movements, and the movements of the trimmer. Since these movements of the dampers are straight line in nature I have provided simple solenoid devices to effect such movements; but since these movements are of substantial amounts, I prefer to make use of what are known as linear motors, such as disclosed, for example, in Letters Patent of the United States, No. 2,337,430, issued December 21, 1943, on the application of Panfilio Trombetta. Other forms of motor may, however, be used for these movements, and I mention this Trombetta type of motor by way of illustration, only, although it is very well adapted to the needs of the present problem. Suitable motor means is also provided to effect movements of the trimmer elements. In the disclosures of the present application I have shown a simple form of reversible motor, serving to shift the trimmer element in one direction for weigh-trimming by one direction of motor operation, and serving to restore the trimmer element to its original position by reverse movement of such motor.

I have provided suitable means to effect operation and control of the several units or elements of my weigher in proper relation, and by a series of automatic operations. Such means includes a suitable weigh beam or element, connected to the weigh-hopper, and including suitable weigh units adjustable to the desired weigh values for which the weigher is to operate. I have provided means operable automatically by movements of the weigh beam to institute and control the operations of the several motor elements and in proper sequence; and in the particular arrangement herein disclosed said means includes a light beam which serves, by interception of the weigh beam in its movements, to effect and control operation of suitable electrical circuits for the desired results. The particular arrangement herein disclosed is such that a single electric eye, properly controlled and connected into these circuits serves to effect all necessary controls.

Now, during the operation of initially over-filling the weigh hopper it is desirable to make provision such that the weigh beam will not too soon shift to its over-weight position, to thereby ensure that the desired amount of over-weight will be established in the weigh hopper; but said means must be so constituted that when this over-weight has been established in the weigh hopper the weigh-beam will thereafter function to exactly and correctly control the weighing and trimming operations to ensure that exactly the correct mass of material will be retained within the weigh hopper. To this end I have provided a counter-poise arrangement for the weigh beam; and I have provided a new and improved form of this counter-poise, of very simple form and construction, and one which is readily adjustable to ensure the desired amount of preliminary overweight.

This counter-poise arrangement is such that during the initial or filling operation an excess weight is imposed on the weigh beam, which must be overcome by the upward movement of the weigh beam in order to bring said beam to the position where the light beam affecting the electric eye will function to discontinue further inflow of material to the weigh hopper. The counter-poise arrangement is then such that said counter-poise will be thrown out of the way by the upward movement of the weigh beam, permitting rapid rise of said weigh beam with cut-off of inflowing material; whereupon trimming commences; and this counter-poise arrangement is further such that during the trimming operation with corresponding downward movement of the weigh-beam, the final trimming will be effected prior to re-engagement of the weigh beam with the counter-poise, so that exact final weighing action will be accomplished, and without interference from the counter-poise during this operation.

Since I have made provision for adjusting the volumetric trimming action prior to the final trimming action which is effected by the trimmer, I have made provision for bringing the counter-poise action into correct relationship to the aforesaid volumetric trimming action, thus making provision for final functioning of all parts in their proper relative relationships.

In connection with the aforesaid volumetric trimming as preliminary to the final trimming action, I have made provision for not only adjusting the height of the weigh hopper with respect to the level or horizon of the horizontally movable damper, and with respect to the trimming action of the leading edge of said damper; but I have also made provision for adjusting the size or volume of the weigh hopper, by adjustment of one or more of the walls of that hopper slightly inwardly or outwardly as needed.

It is a further feature and object of the present invention to provide a form of trimmer which is well adaptable to various trimming conditions, by use of various forms of trimmer details. Thus, for example, said trimmer may be one which will give an increasing rate of trimming action (per inch of trimmer movement) during the early stages of such trimming movement, followed by a reducing rate of such trimming action; or one which will give a uniform rate of trimming action during all stages of the trimmer operation; or one which will give a maximum rate of trimming action during the early stages of trimmer movement, followed by regularly reducing rate of trimming action; or other combinations of rates of trimming action may be readily secured as may be desired.

A further feature of my present invention relates to an improved means to supply the material to the weigher proper under such conditions as to ensure best weigher operation. In this connection it is noted that when the horizontal damper is first opened to effect rapid supply of the bulk of material into the weigh hopper, this operation should be so performed as to not effect a too sudden and violent impact of this incoming batch of material on the floor or bottom damper of the weigh hopper itself. This means that the incoming large volume of material should not be compelled to make a too great descent from its previous location at the instant of damper opening; and it further means that in order to secure uniformity of actions during successive weighing operations the level of material contained in the supply hopper above the weigh-hopper, and from which the material is released to the weigh-hopper, should be retained at as closely regulated level or elevation as possible. Then as each batch is released to the weigh-hopper it will make the same amount of fall or descent as all previous batches, and thus ensure uniformity of action at all times.

To effect the foregoing desired result I have made provision for retaining at all times in the supply hopper immediately above the horizontal damper a supply of material, which is of sufficient magnitude to meet the immediate demands for a batch to be delivered to the weigh-hopper, and which supply hopper is constantly replenished at a uniform rate with fresh material, the rate of such replenishment being substantially equal to the average rate of requirement by the weigher, so that the level of the material in the weigh-hopper is always retained at substantially the same average position. In this connection I have found that a so-called "shaker-type" feeder is admirably adapted to ensure such regular delivery of material into the supply-hopper, and is also adapted to maintain a substantially constant average elevation of material in the supply hopper when the "shaker-feed" is properly adjusted for its functioning.

Since the shaker-feeder (or other feeder) supplies its material to the supply hopper at a substantially constant rate (equal to the average rate of demand for material) it follows that there will be a periodic rise and fall of the amount of material in the supply hopper; and said amount rising uniformly after a batch has been supplied to the weigh-hopper and falling suddenly as a fresh batch is taken into the weigh hopper. Thus the burden of material in the supply hopper is undergoing regular periodic variations. It is desirable that the burden of material directly carried by the floor of the supply hopper (its floor being the horizontal damper, when same is closed) be constant, so that when the horizontal damper is withdrawn to open position for releasing a fresh batch to the weigh hopper the impact and turbulence created by such action will always be the same, thus promoting uniformity of weighing conditions.

To ensure the foregoing desirable result I have provided the supply hopper with a weir whose position both vertically and horizontally, and whose vertical dimension and horizontal dimension, may be adjusted; and said weir establishes in conjunction with the end of the supply hopper a pocket into which the incoming stream of material from the shaker-feed (or other feed) will be initially received; and from this pocket the material will afterwards flow over the full area of the supply hopper, but with the elevation of material in the main body of the supply hopper maintained at a substantially constant elevation; the height of the material in the pocket rising and falling more rapidly than the elevation of the main body of material in the supply hopper. Thus the burden in the supply hopper proper will remain substantially constant, being replenished from this pocket under the best conditions to assure uniformity of impact, and small impact of the material delivered to the weigh hopper when the horizontal damper is opened.

When the horizontal damper is suddenly opened to its full extent to re-fill the weigh hopper, there is a quick descent of the body of material from the supply hopper into the weigh hopper. The disturbance and turbulence created by this quick descent will depend on the vertical distance of such descent. It is therefore desirable to make this distance as small as possible by making the horizontal dimensions of the weigh hopper (and damper opening) as large as possible (both lengthwise and cross-wise of the machine). This I have done in my present design.

Still such descent of material must be accompanied by a sudden displacement of the air from the weigh hopper; and such air must be displaced upwardly since that is the only direction in which such air can flow. To facilitate such air movement at the time of opening the horizontal damper I have provided means to create a partial vacuum or reduction of air pressure in the space above the weigh-trimmer and above the central portion of the weigh hopper; such partial vacuum being only sufficient to ensure easy flow of air from the space to be occupied by the incoming batch of material and thus to reduce or eliminate turbulence, and substantially without carrying up any appreciable amount of material in suspension. The creation of this partial vacuum also serves to create an air current in proper direction to assist the easy flow of material from the supply hopper into the more remote portions of the weigh-hopper.

Specifically I also provide for return of such so-displaced air back into the supply hopper so that any material which may be carried in suspension will be returned to the supply hopper and so that the air around the outside of the machine will remain unfouled.

At the moment of opening the horizontal damper to re-fill the weigh hopper there is a rapid flow and movement of material from the point at which such material enters into the weigh hopper to the forward portion of the weigh hopper where weigh-trimming is soon to occur. This movement, due in part to the form of the back wall of the supply hopper, is in the nature of a flowing of said material to and against the front wall of the weigh hopper and to and against the weigh-trimmer itself. In order to ensure that such flowing of material will finally result in establishment of a surface thereof at desired and correct elevation in the front portion of the weigh hopper where weigh-trimming is to occur, I have made provision for adjustment of a weir or baffle in the supply hopper both horizontally (front to back) and vertically, so as to establish a horizon of cut off of the material flowing into the forward portion of the weigh hopper and under perfect control.

In connection with the movement of material from the supply hopper into the weigh hopper it is desirable to ensure a flowing of said material forwardly from the back wall of the supply hopper and towards the front wall of the weigh-hopper, such flow being rapid but nevertheless under controlled conditions so that the proper distribution of the material throughout the weigh hopper is ensured, including proper filling of the front portion of the weigh-hopper where trimming is to be effected. To this end I have provided the supply hopper, not only with the weir arrangement heretofore mentioned, but also with a back wall of special design. That back wall is so formed in its upper portion as to ensure a largely vertical or descending movement of the material released when the horizontal damper is opened, combined with a lower portion of said back wall having a lesser degree of inclination so that as the descending material reaches such lower portion said material is given a substantial forward component of movement, thereby enhancing the flow of said material forwardly in the weigh hopper to ensure fillage of said portion, and also greatly reducing the vertical impact of the inflowing material against the floor of the weigh hopper.

I have also made provision for intercepting and retaining foreign objects which may be brought along in the stream of material being supplied to the shaker-feeder, so as to prevent said objects from reaching the weigher and thereafter the packer unit.

I have combined my improved form of weigher with a suitable form of packer, as already explained. Specifically, I have shown the present weigher as combined with and delivering the pre-weighed material to a packer of the type disclosed in Letters Patent of the United States, No. 2,311,706, issued February 23, 1943. In the construction of that patent, as well as other packer patents previously mentioned herein, there is provided a vertically movable rod which is released to shift upwardly when the packing operation is to be commenced. This upward movement of this rod serves to lock or sustain the bag supporting platform in position to receive and sustain the load imposed on it during the packing operation, and due to the weight of material being packed. When this upward vertical movement of this rod occurs so that the packing operation may be commenced, the pre-weighed batch should be released from the weigh-hopper; and I have therefore shown an interconnection between this vertically movable rod and the toggle element whereby the bottom blades of the weigh-hopper are sustained so as to release this pre-weighed batch into the packer which is then ready to receive said batch and put it through the packing operations. The arrangement is then such that the packing operations will proceed through to conclusion, and at the same time the weigher may proceed to receive and trim and weigh a fresh batch of material preparatory to the next delivering operation to the packer unit. Thus the weighing operations always proceed one step in advance of the packing operations, and the two units are functioning at all times in proper synchronism and harmony.

In connection with the foregoing, it is noted that when a single weigher unit is provided for the packer unit, said weigher unit must have a speed or rapidity of operation sufficiently great to meet the requirements of the packer's rapidity. I have found that the weigher arrangements herein disclosed are possessed of that speed which may be required to meet the requirements of such packers as those of said Letters Patent aforesaid, and that both of these units may thus be co-ordinated to effect complete weighing and packing operations on batches of substantially one hundred pounds each of such materials as flour, mill feeds, bran, etc., at rates of upwards of one complete operation in six seconds each, or ten per minute, or more.

I have already mentioned that I have provided a lip or hinged leading edge portion on the horizontal damper. I have provided means to guide this lip or hinged portion during most of the returning or closing movement of the horizontal damper to effect the volumetric trimming. I have also mentioned that I have provided means to restore this lip or hinged portion to its full elevation and in the plane of the body of the damper at conclusion of the closing movement of said damper. This restoring movement of the lip is upwards; and by effecting said movement quickly I produce a sudden upthrow of any material contained on the top face of said lip and adjacent to the same, thus loosening and breaking up such material; and since this material is the material which is to be moved during the weigh-trimming operation which follows immediately thereafter, I have loosened up said material and conditioned it into the best condition for accurate weigh-trimming which will then occur.

In the drawings:

Figure 1 shows a front elevation of a weigher unit embodying the features of the present invention, the weigh beam being in slightly raised position; and the weigh hopper being shown in position to deliver to a chute leading to another unit, such, for example, as a packet, etc.; the left-hand portion of the structure being cut away to shorten the figure, such cut-away portion being shown in Fig. 3 hereof;

Figure 2 shows a back elevation, corresponding to Fig. 1; and the right-hand portion of the structure is cut away to shorten the figure, such cut-away portion being shown in Fig. 4 hereof;

Fig. 3 shows the left-hand portion corresponding to Fig. 1;

Fig. 4 shows the right-hand portion corresponding to Fig. 2;

Figure 1:
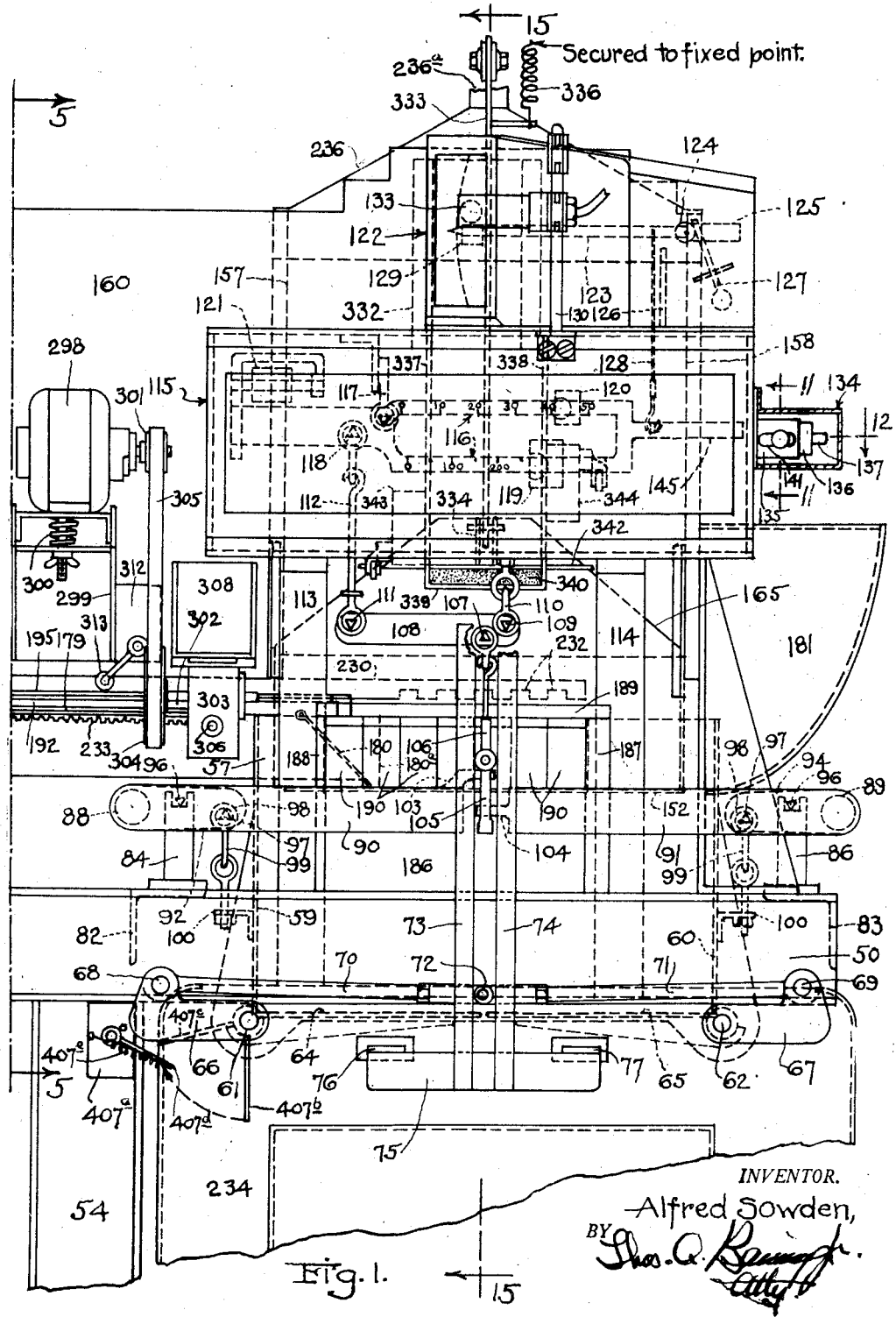
Figure 5:
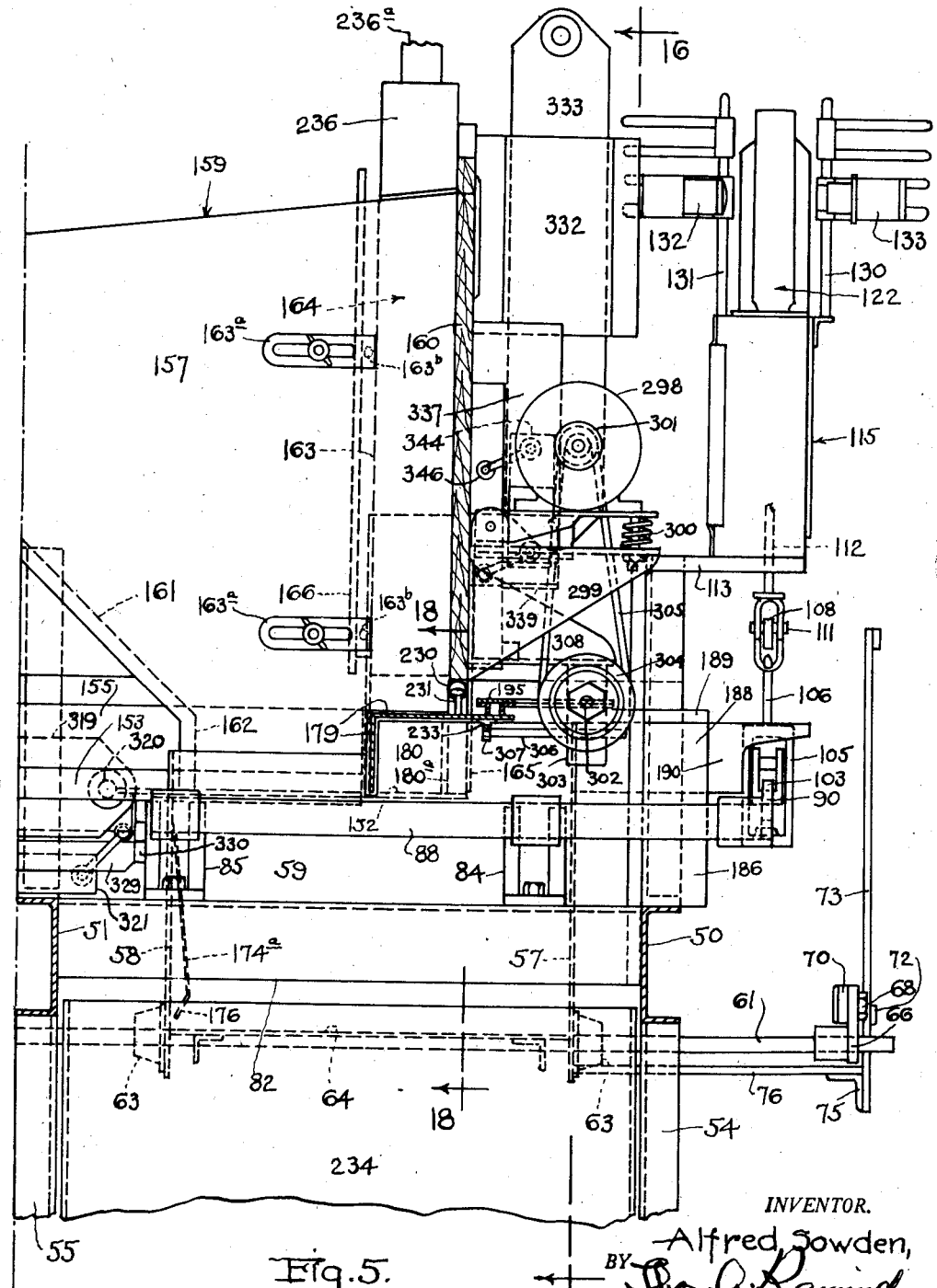
Figure 6:
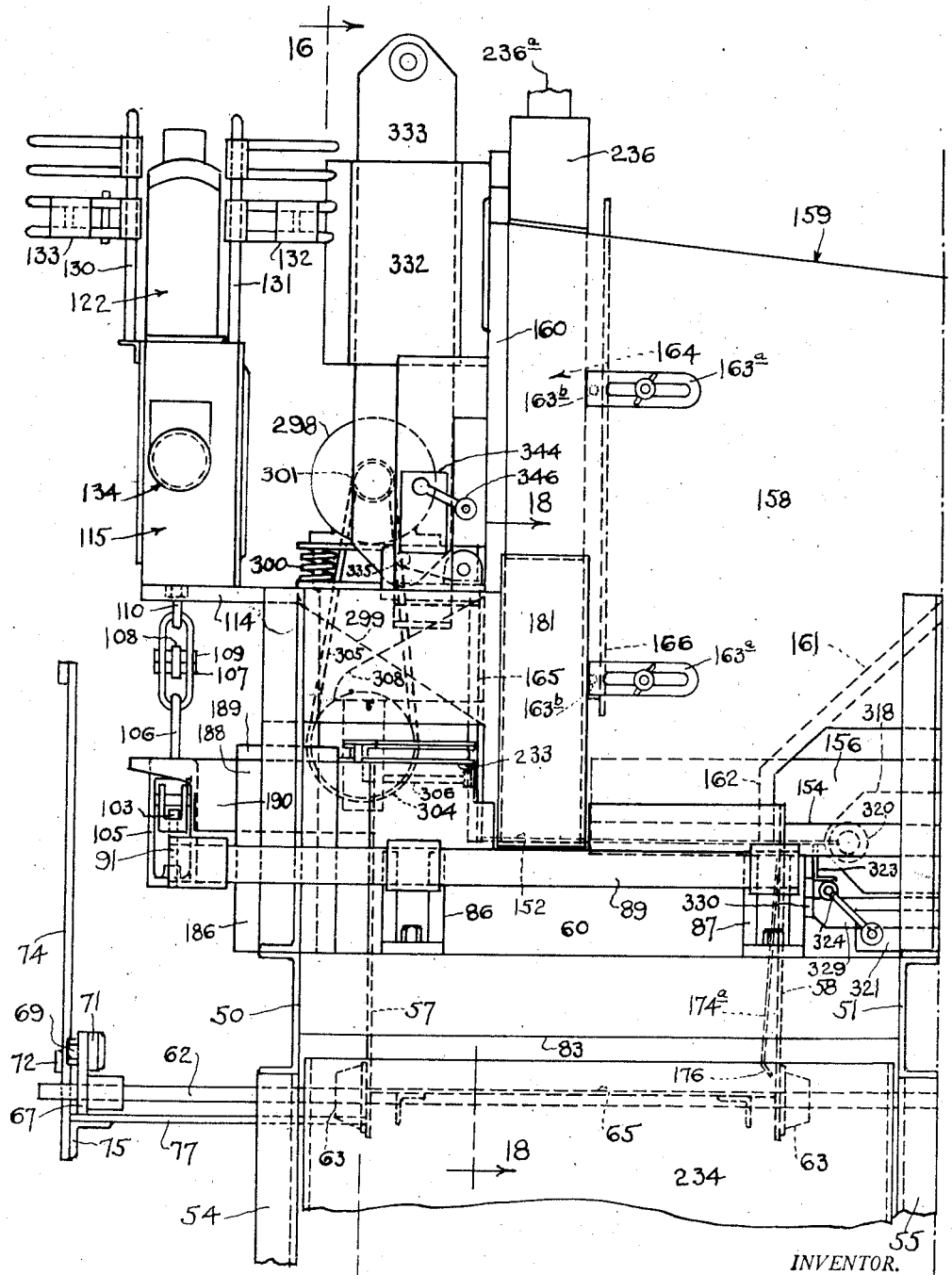
Figure 9:
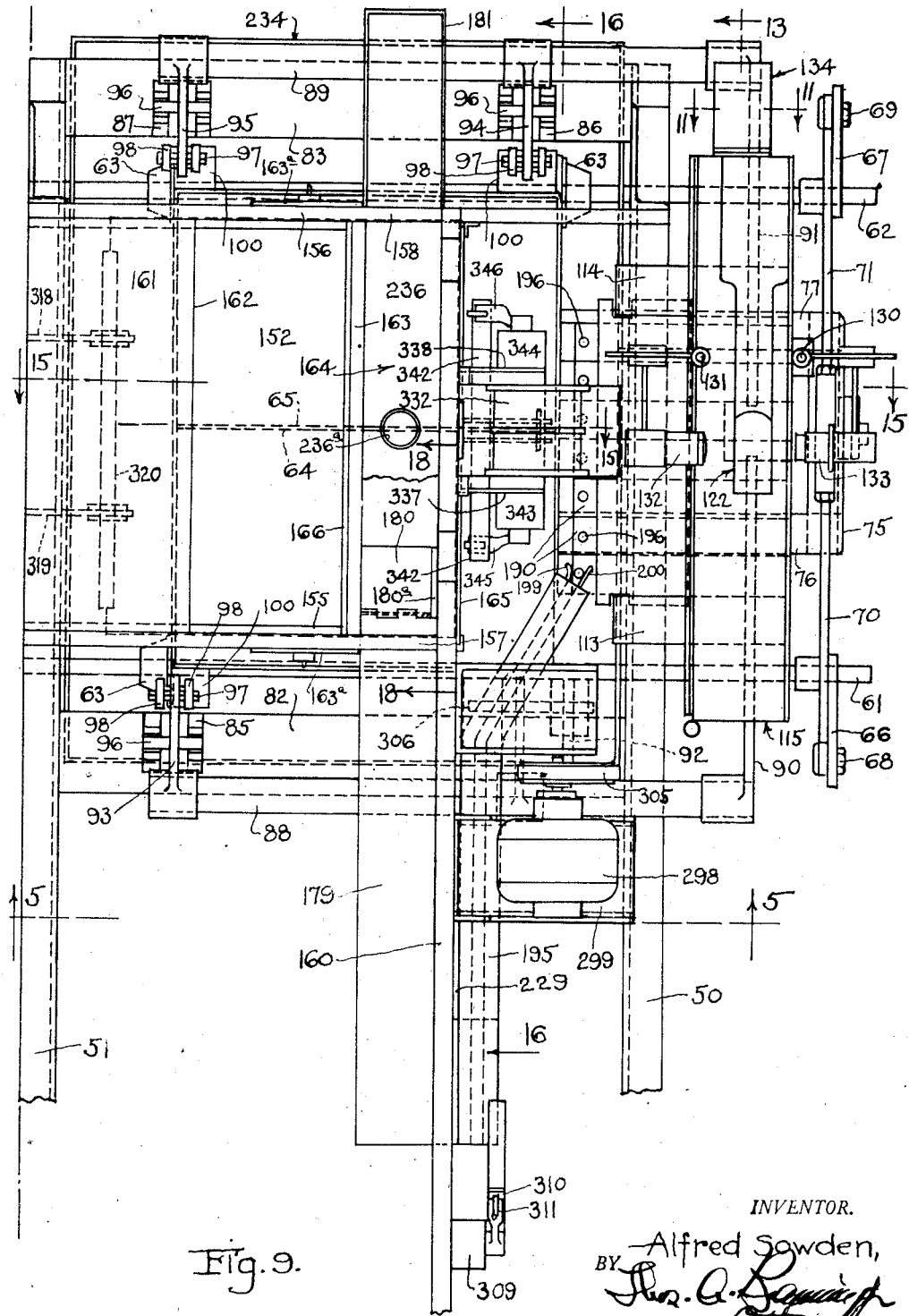
Figure 15:
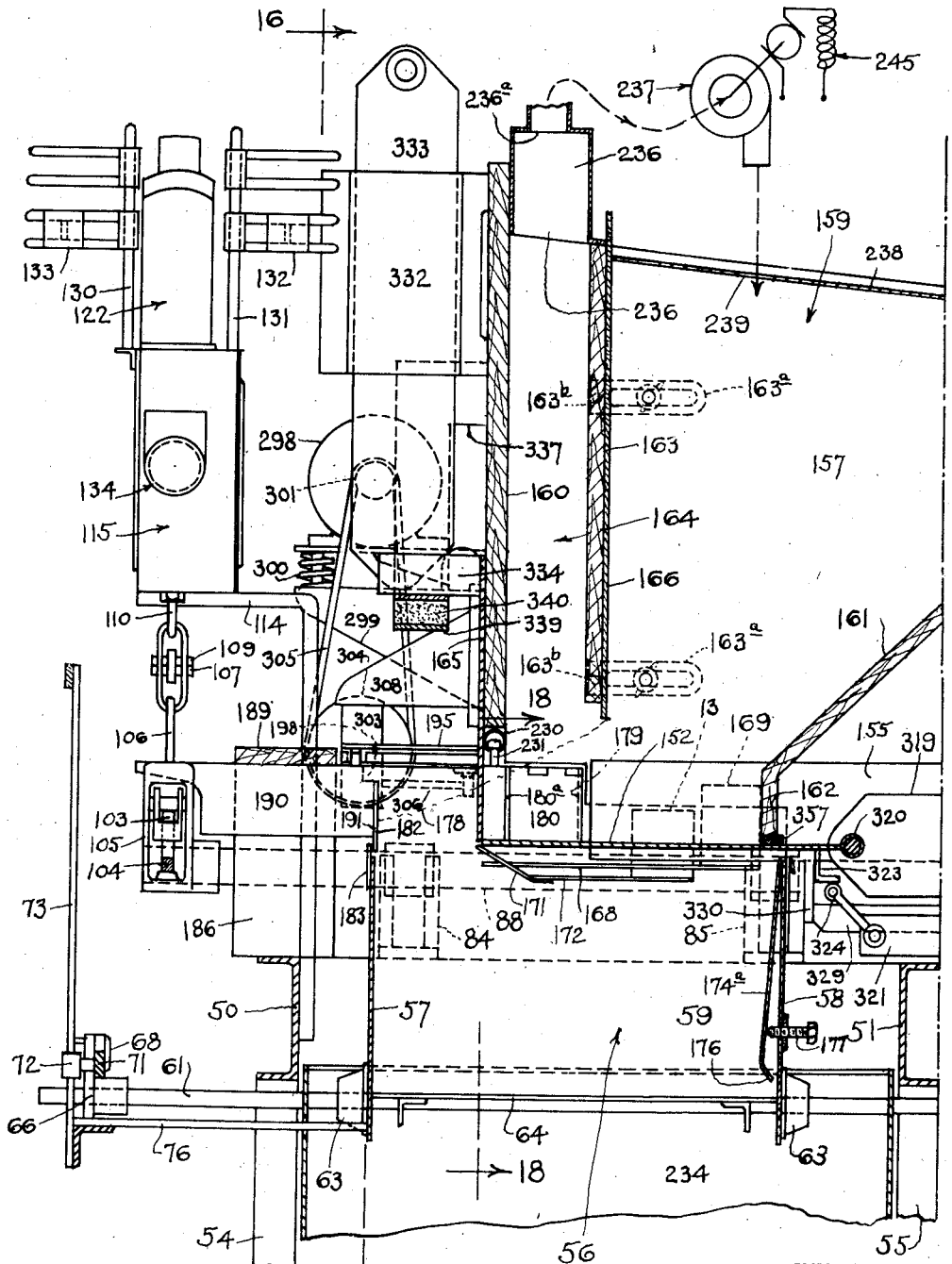
Figure 16:
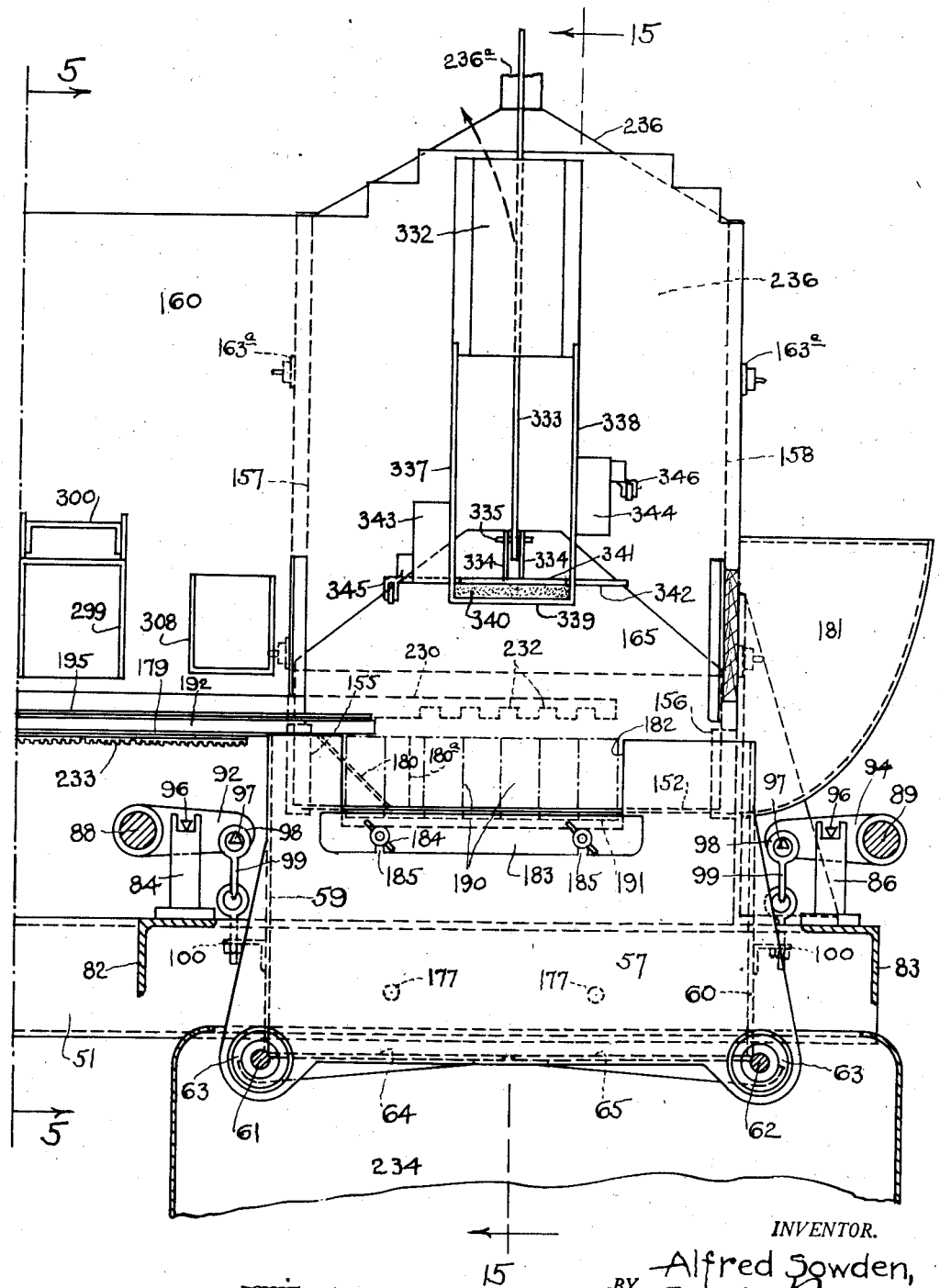
Figure 21:
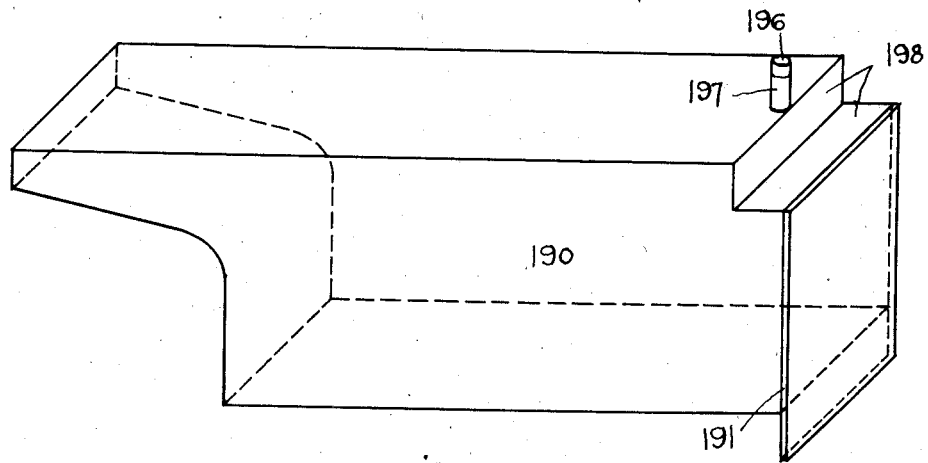
Figure 22:
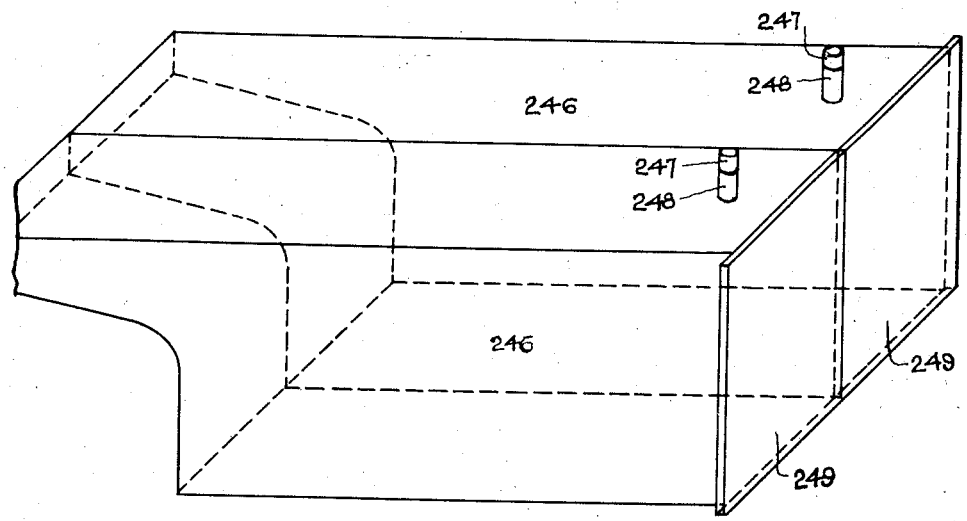
Figure 23:
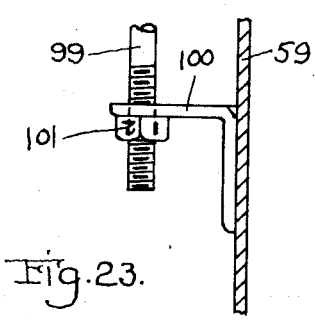
Figure 24:
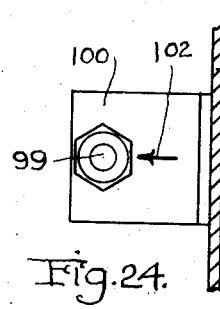
Figure 41:
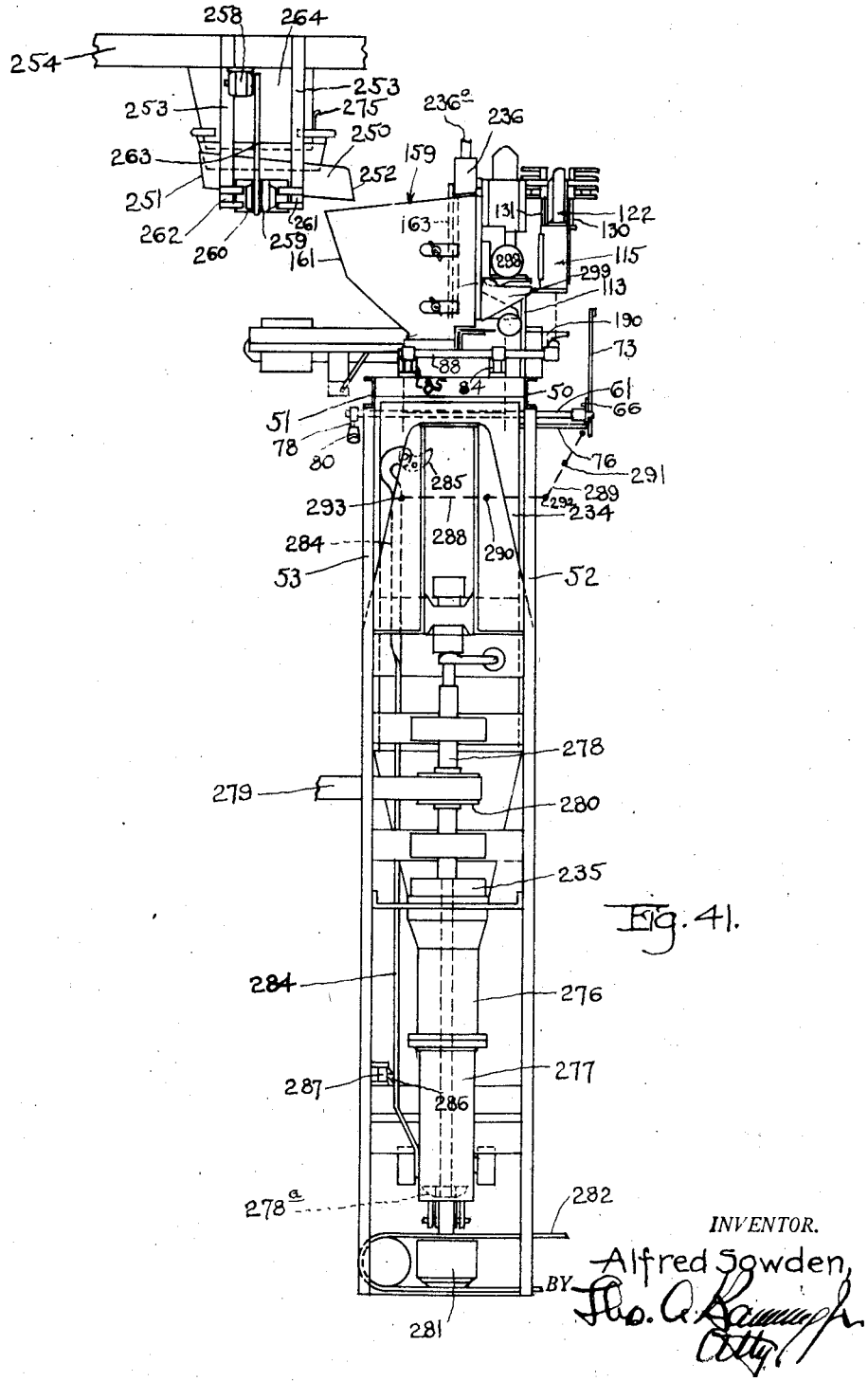
Figure 47:
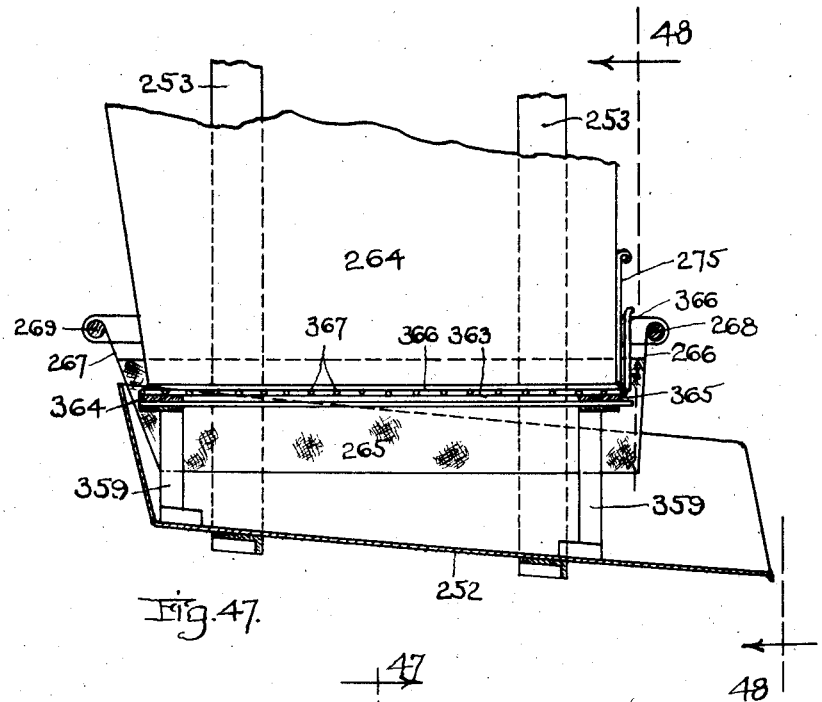
Figure 48:
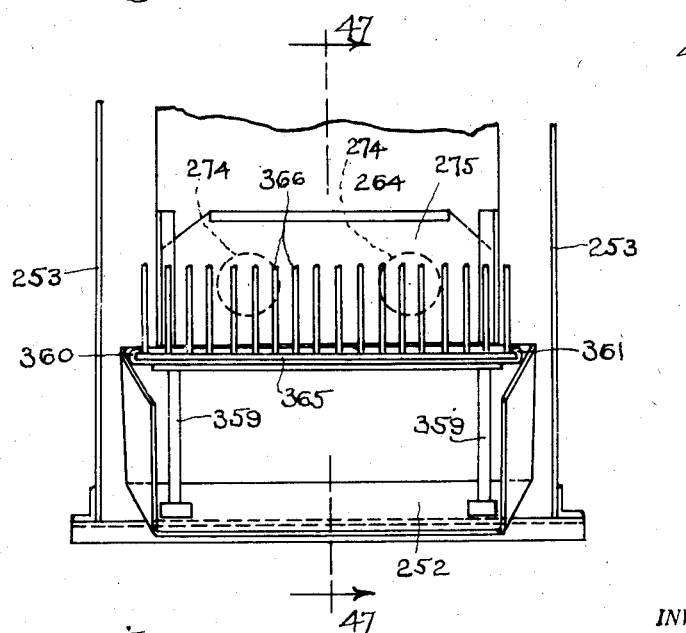
Figure 52:
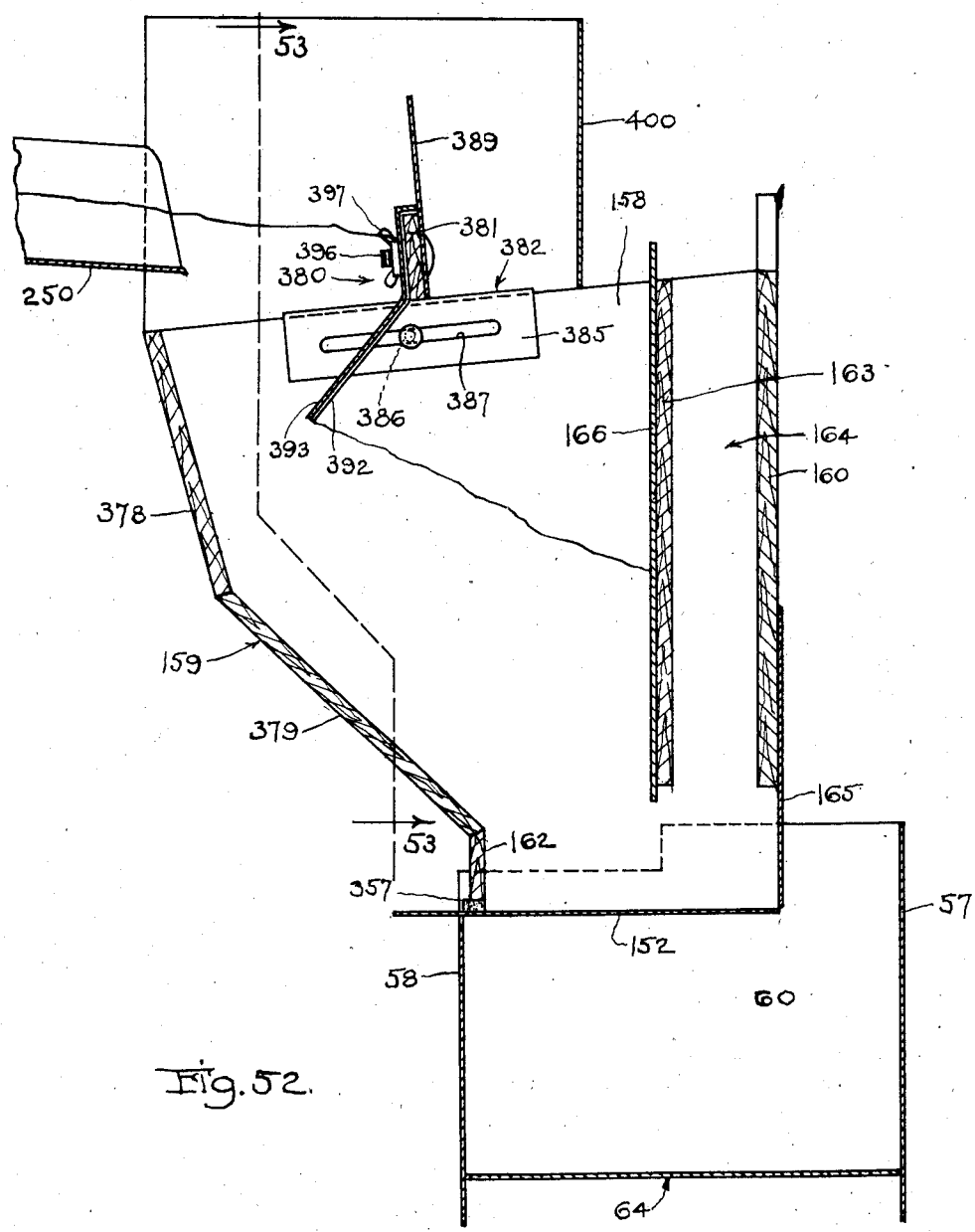
Figure 53:
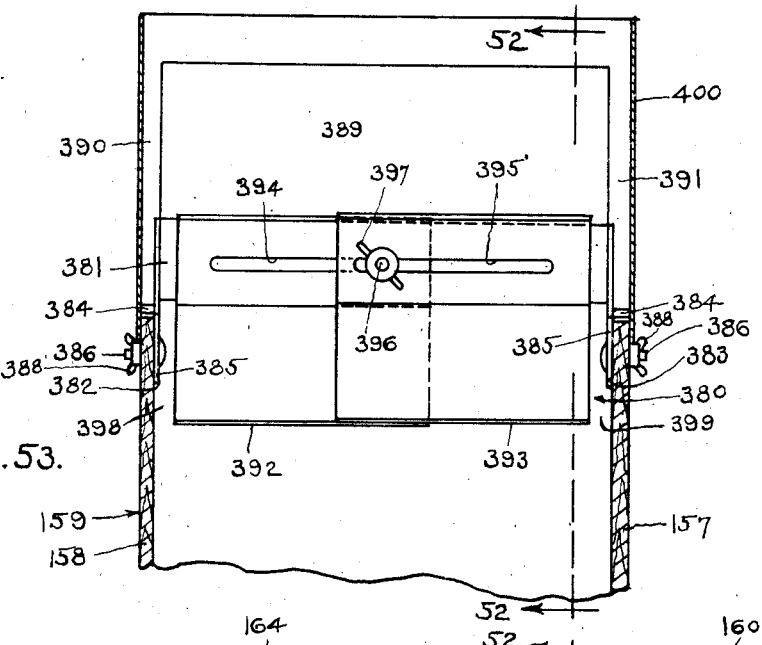
Figure 54:
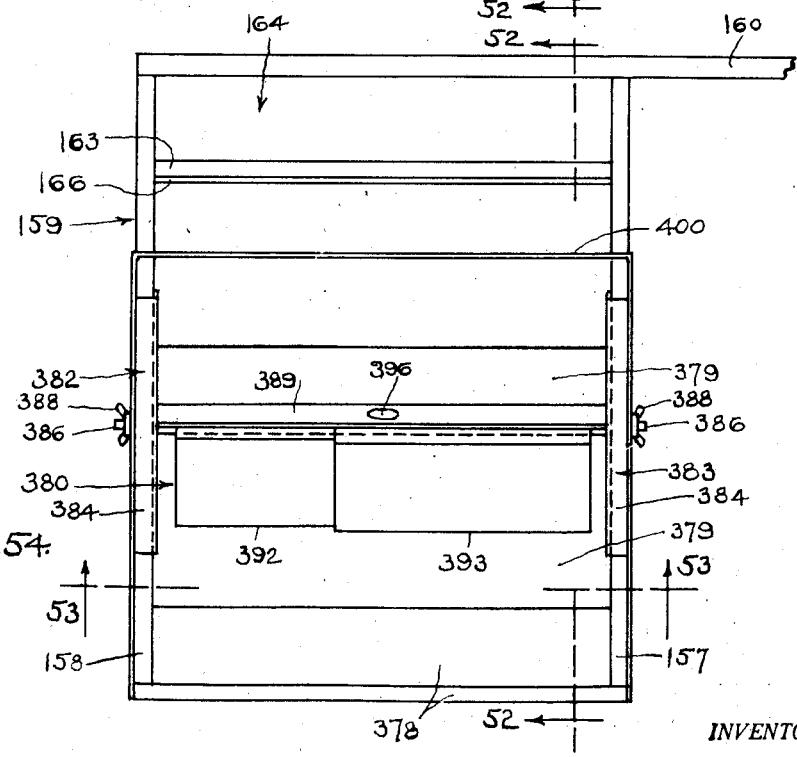

Fig. 5 shows a left-hand elevation corresponding to Figs. 1, 2, 3 and 4, taken substantially on the lines 5—5 of Figures 1, 2, 9 and 16, hereof; and the rear portion of the structure has been cut off from Fig. 5 to shorten the figure;

Fig. 6 shows a right-hand elevation corresponding to Figs. 1, 2, 3 and 4, and the rear portion of the structure has been cut off from Fig. 6 to shorten the figure;

Fig. 7 shows the rear portion of the structure shown in Figure 5, being a continuation of that figure;

Fig. 8 shows the rear portion of the structure shown in Figure 6, being a continuation of that figure;

Fig. 9 shows a plan view corresponding to previous figures, the left-hand or back portion of the structure being cut away to shorten the figure;

Fig. 10 shows the left-hand or back portion of the structure shown in Figure 9;

Fig. 11 shows on enlarged scale as compared to previous figures, the outer end of the counterpoise unit shown in Figures 1, 2, 6, 9 and 15;

Fig. 12 shows a horizontal section taken on the lines 12—12 of Figures 1, 11 and 13, looking in the directions of the arrows, Figure 12 being on reduced scale as compared to Figure 11;

Fig. 13 shows a vertical section taken on the line 13—13 of Figure 12, looking in the direction of the arrows, the weigh-beam being in lowered position;

Fig. 14 shows a vertical section similar to that of Figure 13, but with the weigh-beam in its raised or over-weight position;

Fig. 15 shows a transverse vertical section through the central portion of the weigher, being taken on the lines 15—15 of Figures 1, 2, 9 and 16, looking in the directions of the arrows;

Fig. 16 shows a vertical section showing the front face of the weigher hopper, but behind the weigh-beam unit itself, being taken on the lines 16—16 of Figures 5, 6, 9 and 15, looking in the directions of the arrows;

Fig. 17 shows a central vertical section through the weigh hopper, horizontal damper, and lower portion of the vertical damper, both said dampers being in closed position; and it shows the guides or rails for the leading edge lip of the horizontal damper, and related parts; being on enlarged scale as compared to previous figures;

Fig. 18 shows a half section on the line 18—18 of Figure 17 and on lines 18—18 of Figures 5, 6, 9 and 15, looking in the directions of the arrows; the leading edge portion of the pilot being in its initial or retracted position;

Fig. 19 shows a fragmentary vertical section on the lines 19—19 of Figures 17 and 20, looking in the directions of the arrows;

Fig. 20 shows a fragmentary horizontal section on the lines 20—20 of Figures 17, 18 and 19, looking in the directions of the arrows;

Fig. 21 shows a perspective view of one of the trimmer blocks of the type shown in previous figures, but on enlarged scale;

Fig. 22 shows in perspective two adjacent trimmer blocks of a slightly modified form; also on enlarged scale;

Fig. 23 shows a fragmentary detail vertical sectional view of the attachment of the hanger rod to one of the side brackets of the weigh hopper, showing the calibration numbering on the nut;

Fig. 24 shows a plan view corresponding to Figure 23;

Fig. 25 shows a side elevation of one of the Trombetta straight line motors for operation of one of the dampers, being on enlarged scale as compared to previous figures;

Fig. 26 shows an end view corresponding to Figure 25;

Fig. 27 shows a plan view corresponding to Figures 25 and 26;

Fig. 28 shows a transverse section taken on the lines 28—28 of Figures 25, 27 and 29, looking in the directions of the arrows;

Fig. 29 shows a horizontal section taken on the lines 29—29 of Figures 25, 26 and 28, looking in the directions of the arrows;

Fig. 30 shows a detail plan view of the trimmer slide of the form shown in previous figures, on enlarged scale, and in initial or non-trimming position; and it shows the ends of the trimmer blocks adjacent to the cam groove of the slide, and in their initial or un-trimmed positions;

Fig. 31 shows a side elevation corresponding to Figure 30, but not showing the trimmer blocks;

Fig. 32 shows a cross-section on the line 32—32 of Figure 30, looking in the direction of the arrows;

Fig. 33 shows a cross-section on the line 33—33 of Figure 30, looking in the direction of the arrows;

Fig. 34 shows an end view of the slide of Figures 30, 31, 32 and 33, looking towards the inner end thereof;

Fig. 35 shows a plan view of a modified form of slide in which the cam groove is so formed as to cause complete trimming movement of each block in turn, so that the rate of trimming is uniform for the entire trimming movement of the slide; the end portions of the several trimming blocks being also shown;

Fig. 36 shows a side elevation corresponding to Figure 35;

Fig. 37 shows by a series of curves the characteristic operating features of the form of slide and trimming blocks shown in Figures 30 to 34 inclusive; including curves showing the rate of trim (in cubic inches of displacement per inch of slide movement), the trimming action produced by each block, and the cubical trimming displacement occasioned in comparison to the shifted position of the slide for all movement thereof;

Fig. 38 shows a similar series of curves for the slide and trimming block arrangement shown in Figures 35 and 36, for comparison with the previous form of slide and blocks;

Fig. 39 shows a plan view of another modified form of slide and trimming blocks therefor, such that the rate of trim is greatest during the early stages of the slide movement, and said rate decreases progressively as the slide continues its trimming movement;

Fig. 40 shows a series of curves similar to the curves of Figs. 37 and 38, but for the modified form of slide and trimming blocks of Figure 39; and this figure also includes comparative curves for the previous forms of slides and trimming blocks, for comparison with the arrangement of Figure 39; and includes curves of cubical trimming displacement for all forms of slides and trimming blocks, reduced to a basis of percent of trimming movement of the slide, for ready comparison;

Fig. 41 shows a combined elevation of the weigher herein disclosed as combined with a typical form of packer to which said weigher delivers the pre-weighed batches of material; and this figure also includes a shaker-type form of feeder for feeding the material regularly and continuously to the weigher; and this figure also shows schematically an interconnection for tripping the toggle of the weigher discharge hopper bottom by the movement of the vertical bar of the packer when the operator releases said bar to institute a packing operation, to thereby release the previously pre-weighed batch of material to the packer, and to institute a fresh weighing operation, which will proceed during the packing of the so-released batch of material; Figure 41 looking towards the left-hand side or face of the weigher unit;

Fig. 42 shows a view at right angles to that of Figure 41; Figures 41 and 42 being on reduced scale as compared to other views of the weigher unit; and the packer shown in Figures 41 and 42 being of the general type disclosed in Letters Patent of the United States, No. 2,311,706, issued to me February 23, 1943;

Fig. 43 shows in perspective and more or less schematically the interconnections between the vertically movable rod of the packer unit and the pin connected to the toggle of the weigher unit to ensure breaking of said toggle for release of the pre-weighed batch for descent thereof to the packer unit;

Fig. 44 shows a detail view of the trigger end of the interconnections shown in Figure 43, whereby the toggle pin may be tripped by the upward movement of the vertically movable rod of the packer unit, and whereby said trigger and said pin may each return to its initial position independently of the other, preparatory to institution of another operation;

Fig. 45 shows a side elevation of the shaker-type feeder shown in Figures 41 and 42, but on enlarged scale, and it shows the grid for catching and retaining foreign objects which may come over with the material, and it also shows the damper whereby the rate of feed of this shaker-type feeder may be adjusted as need be;

Fig. 46 shows a side view corresponding to Figure 45, but at right angles thereto;

Fig. 47 shows a longitudinal section through a modified form of shaker-type feeder with a modified form of grid therein, being a section on the line 47—47 of Figure 48, looking in the direction of the arrows;

Figure 48 shows a front view of the modified form of shaker-type feeder and grid shown in Figure 47;

Figure 49 shows a fragmentary elevation of a modified form of hanger adjustment for the weigh-hopper, including a turnbuckle arrangement for securing the desired adjustments;

Figure 50 shows a fragmentary longitudinal section through the upper portion of the supply hopper and front panel of the weigher, provided with a modified arrangement for securing suction over the position of the trimmer when the material is being rapidly released from the supply hopper to the weigh-hopper; the vertical damper being shown in lowered or closed position, with the suction connection vented to atmosphere to thereby break the suction at such time;

Fig. 51 shows a front face view corresponding to Figure 50;

Fig. 52 shows a central longitudinal section through the supply hopper and the weigh-hopper, the vertical and horizontal dampers both being in closed positions; and this figure shows the weir and damper arrangements in the supply hopper to control flow of material to the weigh-hopper when released, and to provide for desired adjustments of such parts;

Fig. 53 shows a fragmentary cross-section taken on the line 53—53 of Figure 52, looking in the direction of the arrows;

Fig. 54 shows a plan view corresponding to Figures 52 and 53; and

Figure 55:
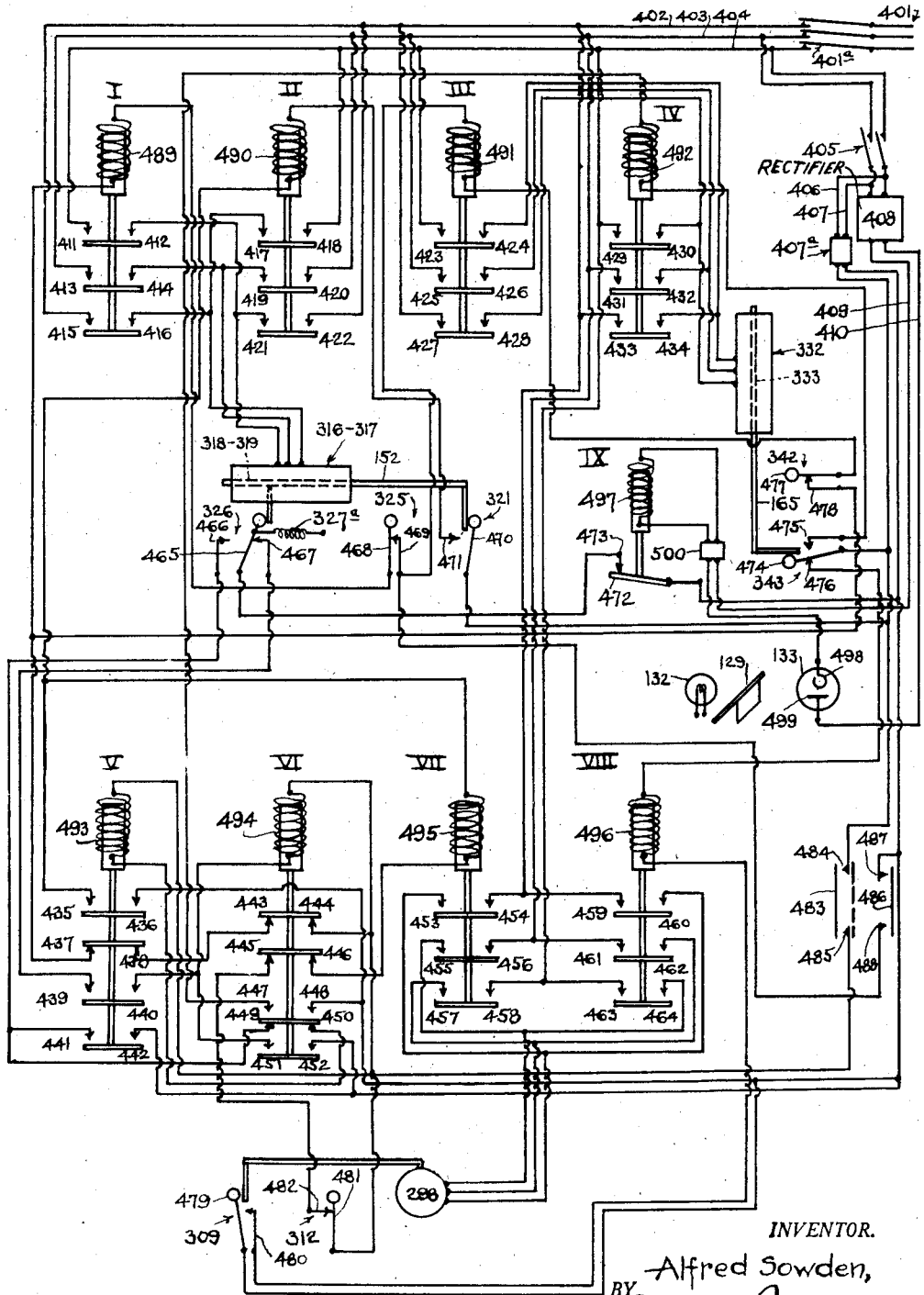

Fig. 55 shows a wiring diagram of typical circuits for the various units hereinbefore and hereinafter described, including a single electric-eye or photo-electric cell for controlling various functions in connection with the movements of the weight-beam, to effect damper movements according to over-weight conditions, and to effect operation of the trimmer, both to institute such operation and to terminate the trimming functions at proper time, etc.

I shall first describe the weigher shown in the drawings, and shall then describe more in detail one combination in which said weigher may well be used.

The weigher illustrated is conveniently shown as carried by the horizontal rails 50 and 51, supported to suitable height by the vertical posts 52, 53, 54 and 55. There is provided a weigh hopper 56 carried between the rails 50 and 51, and beyond the posts 54 and 55; said weigh hopper including the front and back walls 57 and 58, respectively, and the side walls 59 and 60, respectively. These walls are secured together in suitable manner, as by welding, to produce a rigid rectangular hopper, open at its top, and adapted to be closed in its bottom. Extending from front to rear of this weigh hopper are the shafts 61 and 62 which are journalled in the boxes such as 63 for free rocking movement. These shafts are conveniently located just outside the confines of the side walls of the weigh hopper as well shown in Figure 16, for example. Each shaft has secured thereto a blade, being the blades 64 and 65, so that by rocking the shafts into proper position these blades are brought into horizontal alignment to close the hopper bottom, and by permitting a ninety degree rock of the shafts in opposite directions the blades are permitted to swing down into vertical position to discharge the hopper contents by gravity and with a full opening of the hopper bottom.

These shafts extend forwardly from the front wall of the hopper and have secured to their front ends the angular shaped arms 66 and 67, respectively, which provide pivotal points 68 and 69 located above the horizontal plane which passes through the two shafts. The links 70 and 71 are pivoted to the points 68 and 69, and the proximate ends of said links are brought together and are jointly pivoted to a stud or pin 72 which is provided with an anti-friction roller, for convenience. Said pin and roller travel vertically between the vertical rails 73 and 74, which in turn are supported by a cross bar 75 carried by the forwardly projecting arms 76 and 77 whose inner ends are secured to the front wall of the hopper, as by welding or the like. By this means the pin and roller 72 are compelled to travel in a straight vertical path of travel. Examination of Figures 1 and 42 discloses that when the blades 64 and 65 lie in horizontal registry the pin and roller 72 lies slightly below the horizontal line connecting the pivotal points 68 and 69, so that a toggle action is produced, and no amount of load carried by the blades can serve to force said blades to swing downwardly, short of a destructive load. Still, by breaking this toggle, as by slightly raising the pin and roller from its lowermost position, the blades will be released and allowed to swing suddenly and freely down into full vertical position, to thus very quickly discharge the mass of material supported by said blades. Then, having made such discharge, the blades may be quickly restored into co-operating horizontal positions.

On the rear ends of the shafts 61 and 62 are provided the downwardly extending arms 78 and 79, which carry the counterweights 80 and 81, respectively; and examination of Figures 2, 7, 8 and 10 discloses that when the blades lie horizontally, in load carrying position, said arms extend down at an angle of substantially 30 degrees outwardly from the vertical, so that a component of force exists tending to swing and hold blades in said horizontal closed position after a load has been discharged from said blades; and when the blades have swung down into vertical position said arms lie at an angle of substantially 30 degrees above the horizontal, so that a large component of force is produced tending to restore the blades into horizontal or closed position. By proper proportioning of the masses of these counter-weights, I have made provision for ensuring that, whereas the load carried by the blades when loaded will serve to quickly cause down swing to permit discharge of the load, still, as soon as discharge has occurred, thus relieving the blades of their superincumbent load the counter-weights will quickly restore the blades to horizontal position, with corresponding down movement of the links 70 and 71, and lowering of the toggle pin and roller 72 into its toggle locking position, so that the blades and weights will thus be locked in the closed position of Figures 1 and 2, ready to receive and sustain another load of material being weighed. These movements may occur very fast and with full assurance of exactly timed functions.

The weigh hopper is supported in the following manner:

Extending across the frame and between the rails 50 and 51 are the cross members 82 and 83, which serve to tie said rails together and also to support certain parts. Extending up from these cross-members are the brackets 84 and 85 adjacent to one side of the weigh hopper, and 86 and 87 adjacent to the other side of the weigh hopper; and the weigh rods or bars 88 and 89 extend from front to back of the weigher outside the positions of these pairs of brackets, respectively. These weigh bars reach forwardly sufficiently to receive the front arms 90 and 91, respectively; and at positions in line with the brackets there are provided the inwardly reaching arms 92—93, and 94—95 on the respective weigh bars. These arms carry knife edges at their central positions which knife edges 96 rest on the brackets respectively; and the inner ends of the arms carry other knife edges 97. These latter knife edges receive and support eyelets 98 to which are connected the hangers 99 which reach downwardly adjacent to the sides of the weigh hopper. The lower ends of these hangers are extended through brackets 100 secured to the side walls of the weigh hopper, and adjustable nuts 101 are threaded onto these hangers so that the exact elevation at which the weigh hopper will be supported may be readily adjusted or calibrated by these nuts. But in any case the weight of the hopper and its contained load will be supported by these hangers. Conveniently these nuts and the brackets 100 are provided with companion markings such as shown in Figures 23 and 24 at 101 and 102 so that the vertically adjusted and calibrated position of the weigh hopper may be known by examination of these markings. The desirability of this will be more apparent hereinafter.

It will be observed that the weights of the forward extensions of the shafts 88 and 89 (in front of the bearing brackets 84 and 86) and the weights of the arms 90 and 91, lie forward of the bearing brackets 84 and 86. Consequently the load carried by the bearing brackets 84 and 86 is greater than that carried by the bearing brackets 85 and 87. To equalize the loads on all bearings both front and back, suitable masses may be secured to the rear portion of the weigh hopper.

Both of the front arms 90 and 91 are brought close together as well shown in Figures 1, 9 and 42; and the proximate ends of the arms are provided with fingers 103 and 104 which rest on suitable bearings in a common fixture 105, so that the downward pressures of both arms, and therefore from the entire weigh-hopper, are communicated to this fixture. Said fixture is connected by a link 106 to the knife edge 107 on a beam 108, one end of which is provided with the knife edge 109 supported by a link 110 carried by a stationary part; and the other end of which beam is provided with a knife edge 111 which receives the lower end of the link 112 reaching upwardly into the weigh beam housing presently to be described.

It is thus apparent that the full load of the weigh-hopper is ultimately communicated to the link 112 through suitable mechanical advantage as determined by the several lever arm and link connections, the exact value of which mechanical advantage is of course a matter of detailed design.

Secured to the front rail 50 are the two upwardly extending brackets 113 and 114 the upper ends of which reach forwardly; and the weigh housing 115 is carried by these upper ends. Within this housing is the weigh beam 116, suspended by the bracket 117 from the top of said housing. The link 112 connects to this weigh beam by the knife edge 118; and the weights 119 and 120 are slidably mounted on the weigh beam in the usual manner. The usual setting weight 121 is also provided to bring the weigh beam to correct zero position depending on the weight of the weigh-hopper and connected parts. Above the housing 115 is mounted the electric-eye flag beam housing 122. Within this housing is the beam 123 pivoted at the point 124; and a counterweight 125 carried by this beam 123 is provided as usual. There is a vertical partition 126 in the housing 122 and establishing a compartment in the right-hand end of said housing; and this compartment is filled with oil up to a level close to the upper end of said partition. A dampening blade 127 extends down into this oil bath, and by turning this blade to any axial position as desired, the swinging of the beam 123 will be accompanied by movement of this blade through the oil in the bath, producing a dampening resistance depending on the axially adjusted position of the blade, but never preventing the beam from coming to its balance position. This beam is connected to the beam 116 by the chain or other link 128, so that movements of the beam 116 are accompanied by like movements of the beam 123, which latter are dampened by the oil bath as explained above. The beam 123 carries a light-beam flag 129 by which certain electric controls to be presently described are effected. At this point it is noted that there are provided the upstanding posts 131 and 130 at opposite sides of the housing, which posts carry the light source 132 and the photo-electric cell 133, respectively, so that interruption of the light beam from the source 132 will affect the photo-electric cell in well understood manner. Of course the housing 122 is provided with suitable windows to pass the light beam from said source.

The light source 132 and the photo-electric cell unit 133 are vertically adjustable so that exact functioning of the cell 133 will be ensured at the correct time in the weigh-beam's movements. Now it will be noted that when the weigh-hopper is light or insufficiently loaded, the weigh-beams 116 and 123 will both stand below their neutral or cut-off positions, and as the load in the weigh-hopper rises these beams will commence to rise, passing the neutral or cut-off position, and then rising above such position as an over-weight is established in the hopper.

Adjacent to the right-hand end of the weigh-beam 116 and connected to the housing 115 is the housing extension 134. Within this housing extension is the cylindrical chamber 135 having the flange 115ᵃ. This flange 115ᵃ is provided with slotted openings 115ᵇ to receive suitable tap screws or bolts, which pass through said slotted openings into the housing 115. By this means it is possible to adjust the exact elevation at which this extension 134 is connected to the housing 115. The housing 115 has an opening in alignment with the tubular member 136 which is snugly slidably mounted in said chamber 135 so that said member 136 can be adjusted endwise in said chamber 135. Thus the chamber 135 and the tubular member 136 can be adjusted vertically with respect to the housing 115, and the tubular member 136 can also be adjusted in or out with respect to the housing.

A small tube 137 is located within the tubular member 136, said tube being provided with oppositely located indentations to receive the inner ends of journal pins 138 and 139, which pins 138 and 139 are threaded through the member 136, and also pass through slotted openings 140 and 141 of the chamber 135. By this means the tube 137 may be brought to a nice rocking adjustment and journalling support, while at the same time permitting the member 136 and therefore the tube 137 to be adjusted back and forth with respect to the end of the weigh-beam 116. This small tube 137 carries a small amount of heavy liquid 142ᵃ such as mercury, so that as said tube is rocked on its pivotal support such liquid will shift back and forth in the tube so as to provide a counter-poise for the weigh-beam as will now be explained.

Secured to the inner end of the small tube 137 is the fixture 142, conveniently in the form of a sleeve slightly larger than the tube itself, and cemented to the tube in convenient manner as by suitable cementing agent. This fixture carries the two wire extensions 143 and 144, one above the other; and the end of the weigh beam 116 carries the extension 145 adapted to engage these wire extensions. Examining of Figures 13 and 14 will now show that the following relationships exist:

When the weigh beam is light (standing below its neutral position, and as shown in Figure 13) the beam extension 145 lies beneath the wire extension 143, the small tube having been tilted into the position of Figure 13, wherein the mercury has shifted to the left-hand end of said tube. Then, as load comes into the weigh hopper, finally the weigh beam will rise, reaching a substantially horizontal position; but prior to that time the weigh beam extension 145 will engage the wire extension 143, thus imposing on the weigh beam a counter-poise weight depending on the mercury in the tube; and only when that counter-poise weight has been overcome, representing a desired amount of over-weight in the weigh hopper, will the weigh beam be able to overcome the resistance imposed by the counter-poise. Then the tube 137 will rock into the position of Figure 14, causing the mercury to shift to the right-hand end of the small tube, and permitting the weigh beam extension 145 to move past the wire extension 143 as evident from examination of Figure 14. Thus the counter-poise has accomplished its function of compelling the weigh hopper to assume an over-load before the weigh beam is able to move upwardly beyond its neutral position. When, thereafter trimming out commences, with corresponding reduction of weight in the weigh hopper, the weigh beam will finally move down towards and to the neutral position where cut-off is desired for exact prescribed weight; and it will be noted from examination of Figure 14 that this condition is reached while the mercury still stands in the right-hand end of the tube 137, and while said tube still stands in the rocked position of Figure 14. Thus, the final and exact weight is reached without interference from the counter-poise. When, thereafter the weigh hopper is discharged as already explained, the weigh beam will fall to the position of Figure 13, thus restoring the counterpoise tube and mercury therein to the position of Figure 13, ready to assure that the next weighing operation will include the supply of an overweight of material to the weigh hopper.

As a detail of construction it is noted that the righthand end of the tube 137 reaches out through a vertical slotted opening 146 in the end wall 147 of the cylindrical member 136; and that a light plate 148 is secured to said end wall by the adjustment screws 149 extending through the slots 150. This plate 148 carries a lug 151 constituting a rest against which the outer end of the tube reposes when in the position of Figure 14. Said rest 151 may be slightly padded as shown to afford protection to the tube which is generally of fragile material such as glass.

It will be noted that the vertical adjustability of the end plate 148, and the rest lug 151 makes it possible to adjust the exact position in which the tube 137 will come to rest when overbalanced into the position of Figure 14. Thus it is possible to bring the parts to correct positioning as regards the relation of the wire extensions 143 and 144 in relation to the weigh-beam extension 145 so that correct engagement and disengagement of the counter-poise with the weigh-beam will be assured.

It is here noted that by provision of the vertical adjustability of the light source and photoelectric cell with respect to the flag carrying beam 123, and by adjustability of the cylindrical member 136 in and out with respect to the weigh beam, I am able to bring the parts to an exactly adjusted condition so that the final cut-off produced by the flagging of the light-beam during the downward movement of the weigh-beam to the position of Figure 14, will be very exactly calibrated.

Reference to Figures 1, 2, 5, 6, 9, 15, 16, 17, 18, 19 and 20 discloses the horizontal damper 152 which is mounted for horizontal sliding movement across the upper portion of the weigh hopper. This horizontal damper is conveniently carried by tracks which engage its side edges, in the form of angles 153 and 154, which are carried by the lower edges of the stiff rails 155 and 156 mounted in the frame of the machine. These rails are located just beneath the lower edges of the side walls 157 and 158 of a supply hopper 159 directly above the weigh hopper location. This supply hopper includes the front wall 160 extending between the side walls of the hopper, and conveniently carried to the left-hand of the side wall 157 so as to afford support for certain other elements presently to be explained; and this supply hopper also includes the back wall 161 which slants downwardly towards the horizontal damper and finally extends vertically for a short distance as shown at 162 to meet the horizontal damper itself. Thus the supply hopper is of contracting size from top to bottom, measured from back to front, but is of uniform width throughout its height.

There is a partition 163 extending across this supply hopper somewhat to the rear of the front wall 160, whereby there is established a venting chamber or section 164 in the front portion of the supply hopper, which venting chamber is of full width of the supply hopper; and in the lower portion of this venting chamber are located the trimming elements presently to be described.

Slidably mounted on the front face of the wall 160 is the vertical damper 165. It is here noted that the lower edge of the wall 160 lies above the elevation of the horizontal damper 152 so that communication is established between the space within the supply hopper and the space in front of and beneath said wall; and it is also here noted that said front wall lies to the rear of the front wall 57 of the weigh hopper beneath, so that there is provided an open space above the front portion of the weigh hopper and in advance of said front wall 160. This fact is well shown in Figures 5, 6, 15 and 17. When the horizontal and vertical dampers are both closed (horizontal damper projected forwardly and vertical damper lowered) it is seen that these dampers come substantially together edge to edge, thereby closing off the supply hopper from the weigh hopper beneath; whereas when these dampers are both opened (horizontal damper drawn backwardly and vertical damper raised) a large and full communication is established between the supply hopper and the weigh hopper beneath, so that material can drop from the supply hopper almost instantaneously into the weigh hopper and with a relatively small distance of drop; and furthermore, when the weigh hopper is cut off from the supply hopper by projecting the damper 152 forwardly, with the vertical damper still open or raised, supply of material into the weigh hopper will be substantially discontinued, as little if any material can flow past the lower end of the partition 163 into the weigh hopper. It is to be noted, however, that during the previous operation, when the horizontal damper was fully opened, such an amount of material was permitted to flow into the weigh hopper that the elevation or top surface of said material stood somewhat above the elevation of the horizontal damper, even in that portion of the weigh hopper in advance of the position of the partition 163, and therefore also in advance of the path of downward movement of the vertical damper. Therefore, when the vertical damper is left open or raised for a time interval after closing of the horizontal damper there will remain in the weigh hopper a body of material lying in advance of the position of the vertical damper and above the elevation of the horizontal damper.

When the horizontal damper is closed by forward projection as previously explained, that material lying above said horizontal damper will be received on the top face of said damper and will be sustained by said damper, so that the weight of such material will not be imposed on the weigh hopper itself. But there will still remain in advance of the leading edge of the horizontal damper, and sustained by the weigh hopper a body of material lying above the plane of the horizontal damper, and constituting a portion of the load being sustained by the weigh hopper itself. From this body of material I trim back such portion as may be necessary to restore the weight in the weigh hopper to the exact value which is pre-determined; pressing or trimming such excess material back onto the top face of the previously closed horizontal damper, and thus relieving the weigh hopper of such excess material, and also at the same time placing said trimmed material into position in the supply hopper where it may comprise a portion of the body of material to be delivered into the weigh hopper during the next succeeding weighing operation.

Conveniently the vertical partition 163 may be provided with a vertically adjustable slide 166 which may be set to the desired elevation to establish a plane of cut-off for the natural flow of material from the body of the supply hopper into the front portion of the weigh hopper and in advance of said partition, depending on the natural angle of repose of the material being handled.

The partition 163 is horizontally adjustable to adjust the thickness of the chamber 164 and to further adjust the position of the plane of cut-off established by the lower edge of the slide 166. This horizontal adjustability of the partition 163 is made possible by the brackets 163ª clamped to the side walls 157 and 158, said brackets being connected to the partition by pins 163ᵇ extending through slots of the side walls.

Now during the closing movement of the horizontal damper, forwardly, the elevation of the leading edge of that damper will establish the elevation of plane of cut-off of the material left in the weigh hopper along the path of damper travel; and if the leading edge of that damper were exactly in alignment with the body portion of said damper it is evident that the material within the weigh hopper might press slightly up against the bottom face of that damper as the weigh hopper rose slightly during the trimming operation. This would interfere with accurate weighing. For this and other reasons I have made provision for causing said leading edge of the horizontal damper to be slightly tilted during the major portion of the closing movement of the damper, which means I shall now explain, for which purpose reference may be had especially to Figures 17, 18, 19 and 20 hereof. There the leading edge of the damper 152 is seen to be provided with a hinged lip 167 which will, unless supported, naturally fall to an angle with respect to the normal plane of the damper proper. Supported by the side walls of the supply hopper, or by the rails 155 and 156 already referred to, are the vertically adjustable horizontal tracks 168 (one at each side of the hopper), only one of which is shown in Figures 17 to 20. Each of these tracks is provided with a vertical extension 169 which lies to the outside of and against the outer face of the supply hopper wall, and these tracks may be vertically adjusted by means of fastening screws or the like 170 extending through slots of said extensions 169. These tracks receive and sustain the outer edge portions of the lip 167, so that by adjusting the elevations of these tracks the horizon or plane at which the leading edge of the lip 167 will travel during damper closing movement, may be adjusted. For example, in Figure 17 I have shown the lip as being sustained in the dotted line position during the major portion of the damper closing movement. It will thus be evident that during the major portion of the damper closing movement there will be a cut-off of material retained within the weigh hopper as determined by the elevations of these tracks 168, leaving a small space between the top surface of the material in the weigh hopper and the bottom face of the damper.

It is desirable to restore the lip 167 to the exact level of the body of the damper just prior to completion of the closing movement; such action being desired, for example, in order that when the vertical damper comes down to its closing position it will exactly meet the leading edge of the horizontal damper which at that time stands in closed position. To ensure such restoration of the lip to planar registry with the body of the damper I have provided the supplemental tracks (one at each side of the supply hopper), 171, only one of which is shown in Figures 17 to 20. These tracks 171 slant upwardly from the supporting plates 172 which have the side upward extensions 173 which rest against the side faces of the supply hopper walls or the rails 155 and 156. These slanting supplemental tracks 171 are slotted at 174 to receive the front ends of the tracks 168 so that shortly prior to completion of the forward or closing movement of the horizontal damper the lip 167 will rise onto these slanting tracks 171 and thus said lip will be restored to horizontal position and in alignment with the body of the damper. This final or closed damper position is shown by the full lines in Figure 17.

It will now be evident also that by setting this track arrangement to the desired elevation it is possible to secure a pre-determined amount of volumetric trimming action during the damper closing movement, and prior to the final weigh trimming. I have also provided in the back portion of the weigh-hopper the false partition 174ª in the form of a flexible sheet metal plate of substantially the same width and height as the weigh-hopper itself, said plate having at its top edge the hooks 175 by which its top edge may be connected to the top edge of the weigh-hopper; and the lower edge portion of this plate is slightly reversed as shown at 176 in Figure 17 to come close to the face of the back wall of the hopper. A pair of screw bolts or the like 177 are threaded through the back wall of the weigh-hopper and serve to establish abutments to limit the backward movement of the plate 174ª when the weighing hopper is filled with material. Thus the volumetric capacity of the weigh-hopper may be varied and calibrated to secure a pre-determined volumetric trimming action when the horizontal damper is closed, and for a given cut-off condition as established by the elevations of the tracks 168, and also as established by the vertical adjustment of the weigh hopper by setting of the hangers shown in Figures 23 and 24, etc. It is here noted that the present machines are intended for automatic weighing of various materials, such as flour, bran, shorts, and various other materials, which have various values of specific gravity, or weight per cubic foot. Therefore, when pre-weighing specified masses of these various materials, for example 100 pound batches, the volume to be provided for in the weigh hopper should be adjusted according to the material being handled, and in order to accommodate the specified material, keeping in mind also that it is desired to provide for a proper cut-off along the top surface of the batch contained in the weigh hopper by means of the lip 167, as already explained.

When the horizontal damper reaches its closed position, and prior to trimming action the top surface of the material contained in the weigh hopper and above the horizontal damper will substantially as shown by the broken line 178 in Figures 15 and 17. That portion of this material lying directly above the horizontal damper is sustained by said damper, but that portion lying in advance of said damper is sustained by the weigh hopper, and a portion thereof is to be trimmed back to finish the trimming action. I shall now describe that operation, and the means whereby it is produced.

I have provided a transversely movable trimmer and pilot which operates over and adjacent to the front portion of the horizontal damper when said damper is closed (forward). Generally speaking this trimming and pilot device includes an angular plate which can be moved across the front edge portion of the horizontal damper to establish a pilot space as it progresses, said plate being shown at 179 in Figures 5, 9, 15 and 16. This plate extends outwardly towards the left-hand side of the weigher, working through a suitably shaped slot or groove in the side wall of the supply hopper, as well shown in Figures 5 and 15. The back and vertical face of this pilot element serves, as the pilot moves towards the right during the trimming action, to co-operate with the top face of the horizontal damper to establish a vertical partition moving along over said damper, and to establish a top or roof over the space thus defined by the pilot and damper. The right-hand or leading edge of this pilot is provided with a pivoted or hinged plate 180 which hangs down against the top face of the horizontal damper and acts as a shovel to push the material in its path to the right over the face of the damper, thus vacating a space beneath said pilot as it travels along, and moving the material out of said space to provide a space into which material to be trimmed may be received on the top face of the horizontal damper.

As this plate or shovel 180 is moved towards the right in Figs. 16 and 18 due to movement of the trimmer slide said plate 180 displaces the material upwardly in its path of movement. To ensure that this material shall be forced back onto the horizontal damper instead of merely falling into the forward portion of the weigh-hopper, or being forced thereinto, I have shown the vertical side guard or extension 180ᵃ on this shovel, same extending ahead of the shovel proper, and lying at the forward edge of the shovel, so that movement of the pilot and shovel towards the right will cause the material as it rides up plate 180, to roll off guard 180ᵃ and across the plate 180 onto the top face of the horizontal damper in the manner of a plowing action. Thus the burden in the weigh-hopper will not be disturbed by such shovelled material.

In order to accommodate this material pushed to the right by the movement of the pilot I have provided an extension 181 on the right-hand wall of the supply-hopper and in line with the path of travel of the pilot, said extension being conveniently formed of a sheet metal element attached to the right-hand wall of the hopper and around a suitable opening in said wall. This extension is also preferably closed in its top, for a reason to be presently apparent.

The front wall 57 of the weigh-hopper is provided with a downwardly extending recess 182 which is of width to accommodate the trimming blocks presently to be explained during their trimming movements; and this recess is of net depth sufficient to accommodate said trimming blocks, keeping in mind the fact, as will soon be seen that said blocks have their lower edges substantially in alignment with the plane of the horizontal damper. Now it will be remembered that the weigh-hopper itself is vertically adjustable slightly, or to whatever amount may be desired by means of hangers and connections shown in Figures 23 and 24; and such vertical adjustability will respond in displacement of the lower edge of the recess 182 with respect to the damper horizon. I have therefore provided the plate 183 which may be secured to the front wall of the weigh-hopper immediately along the lower portion of the recess 182, screw and slot connections 184 and 185 being provided to hold this plate in position on the weigh-hopper, while permitting of such vertical adjustment as may be required. (See Figure 16.) Thus the lower edge or lip of the recess formed by plate 182 may be readily adjusted to compensate for the vertical adjustments of the weigh-hopper on its hangers and to bring said lower edge into correct relationship to the horizontally movable damper.

Mounted on the front rail 50 or other convenient support is the trimming block carrier or guide including the bottom block 186, the right and left-hand side blocks 187 and 188, and the top plate 189. Slidably mounted in this holder or guide are the trimming blocks 190, which are thus capable of sliding movement transversely of the rail, and therefore towards and away from the weigh hopper, horizontal damper, etc. In the form of trimmer shown in Figures 1 to 20 there are seven of these trimming blocks, but, as will presently appear other schemes may be adopted or used as desired. These blocks are conveniently provided on their front faces with sheets or plates such as shown at 191 in Figures 15 and 21, which plates extend down to a location slightly lower than the bottom faces of the trimming blocks, providing lips which may contact with or come close to the inner face of the front wall of the weigh hopper or the lower edge of the recess 182 thereof as defined by the setting of the plate 183. The end blocks may also be provided with similar end plates overlapping the sides of the recess 182 when said blocks are retracted. Such blocks are shown in Figure 22 hereof. Thus these plates or lips serve to ensure relatively close and material proof closure of the recess of the front wall of the weigh hopper when the trimming blocks are in their outward-most or non-trimming positions. Then, as these blocks are moved inwardly during trimming operation these lips serve to press the material trimmed ahead of them and into the space vacated by the pilot, and above the horizontal damper.

These trimming blocks are of sufficient length, that is, measured from front to back of the weigher, to provide for the full trimming movement with sufficient additional block length to properly hold and retain the blocks under control. That inward movement for which provision has been made is such as to bring each block's inner end face from a position just inside of the front wall of the weigh hopper to a position close to the vertical position of the vertical damper when said damper is closed (down). Such movement will carry these blocks from the position shown in Figures 5, 6, 9 and 15 to a position slightly to the right of the damper position 165 shown in Figure 5. These trimming blocks are to be moved in harmony with the transverse movement of the pilot, and I shall now explain the means whereby this result is secured.

To the left-hand end portion of the pilot element there is secured a trimmer slide including the side angles 192 and 193 which provide the downwardly facing groove 194 between them. To secure said two elements, a portion of the left-hand end of the pilot element (see bottom of Fig. 9) is carried forwardly or to the right in Figs. 5 and 9 exterior to the wall 160, the lower edges of these angles being secured to such forwardly extending portion by welding or the like; and then to the top faces of these angles there is secured by welding or otherwise the top plate 195. Thus, as the pilot moves across the weigher during trimming, this slide providing the groove 194 also makes corresponding movement. The right-hand portion of this grooved slide is bent forwardly at an angle as shown in Figures 9 and 30 to provide a cam action; and each of the trimming blocks is provided with an upwardly extending pin 196 which is engaged by the slide's groove to cause inward movement of the trimming block under the proper control. These pins 196 are preferably provided with anti-friction rollers 197 which engage the walls of the groove. In the form of trimming block shown in Figures 6, 15 and 21 the upper inner corners of the trimming blocks are shown as notched at 198, this being done to provide clearances for the slide moving rack, presently to be described.

Examination of Figure 30 in particular shows that the right-hand ends of the angles are provided with the bent or deflected portions 199 and 200, these together constituting "gathering means" to ensure correct engagement of the slide's groove with each trimming block pin as the lateral movement of the slide progresses. In the form of trimmer shown in Figures 1 to 23, and 30 to 34 inclusive, it will be seen that the angle of the trimmer moving portion of the slide is such that when trimming movement commences the first block 201 will first be engaged, and its movement will commence, and that then block 202 will also be engaged and its movement will commence, block 201 still undergoing movement, and that then block 203 will be engaged, blocks 201 and 202 still being engaged and moving; and that this increasing action will continue until the first five blocks, including 203, 204 and 205 are all moving inwardly to produce trimming action. Thereafter block 201 will have completed its inward or trimming movement, so that further slide movement towards the right will not produce any further trimming movement of this block; but then the next block, 206 will be engaged by the slide, then block 202 will cease movement, then block 207 will commence movement, then block 203 will cease movement, and thereafter blocks 204, 205, 206 and 207 will, in turn complete their inward movements.

Reference to Figure 37 shows the characteristic operating features of the trimmer construction just explained. In this figure the curve or trace 208 for each block shows the trimming action produced by such block, these traces being indicated with the suffixes "a," "b," "c," "d," "e," "f" and "g" for the seven trimming blocks respectively. The manner in which the trimming actions of these blocks overlap is there well shown. Trace 209 shows the accumulated action of all these blocks being acted on at any given position in the travel of the slide across the weigher. Figure 37 also shows, by the trace 210 the volumetric displacement which is produced during the entire trimming action of this form of trimmer, this trace rising continually from the beginning of the trimming action until complete traverse has been accomplished. It will be noted that the slant of this trace 210 is a measure of the rate of trim, estimated on the basis of cubical displacement per inch of slide travel; and it will be noted that this curve rises at an increasing rate during the early portion of the slide movement; then remains substantially constant in angle of rise, and thereafter rises at a decreasing rate until completion of the trimming action. In other words, with this form of trimmer I have made provision for a rising rate of trim during the early stages of slide movement, followed by a substantially constant rate of trim during the intermediate stages of slide movement, followed by a decreasing rate of trim during the later stages of slide movement. The trimmer shown and considered above has been designed to provide for a given total trimming capacity, as determined by the designer.

At this point I shall describe certain modified forms of trimmer herein disclosed as follows:

In Figures 35 and 36 I have shown a trimmer including blocks of the same form as those to which Figures 30 to 34, inclusive refer; but in the case of Figures 35 and 36 I have modified the slide so that the cam action of the right-hand portion of the slide is much increased, so that full inward movement of each trimming block is produced just as the next block is taken up by the slide; and thus a substantially constant rate of trim is produced. Each block in turn is more quickly shifted inwardly, and reaches its full inward position just as the next succeeding block is taken up. In Figure 38 I have shown the characteristic operating features of this modified form of trimmer; and therein the traces 211 ("a," "b," "c," "d," "e," "f" and "g," for the several blocks) each complete full action prior to commencement of the action of the next. Consequently the rate of trim as shown by the trace 212 is constant; and the slant of the line 213 representing the volumetric displacement is constant, meaning that the rate of trimming action for each succeeding inch of slide movement is constant.

In Figure 39 I have shown still another modified form of trimmer arrangement, giving another form of characteristic. In this case I have provided three trimming blocks 214, 215 and 216; but these blocks are shown as being of progressively lesser width. The block 214 is substantially eight inches wide, the block 215 is substantially four inches wide, and the block 216 is substantially two inches wide, a total of fourteen inches, being of combined width the same as that of the seven blocks of the previously described arrangements. The pins 217, 218 and 219 for these three blocks are set at uniform spacing so that as each block completes its full inward movement the next block commences its movement, but due to the lesser width of such succeeding block the rate of trim, measured in cubic inches of displacement per inch of transverse movement of the slide, is reduced. In other words, this arrangement gives a high rate of displacement or trim during the early stages of slide movement, followed by successive reductions of said rate of trim.

In Figure 40 I have shown, by the traces 220 ("a," "b" and "c") the several displacements occasioned by the several blocks 214, 215 and 216; by the trace 221 I have shown the rate of displacement or trim as the movement of the slide progresses; and by the trace 222 I have shown the volumetric displacement accumulated as the slide moves across the weigher. It is noted that this latter trace starts with a high slant or rate of trim, followed by a reduced slant or rate of trim in successive stages.

In Figure 40 I have also shown a comparison of the characteristics of the three forms of trimmer heretofore described, by means of the traces 223, 224, and 225, respectively. Since the forms of trimmer illustrated in the several figures have been designed for different total amounts of slide movement, in Figure 40 and in traces 223, 224 and 225 thereof I have reduced these traces to a comparative basis on the basis of percent trimmer slide movement, for comparison. It will be noted that the form of Figure 39 gives the fastest rate of trim in the early stages thereof, followed by reduced rates of trim in later stages.

At this point I wish to point out that whenever a trimming block commences to move inwardly for its trimming action, the pilot element should have shifted towards the right sufficiently to provide a vacant space into which the trimmer block may move its trimmed material. Consequently, I have shown in the trimmer form of Figure 39 an initial amount of slide movement, indicated between the positions 226 and 227 during which no action on the trimming blocks occurs, while nevertheless the pilot is being moved laterally to clear a space into which material from the trimming blocks will soon be received. Thus provision has been made for the trimming action and material trimmed by the first, large block 214 of this form of trimmer. In Figure 39 the position of the plate 180 at commencement of inward movement of the trimming block 214 is shown by means of the broken lines 228.

It is noted that in each of the forms of slide herein disclosed there is provided a longitudinally extending slot 229 which provides clearance for the vertical damper 165 when said damper is lowered after completion of the trimming operation, as will be presently explained herein.

In order to provide for proper support and guidance of the trimmer slide and pilot element the following construction is herein shown:

Extending along the lower edge of the front wall 160 I have provided the tubular trackway 230 in the form of a length of tubing slotted along its lower or downwardly facing surface. The slide element is then provided with a series of studs or pins 231 which extend upwardly into this tubular track, through the slot thereof, the upper ends of said studs or pins being enlarged to provide support for the slide which travels laterally. This tubular trackway extends part way across the width of the supply hopper, as shown in Figures 1 and 16; and since material being handled will find its way into this trackway I have provided for shedding such material by the usual movements of the slide itself. This means takes the form of lateral notches or enlargements 232 in the slot of said trackway, so that as the advancing pins come along they will naturally force any accumulated material out and down therethrough. In addition thereto, the right-hand end of said tubular trackway may be left open.

Along the lower face of the slide I have provided a rack element 233 which may be engaged by a suitable pinion to shift the slide laterally during trimming operations, and for return of said slide, as will presently appear hereinafter.

It will now be apparent that in each of the forms of trimmer herein disclosed the following actions will occur: when trimming commences the slide moves towards the right, when viewing the machine as in Figures 1 and 16. During this operation the vertical damper is still in its raised or open position. As slide movement towards the right continues the plate 180 creates a space above the horizontal damper and in position to receive trimmed material shifted backwardly by the trimming blocks, being material from beneath the surface 170 shown in Figure 17. Such trimmed material's weight is transferred from the weigh hopper to the horizontal damper, so that the sustained burden on the weigh hopper decreases, until finally the weight is reduced to the exact amount for which operation is intended. Thereupon further trimming movement of the slide ceases, and immediately thereafter the vertical damper is lowered to full closed position, co-operating with the horizontal damper, and the trimmed material is thus trapped behind the vertical damper and above the horizontal damper, leaving exactly the correct weight of material within the weigh hopper.

It is noted that since the final trimming stages are to be accurately controlled and since the rate of trim should be as high as possible, the rate of trim may be made large in the early stages wherein "roughing" is performed, followed by a reduced rate of trim during the final stages wherein exactly the correct point of cut-off should be attained.

Now it is noted that after trimming has been completed, the toggle is broken to permit the blades 64 and 65 to swing down for sudden delivery of the pre-weighed batch to the receiving device, in this case the packer element. In Figures 1, 2, 5, 6, 9 and 15 I have shown delivery from the weigh hopper as occuring directly to the chute 234. This chute is of larger cross-section than that of the bottom of the weigh hopper, and the sides of this chute are shown as being drawn inwardly towards the side walls of the weigh hopper (see Figures 1, 2 and 16). In Figures 41 and 42 I have shown said chute as extending down to the inlet hood 235 of the packer therein shown, and which will be further considered hereinafter.

Now it will be noted that when the horizontal damper (and also the vertical damper) are drawn quickly to open positions to permit material to rush into the previously emptied weigh hopper there will be considerable turbulence and agitation of the in-moving material as said material moves downwards along the back wall 161 of the supply hopper and swings forwardly in the weigh hopper against the front wall 57 of the weigh hopper. This agitation will also be enhanced by the trimming movements of the blocks 190 which occur as soon as the horizontal damper 152 has been closed (overweight having been established). Also the air in the forward portion of the weigh hopper should be drawn up to enable such incoming material to move easily into and occupy the desired space in the weigh hopper. It is therefore desirable to effect some reduction of air pressure in the upper portion of the venting space 164 while the horizontal (and vertical dampers) are open.

To effect the foregoing result I prefer to provide a hood 236 over the upper end of the space 164 (see Figures 15 and 16), there being a central opening 236ª in said hood, and I connect the inlet of a centrifugal fan 237 to said central opening so that by suddenly bringing said fan into operation when the horizontal and vertical dampers are opened a slight reduction of air pressure and suction is created in the space 164 as already explained. The delivery side of this fan may connect back into the upper portion of the supply hopper, behind the partition 163, as shown in Figure 15; the top of the said portion of supply hopper being suitably hooded as shown at 238, such hood being provided with the opening 239 to receive the fan delivery connection, as shown in Figure 15.

With the foregoing arrangement it will be seen that when venting occurs, the air is suddenly drawn up through the space 164 of the supply hopper, carrying with it some entrained material, and said air and material are at once restored to the space within the supply hopper but behind the partition 163 where the air may be taken care of, and where such entrained material will be restored to the body of material to be afterwards passed through the machine. A suitable hood may be provided over the space above the weigh hopper and in front of the wall 160, if desired, and around the trimmer; as for example, by means of canvas or other suitable cloth of desire flexibility. The motor for driving the fan 237 is shown at 245, of the series type for quick acceleration. The air current thus drawn up from the front portion of the weigh hopper during the improvement of fresh material thereinto will assist movement of such material towards the front portion of the weigh hopper.

In Figure 22 I have shown a modified form of trimmer block in which the block 246 is provided with the cam groove engaging pin 247, having the anti-friction roller 248; but in this case the transverse groove, such as 198 of Figure 21, has been left out, the block of Figure 22 being intended for use under conditions in which the trimmer slide rack bar does not intercept the block when said block is in fully trimmed position. Furthermore, in Figure 22 I have shown two blocks, side by side, and a number of other blocks might be located between these two end blocks; said end blocks being provided with the end plates 249 which overlap the side faces of said blocks for engagement with the sides of the recess 182 of the front wall of the weigher hopper.

Means are provided for feeding material to the supply hopper at a rate sugstantially equal to the average demand for the material, so that the elevation of said material within the supply hopper rises and falls periodically, but maintains an average height of substantially uniform horizon. In Figure 41 I have shown a shaker-type feeder for effecting such continuous supply, the details of such feeder being shown in Figures 45 and 46. Said shaker-feeder includes the shaker pan 250 slanting from its rear end 251 downwardly to its delivery lip or spout 252. This pan is suspended by the flexible hangers 253 which are carried by the over-head beams 254 and 255. These hangers at their lower ends have the cross members 256 on which the pan is directly mounted, so that lateral swinging or shaking of the pan is permitted, due to flex of the hangers, but forward and back rigidity is provided by said hangers, retaining the pan in definite position measured left to right in Figure 45. Thus the position of delivery of the spout remains unchanged in one direction.

Secured to the beam 254 is the bracket 257 which carries the motor 258; and said motor drives the eccentrically mounted bodies 259 and 260 journalled to the brackets 261 and 262 on the side of the shaker pan or on the lower ends of the hangers at one side of the pan. Such drive is effected by the belt 263 in usual manner, well understood in the art; and when the speed of rotation reaches the natural period of such mass, or a rate greater than such natural period, the eccentric mass commences to rotate on its eccentric center, causing the pan to vibrate laterally in well understood manner.

Material is supplied to said pan by gravity from the chute 264, extending down between the beams, and supplied from a bin at higher elevation. This chute 264 is provided with a skirt 265 around its lower portion, said skirt reaching down into the pan 250 and close to the floor thereof; and said skirt may be sustained by the end sheets 266 and 267 which have their upper ends connected to and rolled about the rollers 268 and 269, which rollers are provided with the hand cranks 270 and 271 by which the elevation of the skirt may be adjusted. The sides of the skirt may be carried by the top side rails 265ª which thus serve to prevent the skirt from sagging too much between its end supports or sheets 266 and 267.

The floor of the pan slants downwardly at such an angle that as said pan is shaken the material on the floor of the pan works downwardly towards the delivery lip; and by adjustment of the elevation of the skirt such moving material will not be interfered with by the skirt, but the lower edge of the skirt will make easy contact with the surface of the advancing material in the pan. I have, however, provided a damper or slide 272 carried by the pan near its delivery lip; and by setting this slide to the correct elevation the advancing body of material in the pan will be cut off at the horizon or elevation determined by the lower edge of such slide, thus making it possible to adjust the thickness of the layer of material delivered to the lip of the pan, and accordingly to adjust the rate of material delivery in cubic feet per hour, or the equivalent.

In order to intercept any foreign bodies coming down the chute and past the lower edge of the skirt, I have provided the grating or grid including the vertical teeth 273 which extend up from the floor of the pan and reach into the skirt at a position between the skirt and the front face of the chute 264, as well shown in Figures 45 and 46. Removal of such foreign bodies may also be facilitated by provision of the band openings or holes 274 in the front wall of the chute just above the skirt elevation, and which openings are normally closed by the slide 275 carried by the front wall of the chute.

Now the delivery lip of the shaker-pan lies directly over the supply hopper of the weigher, as well shown in Figure 41. When a hood such as 238 is provided over the supply hopper to assist the action of venting during delivery of fresh material into the weigh hopper, said hood may be terminated clear or short of the rear edge of said supply hopper, so as to permit of proper inflow of the material from the shaker-pan.

Reference may now be had to Figures 41 and 42 which also show a typical packer to which the pre-weighed batches are delivered in synchronous and harmonious manner. The packer here shown is fully disclosed in Letters Patent of the United States, No. 2,311,706, issued to me February 23, 1943; and it includes the stationary or fixed tube 276 to which the batch of pre-weighed material coming down the chute 234 is first delivered. There is also provided a telescoping tube 277 which may rise up within the tube 276 during the packing operation; the bag being supported around the location of the tube 277 and suspended from the lower end of the tube 276. As the packing operation, performed by an auger 278ª carried by a vertical shaft 278 within the tubes, proceeds, said auger and shaft rise, the telescoping tube 277 rising with these parts, until finally the auger has bored its way to the top of the batch of material, packing and aerating it during such operation. The auger drive shaft is shown at 278, being driven in convenient manner as by the belt 279 working on the pulley 280.

During the foregoing packing operation the bottom of the bag or sack rests on a platform or suitable supporting plates, such as shown at 281, said plates being during that operation sustained in elevated position, and with their upper edges above the belt conveyor elements 282, shown in Figures 41 and 42 in lowered position, however.

Now this packer also includes suitable brakes or grips whereby the shaft and connected parts are retained in their raised position when the packing operation is completed, and until commencement of the succeeding packing operation, one of said brakes being shown at 283. Furthermore, this packer structure is so built that when the packing operation is completed, the shaft, auger, and telescoping tube being thus locked in raised position, the platform or other bag support is released and permitted to lower, thus delivering the filled and packed bag to the conveyor elements 232 for lateral transfer to another operation, such as a sewing machine or the like. In this connection there is provided a vertically movable rod or bar 284 in the packer whose lower end is connected to the platform or bag support, and whose upper end is connected to a toggle trigger 285. When this vertical rod is raised with raising of the platform or bag support to working position, said trigger 285 moves over into the path of upward movement of the shaft and connected parts, and at the same time locks the rod in such raised position until the next packing operation is completed, with completion of upward movement of the shaft, etc., at which time said toggle is tripped, and the rod is permitted to again lower. When thus lowered said rod is then locked in its lowered position by a catch 286 which is carried by said rod and engages a corresponding catch on a laterally movable arm or bar 287. When this occurs the cycle of packer operations has been completed, and manual release of the bar 287 from the vertically movable rod 284 must be effected to institute a succeeding cycle of operations.

Since the upward movement of the rod or bar 284 is the beginning of the packer cycle, and since that upward movement serves also to secure the bag support in its raised position, and to institute the packer cycle, such upward movement is also the correct time to release the pre-weighed batch of material now resting in the weigh hopper ready for release downwardly by release of the blades 64 and 65 of the weigh hopper bottom. I have therefore provided an interconnection between the vertically movable rod or bar 284 and the toggle pin 72 of the weigh hopper bottom, so that as soon as said rod is released to move upward, its upward movement will also break the toggle of the weigh hopper bottom by raising the pin 72. Such means is shown in Figures 41, 42, 43 and 44. It includes the lever 288 pivoted to a stationary part, and having one end pivotally connected to the vertically movable bar 284 and its other end pivotally connected to another lever 289, which is also pivoted to a stationary part. The pivotal points of the levers 288 and 289 are shown at 290 and 291, respectively, and the pivotal connection between said levers is shown at 292, and the pivotal connection between the lever 288 and the vertically movable rod is shown at 293. The connection 292 is a pin and slot connection.

With the foregoing arrangement, raising of the rod 284 is accompanied by raising of the outer or right hand end of the lever 289. The free end of said lever is located adjacent to the toggle pin 72, and is adapted to engage said pin and raise it to break the toggle and release the pre-weighed batch. However, it is necessary that the pin 72 be permitted to return to its lowered or toggle locking position prior to return of the outer or free end of the lever 289, since the packing operation will not be completed until after the batch of pre-weighed material has been released to the packer, and furthermore the weighing and batch forming operations for the next batch must proceed during the operation of packing the batch just delivered to the packer. To ensure these results I have so proportioned the lever 289 that its swinging movement carries the end of its pin engaging portion far enough over to the left so that said pin 72 may thereafter descend for recocking of the weigh hopper floor blades. In other words, the pin 72 travels in a direct vertical path of travel, whereas the free end of the lever 289 swings through an arc; and this swing is such that, although the initial portion of the swing serves to raise the pin 72 high enough to break the toggle, the final swing of said lever 289 carries its free end clear of the vertical path of travel of the pin 72, so that said pin may then descend without interference from the lever 289, although said lever still stands in its swung position, that is, with its free end raised.

Now, when the vertically movable rod 284 again moves down, with corresponding down swing of the free end of the lever 289, said free end must be able to travel beneath the pin 72 which has previously moved down and been locked in such down position. For this purpose the free end of the lever 289 carries a trigger 294, shown in Figure 44, which trigger may rise with respect to the lever body, but is restrained from swinging down below the position shown in Figure 44 by reason of the heel or shoulder 295 on the trigger, and which engages the face of the slot 296 within the end of the lever 289, and within which slot the trigger is pivoted. The pivotal connection of the trigger to the lever is shown at 297. A spring 294ᵃ restores the trigger to the position shown in Figure 44. In case it should be desired to effect an operation of the packer without tripping the weigher pin 72, such result may be effected by turning the trigger 294 to one side (journalling on the pivotal axis 294ᵇ), thus allowing the packer to be tripped for a complete cycle of packer movements, without also tripping the weigh hopper bottom.

I shall describe the motor means whereby the dampers are moved between open and closed positions, and whereby the trimmer slide is moved back and forth; and shall thereafter describe a typical set of circuits for providing automatic controls of these various elements, including the cutoffs by the electric-eye, etc. I shall also describe a typical series of operations of the major elements herein disclosed, to show their relative functionings.

The trimmer movements are secured by a simple reversible motor 298 carried by a bracket 299 secured to the front face of the wall 160; said bracket including the spring pressed device 300 of simple form to retain the belt in taut condition. The pulley 301 of this motor drives the shaft 302 of a gear reducer 303 having the pulley 304, through medium of the belt 305; and said gear reducer includes the transverse shaft 306 which carries the pinion 307 engaging the rack bar 233 of the trimmer slide. Manifestly, by supplying current to the motor field and armature in proper directions the direction of motor drive can be controlled; thereby shifting the trimmer slide in either direction as needed. The gear reducer 303 is supported by the bracket 308 secured to the front face of the wall 160.

Reference to Figures 3, 4 and 9 shows the limit switch 309 carried by the wall 160. The slide element carries the cam member 310 in position to engage the arm 311 of this limit switch to open the motor circuit for left-hand or returning movement of the slide at completion of said movement. When this occurs such left-hand drive is discontinued, but the circuits are so arranged that thereafter right-hand slide movement may be produced by the motor. Normally the right-hand or trimming movement of the slide will be automatically discontinued by a signal transmitted from the interception of the light-beam of the electric-eye, due to completion of trimming action; but in order to protect the trimmer and parts from over-travel in case of failure of such automatic stoppage, I have provided another limit switch 312 on the face of the wall 160, and whose arm 313 is adapted to be engaged by the stop member 314 on the slide in case of slide movement to such extreme limit.

In order to produce the linear movements of the dampers I have chosen to show straight-line motors of the type disclosed in Letters Patent No. 2,337,430, issued December 21, 1943, to Panfilio Trombetta, and shall describe the same as used herein; but in so doing I wish it understood that I do not thereby limit my present invention, except as I may do so in the claims to follow; but such motors are well adapted to meet the present conditions of operation.

Across the rear ends of the bars 155 and 156 previously described I provide the cross-bar 315 (see Figures 2, 7, 8, 10 and 41). Supported by this cross-bar are the two linear motors, 316 and 317, of the Trombetta type, and which will presently be described more in detail herein. The linear armatures 318 and 319 of these motors are connected to a bar or tube 320 on the rear end of the hrizontal damper 152, so that direct back and forth movements of this damper are produced by proper energization of the stators of these linear motors. Since this horizontal damper is always to be fully shifted from one extreme position to the other (full closed to full open, or vice versa), I have provided the limit switches 321 and 322 for closing and opening limits of movement, respectively. The damper 152 or the bar 320 connected thereto, carries a plate 323 which will engage the limit switch arm 324 of the switch 321 to open the circuit for closing movement limit; and which plate 323 will engage the arm 325 of the limit switch 322 for opening the circuit for damper opening limit.

It should be here mentioned that all of these limit switches, 309, 312, 321 and 322 are so constructed that their arms 311, 313, 324 and 325 are spring returned when released so as to restore said switches to their original circuit positions when said arms are released by disengagement of the operating members therefrom. In other words, said switches are spring restored.

There is provided also a reversing switch 326 for the straight-line motors 316 and 317 which operate the horizontal damper. This switch has the control arm 327 which may be engaged by the plate 323 carried by the horizontal damper, or travelling therewith, so that as the damper completes its movement in damper opening direction said switch is reversed in position. A spring 327ᵃ returns said switch to its normal or right-hand position (see Figure 55), when the horizontal damper moves to closed position (as shown in Figure 55).

Conveniently the switch 326 is carried by a downwardly extending plate 328 secured to a bracket 329 lying between the two motors 316 and 317. This bracket has its rear end secured to the cross-bar 315, as shown in Figure 2, and its front end has a cross piece 330 lying in the path of travel of the damper forwardly, or in the path of travel of the plate 323 already referred to. This plate 323 may be padded on each face with resilient material, such as rubber, if desired, to take the shock of stoppage of damper movement; and the bracket 329 has the abutment 331 to limit the movement of the damper in its opening direction, also by impact of the padded plate thereagainst.

I have also provided for vertical movements of the vertical damper 165 by means of such straight-line motors. This is the straight-line motor 332 carried by the front face of the front wall 160, as well shown in Figures 1, 5, 6, 9, 15 and 16. The armature 333 of this motor is directly connected to the upper end of the vertical damper by the small brackets 334 which reach outwardly from the damper at both sides of the lower end of said armature and are pinned to the armature by the pin 335. If desired a spring 336 may be provided tending to raise the damper, and also exerting a sufficient force to take all or a portion of the damper's weight, so that the loads imposed on the motor for both opening (raising) and closing (lowering) movements will be more or less equalized. Also, this spring when provided will act to somewhat dampen the impact of stoppage at the limit of lowering movement. Provision to take up this impact has also been made by other means, as will hereinafter appear.

It is here noted that in the absence of restraining means to sustain the weight of the damper 165 and the armature 333 said parts would fall to the closed damper position as soon as current to said motor was discontinued. The spring 336 will, when provided, prevent such falling, holding the damper in its raised position until lowered by supply of proper current to the motor. However, it is here noted that by providing a suitable amount of friction in the slides wherein the edges of this damper are carried it is possible to sustain the damper in its raised position without recourse to such means as said spring.

A U-shaped bracket is provided having the vertical arms 337 and 338 lying at the sides of the motor 332 as shown in Figures 1, 5, 9, 15 and 16, and having the bottom cross piece 339. As shown particularly in Figures 5, 6 and 15 these arms are connected at their upper ends to the front face of the front wall 160, but their lower portions are set out from said front face to provide open spaces within which may travel vertically a cross member, presently to be described. There is provided a padding of suitable material 340, such as sponge rubber on the cross-piece to establish a bottom cushion for the stoppage of the downward movement of the damper.

There is a cross plate 341 connected to the small brackets 334 already mentioned, and this plate will engage this cushion at the limit of damper lowering, when the damper is closed. Also there is a cross-piece 342 directly behind this plate 341 and reaching laterally to both sides of the U-shaped bracket's arms 337 and 338, as well known in Figure 16. On these bracket arms are secured the limit switches 343 and 344 for cutting off current from the motor 332 at the lower (closed) and upper (fully opened) positions of the damper, the arms 345 and 346 of these switches being engaged by this cross-piece at proper times; and said switches being of the spring restored types such that when said arms are released by disengagement of the cross-piece therefrom said switches again restore to their normal positions.

In Figures 25 to 29, inclusive I have shown details of a typical straight-line motor of the Trombetta type. It includes a laminated field element 347 within the housing 348, and having the opposed pole pieces 349 with the interposed slots or channels 350. The straight armature plate 351 moves back and forth between these pole pieces, passing through slots 351 and 353 in the end walls of the housing. Coils 354, 355 and 356 are placed in these slots, and may be supplied with polyphase currents from a suitable source. The direction of reaction between the armature and the field thus produced will depend on the relative connections of phase current supply to these coils, so by reversing two of three phases it is possible to reverse the direction of armature pull. These straight-line motors are adapted to exert constant pull of definite amount for any length of armature movement, so are well adapted to meet the conditions of the present combinations. The supply of currents to the coils of these straight-line motors is properly controlled to produce pull in the direction required, such control being included in the circuits hereinafter described.

The following is the sequence of operations under normal operating conditions:

Assuming that the shaker-feed is functioning normally to deliver a constant stream of material to the supply hopper, to meet average requirements, and assuming that both dampers are in closed positions with the trimmer slide at its initial or left-hand position, with the supply hopper filled to the point needed for delivery of a batch of prescribed size to the weigh hopper; and also assuming that the packer has completed its previous operation and that the vertically movable bar 284 is in lowered position, being locked in such position by engagement with the bar 287, a new series of operations is to be produced. Upon releasing the vertically movable bar 284 by left-hand movement of the control bar 287 said bar 284 will rise, with accompanying engagement of the toggle catch 285 to lock the bag support in raised position and to release the shaft, auger and telescoping tube 277 of the packer so that said packer is ready for operation on a freshly to be supplied pre-weighed batch from the weigher. It is assumed that the shaft 278 of the packer is being driven at normal speed.

Rise of the bar 284 will not only cock the toggle 285, but will also cause up-movement of the trigger 294, with corresponding raising of the pin 72 of the weigher. Slight rise of said pin 72 will result in breaking the toggle action of the bars 70 and 71, so that the sustained weight of the pre-weighed batch contained in the weigh hopper will swing the blades 64 and 65 down to effect very rapid delivery of such batch into the chute 234, and said batch will immediately descend to the packer, where said packer will proceed to pack said batch into the bag or sack which is in place on the packer tube 277. Further packer operations need not be here discussed beyond statement that the trigger 294 will remain in raised position until completion of the packing cycle. In the meantime the weigher is to proceed and measure out and pre-weigh to exactness the next batch so that said batch will be ready to be delivered to the packer when called for by the operator.

Directly after down-swing of the blades for delivery of their sustained batch said blades swing up again into horizontal position under control of the counter-weights 80 and 81, and the bars 70 and 71 rock down to bring the pin 72 slightly below the line connecting the pivotal points 68 and 69, so that the blades are now locked by toggle action, ready to support a freshly supplied mass of material during and after trimming thereof.

As soon as the blades have been restored to and locked in such horizontal position both the horizontal and vertical dampers are drawn into fully opened positions, the one by full backward movement, and the other by full rising movement. This results in a very rapid supply of material from the supply hopper into the weigh hopper to a level higher than the horizon of the horizontal damper, with assurance that an over-weight has been supplied into the weigh hopper. Prior to such damper openings the weigh hopper was "light" so that the weigh beam 116 and the flag beam 123 were both in lowered positions. Also, during this interval, prior to supply of material to the weigh hopper the counter-poise was in the position shown in Figure 13, where said counter-poise stood ready to ensure introduction of an over-weight into the weigh hopper before said weigh beam could rise, beyond its net weight or cut-off position. Also, during these operations the trimmer slide was in its initial or left-hand position, with all the trimmer blocks drawn full out, that is, no trim.

As soon as the dampers 152 and 165 have opened the venting action above the forward portion of the weigh hopper will commence by supply of current to the motor 245 and will continue as long as said dampers are open (or as long as the vertical damper is open).

Immediately that a sufficient amount of over-weight is created in the weigh hopper the weigh beam 116, with the extension 145 will rise, pressing against the counter-poise wire extension 143 and tilting the tube 137 into the position of Figure 14, thus permitting full rise of the weigh beam to occur, carrying the extension 145 beyond the counter-poise itself. Such rise of the weigh beam 116 will be accompanied by corresponding rise of the flag-beam 123, carrying the flag 129 into the path of the light beam and intercepting such light-beam with corresponding modification of the characteristics of the photoelectric cell 133. This will give a signal that over-weight has been established in the weigh hopper.

Immediately that such signal is given by interception of the light beam suitable circuits and devices will function to cause quick closing of movement of the horizontal damper (forward movement) by proper energization of the stator windings of the motors 316 and 317, the reversing switch 326 having been moved to the proper position during the previous damper opening movement. Such closing movement of the horizontal damper will also effect volumetric trim of the material contained in the weigh hopper, by the trimming action of the lip 167, and as determined by the previously set and adjusted position of the horizontal rails 168; and such volumetric trimming will also establish a slight clearance between the top surface of the material retained in the weigh hopper and the bottom face of the horizontal damper. This slight clearance will ensure that slight vertical movements of the weigh hopper may occur during subsequent trimming action, and without interference with the accuracy of such weigh trimming which interference would have existed if there had been contact between the material surface and the bottom of the horizontal damper. But it will be understood that this volumetric trimming does not reduce the weight of material in the weigh hopper below, or even down to the desired net weight, so there will remain in the weigh hopper an over-weight, requiring exact trimming to be accomplished by the weigh trimming presently to be accomplished.

As soon as the horizontal damper has been fully closed as above explained, the motor 298 will be energized in proper manner to move the trimming slide towards the right at uniform but rapid speed for the trimming function. As this slide progresses towards the right it will move the trimming blocks inwardly in progressive fashion, as already explained, and also the movement of the slide towards the right will cause the shovel plate 180 to slide over the surface of the horizontal damper (or the lip 167 thereof), to thus create an advancing void or space into which trimmed material may be moved by the trimming blocks. During this operation it is noted that material thus displaced by the shovel plate is material already on the top face of the horizontal damper, and whose weight is therefore not included in the mass being weighed by the weigh hopper. Furthermore, the extension 181 constitutes a chamber into which some material may move and pile up during this shovelling action, such material afterwards sliding back into the main chamber as determined by the angle of repose of the material so moved.

Since the over-weight originally existing in the weigh hopper at commencement of this weigh trimming action was a maximum it follows that the trimming action at commencement of trimming may be rapid, if desired, in the nature of a roughing operation; and should be followed by a slower rate of trimming per inch of advancement of the trimming slide, so that final cut-off may occur most accurately and under most advantageous conditions. Various forms of trimming blocks are herein disclosed, some of which are adapted to accomplish this desirable result.

As this weigh trimming proceeds and as the desired net weight is approached, the weigh beam 116 and flag beam 123 will commence to swing down slowly; and the dampening blade 127 in the oil chamber at the right-hand end of the housing 122 will prevent excessive or vibratory movements of the weigh and flag beams, so that said beams will settle smoothly and promptly back to the exact weight position for which the weigher has been set; and just as this exact weight condition is reached the light beam will be again uncovered by sufficient lowering of the flag, to give a new signal or to discontinue the signal previously being given. Thereupon the proper devices will function to stop and immediately reverse the operation of the trimmer motor 298, so as to rapidly return the trimmer slide and trimming blocks to initial position; and also, during this same interval, which is very short, the motor 332 will be energized in proper manner to cause sudden lowering of the vertical damper to its fully closed position, with complete cut-off of the space above the horizontal damper and behind the vertical damper from the mass of material still retained in and supported by the weigh hopper. Usually the closing movement of the vertical damper will occur at the beginning of the return movement of the trimmer slide or slightly before such beginning, so that there can be no possible shift of material to or from the mass sustained by the weigh hopper after the stoppage signal has been given by the movement of the flag beam to proper position.

In this connection it is to be noted that the fully moved positions of the trimming blocks bring their inner or back ends to positions just in advance of the position occupied by the vertical damper when said damper is closed, so that there is no interference between these parts, and so that said damper can be closed even before the trimming blocks have been restored to their outward or initial positions; and it is also noted that the slot or space 229 in the trimmer slide accommodates the vertical damper when said damper is moved down to closing position, even when the trimmer slide still occupies a position to the right of its initial or non-moved position. Thus all parts have been properly harmonized to make it possible to secure extact weigh trimming.

As soon as the trimmer slide reaches its full left-hand or initial position the limit switch 309 will function to discontinue further supply of current to the motor 298 for such movement. Also, as soon as the vertical damper reaches its fully lowered position the limit switch 343 will function to discontinue further supply of current to the motor 332 for such downward movement; and also as soon as the horizontal damper reaches its full forward or closed position the limit switch 321 will function to cut off further supply of current to the motors 316 and 317 for such forward movement. Also, the reversing switch 326 will function just prior to completion of such forward movement, to prepare the connections for subsequent damper movement in the reverse or opening direction.

Additionally it is noted that the cushions provided for receiving and cushioning impacts at termination of damper movements for both horizontal and vertical dampers will effectively prevent shocks to the parts. In this connection, the limit switches may be so set as to function early enough to cut off current prior to actual completion of damper movements thus reducing the impacts which must be absorbed by such cushions.

I wish to point out that the maximum rate of weighing and packing of these accurately pre-weighed batches will depend on which of the two elements, weigher or packer, is capable of maximum sustained rate of handling batches. I have found that both of the two elements are capable of very rapid rates of such operations, in batches per hour, and that they are well related to each other as respects maximum rates of operation, so that a single weigher of the form herein disclosed is well adapted to supply the pre-weighed batches to the packer, at the rate required by such packer. However, it is to be noted that if desired other combinations of weigher and packer might be used, incorporating features of invention herein disclosed.

In Figures 2, 15 and 17 I have shown the soft pad 357 of felt or other material, supported by the rear lower edge portion of the supply hopper directly above the top face of the horizontally movable damper, so as to exert a firm but even and brushing pressure on the top face of the horizontal damper, and thus to keep said surface clean and unobstructed at all times. This will also provide an effective seal against leakage of material of fine nature such as flour out along this surface when the damper is drawn out.

In Figures 47 and 48 I have shown a modified form of shaker-pan and grid arrangement which may be used in place of the construction previously described herein. In this modified arrangement the stands or brackets 359 reach upwardly from the floor of the pan to an elevation somewhat lower than the bottom edge of the chute 264; and a pair of oppositely disposed side guides 360 and 361 are supported by these brackets, said guides being of channel-shape and extending parallel to the length of the pan. A pair of side bars one only of which is shown at 363, connected together into a rectangular frame by the end bars 364 and 365 establish a rectangular frame whose sides are adapted to slide in the guides 360 and 361, so that said frame can be slid into or removed from the guides. Thus this frame can be positioned around the lower end of the chute, slightly below said lower end, or can be removed from such positioning from time to time. This frame carries the grid including bars extending parallel to the pan (bars 366), and the bars extending across the width of the pan (bars 367), forming a net-work of rectangular openings of suitable size to readily pass the material being handled, but small enough to prevent passage of foreign objects which might damage either the weigher or the packer to which the material is being supplied.

Preferably the front ends of the longitudinally extending bars 366 are bent upwardly as well shown in both Figures 47 and 48, so as to form a front screen to prevent such foreign objects as have been trapped from working over the front end of the grid and down into the pan. It will be evident that grids of various sized and shaped openings may be substituted from time to time, as needed according to the material being handled, etc.

Reference to Figure 49 shows a modified form of hanger for the weigh-hopper, in place of the form of hanger previously shown and described. In this modified form, I have provided a turn buckle 368 joining together the two rod sections 369 and 370, so that the lengths of such rods may be adjusted to thereby raise and lower the weigh-hopper for reasons already explained in detail.

In Figures 50 and 51 I have shown a modified arrangement for effecting venting of the space 164 during the interval that fresh material is being supplied into the weigh-hopper from the supply hopper. This is the interval when the horizontal and vertical dampers are opened; and also may include the interval when the vertical damper remains open after the horizontal damper has been closed, and when trimming is being effected by inward movement of the trimmer blocks. In the form of Figures 50 and 51 I provide the hood 236 over the upper portion of the space 164, as before, but in the present case I carry the duct from this hood to a box 371 above and behind the upper end portion of the armature 333 of the motor which operates the vertical damper. From this box 371 I carry the duct 372 to the inlet of a centrifugal fan 373, which in the present case is preferably continuously operating, being driven by a shunt motor 374, so that said motor and fan may operate at substantially constant speed, and therefore with a substantially constant pull being exerted by the inlet of the fan. From the delivery side of this fan a duct 375 may be carried back into the supply hopper, if desired.

Now the box 371 is provided on its front face with a relatively large opening 376 which may be controlled by a slide damper 377 which is vertically movable through a range of movements preferably equal to the range of movements of the damper 165. This damper 377 is connected to the upper end of the armature element 333 so that said damper 377 rises and falls in harmony with the vertical movements of the vertical damper of the weigher proper. When the damper 377 is raised it covers over and closes the inlet end 376 of the duct 372 (in the box 371), so that further inflow of air is prevented through said opening, and then full inflow of air for the fan must come from the space beneath the hood 236, being the space 164 above the weigh hopper. Thus, during the interval when the vertical damper is opened, which includes both the interval of supply of a fresh mass of material into the weigh-hopper from the supply hopper, and the subsequent interval during which weigh-trimming is being effected, there is produced a reduction of air pressure within the space 164, or slight vacuum therein, with upflow of air in said space, and return of such air into the upper portion of the supply hopper. As soon as the vertical damper closes the opening 376 is again opened and the suction effect is broken since the fan will then take air through the shortest and most direct path, and the path of least air flow resistance, namely, through said opening 376 instead of from the space 164.

Reference has been made to the actions occurring in the supply hopper during supply of a fresh mass of material to the weigh-hopper. In Figures 52, 53 and 54 I have shown a supply hopper of the general form of that previously disclosed herein, and adapted to deliver its material to the weigh-hopper; but the structures shown in Figures 52, 53 and 54 are adapted to make provision for effecting a full control of the material during the filling of the supply hopper, and during the movement of the mass of material from the supply to the weigh-hopper.

In the construction of Figures 52, 53 and 54 the supply-hopper 159 and the shaker-pan 259 bear substantially the relation to each other previously explained; and also the weigh-hopper beneath the supply-hopper bears substantially the relation to said supply-hopper heretofore set forth. The back wall of this supply hopper includes an upper section 378 which is very steep, being shown of the order of 85 degrees to the horizontal; and the lower portion 379 of the back wall of the supply-hopper is formed on a much easier slant, being of the order of 45 degrees to the horizontal, but it should be in any case somewhat greater than the angle of repose of the materials to be handled in this structure. By so doing there is assurance that the material resting against this portion of the back wall will naturally flow downwardly towards the weigh-hopper.

Now it is evident that if the supply-hopper should be of simple form, such as that previously shown and described herein, then when the horizontal damper is drawn open there must be a descent of the body material in the supply-hopper sufficient to deliver to the weigh-hopper a full batch of material, and also, due to the presence of the partition 133 (with the slide 166) a sufficient amount of material must be delivered into the weigh-hopper to permit said material to flow forwardly in the weigh-hopper and establish a natural flow surface such as shown by the line 178 in Figure 17. With such simple form of supply-hopper as previously illustrated and described herein, the full area of the material of the supply-hopper must move down during the filling of the weigh-hopper, sufficiently to effect this fillage of the weigh-hopper; but it will be noted that the entire body of material in the supply-hopper is, in the previously illustrated constructions, being supported by the horizontal damper, previous to withdrawal of that damper for the opening movement thereof. Therefore, with that construtcion there will be a sudden impact on the bottom of the weigh-hopper due to descent of that entire mass of material in the supply-hopper a distance substantially equal to the vertical dimension of the weigh-hopper below the horizontal damper. This will cause a considerable impact on the floor of the weigh-hopper, with corresponding disturbance and effect of the weigh-beams, and other parts. In order to largely avoid this disturbance, and to better control the flowage of the material during this operation, resort may be had to the structures which I shall now describe:

In the form of Figures 52, 53 and 54 I have provided a supplemental partition 380 in the upper portion of the supply-hopper. This partition takes the form of a cross-bar 381 which has its ends fixed to the two slides 382 and 383 which are mounted for sliding adjustment along the upper edges of the side walls of the supply-hopper, 157 and 158, respectively. These slides are conveniently made of angle shapes having one edge 384 of each angle supported on the edge of the corresponding side wall and the other face 385 of such angle resting against the inner face of such side wall; and a lock bolt 386 extends through the side wall and through a slot 387 of such face portion 385 so that by tightening a wing nut 388 against the outside face of the side wall the position of the slide can be fixed in adjusted position. Thus the cross-bar 381 may be adjusted in desired position in the supply-hopper, measured from front to back, and at the same time provision has been made to prevent leakage of material through the side wall of the supply-hopper.

To the front face of the cross-bar is secured the vertical partition 389 occupying substantially the full width of the supply-hopper, but with clearances as shown at 390 and 391 in Figure 53. Also, I have provided the downwardly slanting partition members or plates 392 and 393, each of which is angular form, having its vertical portion secured against the cross-bar, and its downwardly extending portion hanging downwardly and rearwardly into the supply-hopper as well shown in Figure 52. The vertical portions of these plates 392 and 393 are slotted as shown at 394 and 395 in Figure 53, and the plates so overlap that a single bolt 396 may be extended through both of these slots, and secured by a wing-nut 397, thus clamping the two plates against the face of the cross-bar. By this means the amount of overlap of said plates may be adjusted, thereby adjusting the clearances 398 and 399 between the ends of these plates and the side walls of the supply-hopper, as well shown in Figures 53 and 54.

It is now apparent that this partition carried by the cross-bar may be adjusted from front to rear of the supply-hopper, and also that the width of the partition itself may be adjusted so that, if desired, clearances of desired size may be established between the ends of the partition and the inside faces of the side walls of the supply-hopper.

Examination of Figure 52 will show that the downwardly and rearwardly extending portions of this partition slant at an angle of substantially 45 degrees to the horizontal, being such that released material will naturally slide down along this portion of the partition. But such material is naturally sustained largely by this partition prior to such release, so that its weight is not supported directly by the horizontal damper when in closed position; and also due to the slant of this partition it is evident that as the material is released by withdrawal of the horizontal damper any material in the rear portion of the supply-hopper and behind this partition will be compelled, as it descends when the damper is drawn back, to flow rearwardly towards the rear wall of the supply-hopper, and will thus be compelled to submit to the flowage as determined by the form of that rear wall.

The form of the rear wall of the supply-hopper is such that material flowing under its control will first make a rapid descent, until the level of the portion 379 is reached, whereupon such material will flow forwardly as well as down, being given a considerable forward component of motion. This material will therefore have its downward descent controlled, and a direct shock against the horizontal damper or against the bottom of the weigh-hopper will be prevented; and also this horizontal component of motion will tend to carry the inflowing material forwardly further than would otherwise be the case so that the forward portions of the weigh-hopper will be well filled, ready for the trimming operations to be presently performed.

It is also to be noted that with this supplemental partition present in the supply-hopper, the height to which material will collect in the rear portion of the supply-hopper is much greater than that in the front portions of such supply-hopper, so that the superincumbent weight of the mass sustained directly by the horizontal damper is greatly reduced (a portion of the weight being supported by the rear wall, due to its slant, and a portion by the supplemental partition due to its slant); and also the impact of material against the bottom of the weigh-hopper when the horizontal damper is withdrawn is greatly reduced.

Due to the increased elevation at which material is held in the rear portion of the supply-hopper with this supplemental partition, I prefer to provide a supplemental sheet metal extension 400 for the side-walls of the supplemental-hopper, said extension being of generally U-shape and having its sides carried by the side walls of the supply-hopper, and its cross piece comprising a front wall for such extension, as well shown in Figures 52, 53 and 54.

I wish to point out that if desired more than one plate such as shown at 174ª may be used in the weigh-hopper, placing one of these plates at front as well as back of the weigh-hopper. Furthermore these plates may be serrated or notched in their lower edges as shown at 174ᵇ to more readily shed any material which may have worked in behind said plates.

In Figure 55 I have shown a typical wiring diagram including elements, relays, and circuits capable of performing the various functions hereinbefore described. Reference may now be had to this figure.

In Figure 55 I have shown schematically the horizontal damper 152 and its straight-line motors 316 and 317; the vertical damper 165 and its straight-line motor 332; the trimmer motor 298; the horizontal damper limit switches 325 and 321; the reversing switch 326; the vertical damper limit switches 342 and 343; the trimmer motor limit switches 309 and 312; the light source 132; the photo-electric cell or electric-eye 133; and the flag beam 129. In this diagram I have also shown the relays or switches I, II, III, IV, V, VI, VII, VIII, and IX; said switches having the following sets of contacts, namely;

Relay I, contacts 411—412; 413—414; and 415—416; all normally open; relay II, contacts 417—418; 419—420; and 421—422; all normally open; relay III, contacts 423—424; 425—426; and 427—428; all normally open; relay IV, contacts 429—430; 431—432; and 433—434; all normally open; relay V, contacts 435—436; 439—440; and 441—442; all normally open; and contacts 437—438; normally closed; relay VI, contacts 447—448; and 451—452; normally open; and contacts 443—444; 445—446; and 449—450; normally closed; relay VII, contacts 453—454; 455—456; and 457—458; all normally open; relay VIII, contacts 459—460; 461—462; and 463—464; all normally open; switch or relay IX, contacts 473—472; normally open. These several relays have the actuating coils 489, 490, 491, 492, 493, 494, 495, 496, and 497, respectively.

The relay or switch 497 is so constituted that, together with its photo-electric cell controls, it serves to deliver an impulse of current whenever the light-beam is closed or interrupted.

As already explained herein, the limit switches 325, 321, 342, 343, 309 and 312 are so constructed that they are spring returned to closed positions, being opened by engagement of a moving element with the switch arm; and the reversing switch 326 is so constructed that it is spring returned to the position shown in Figure 55, and is moved to its reversed position when the horizontal damper moves to its left-hand or open position.

I have shown in the diagram of Figure 55 "start" and "stop" switches 486 and 483, these being provided respectively with the contacts 487 and 488, and the contacts 484 and 485; and these switches are so constituted that when the "start" switch 486 is pushed, its element 486 bridges or connects the contacts 487 and 488, the contacts 484 and 485 of the "stop" switch being in closed or bridged condition; and so that when the "stop" switch is pushed, its element 483 opens the circuit between the contacts 484 and 485, the contacts 487 and 488 of the "start" switch being bridged or connected together by the element 486. The switch unit including the elements 486 and 483 may be of any suitable construction. Thus it may be of the form or construction in which said elements 486 for "start" and 483 for "stop" are so interlocked that movement of the element 486 (start) to its closed position will also ensure movement of the element 483 (stop) to its closed position whereas movement of the element 483 (stop) to its open position will also ensure movement of the element 486 (start) to its open position. Or said elements 486 (start) and 483 (stop) may be fully independent and not interlocked. In this case it will be necessary to move both switches 486 and 483 to their closed positions to cause starting, since the switch 483 was opened at the prior stopping operation; and in the case of such independence of these two switch elements the switch 486 for starting should be opened after the switch element 483 has been opened for stopping and the switch element 483 should thereafter be closed after the switch element 486 has been opened. This will place both switch elements in condition for a succeeding starting operation by the closing of the switch element 486.

I have shown in Figure 55 the incoming or supply three-phase lines 401, feeding the main switch 401ª. From this main switch leads extend to the lines 402, 403 and 404, for three-phase current for motor operation; and from two of these lines there extend the single-phase lines 406 and 407 under control of the control switch 405. A rectifier 408 is connected to the lines 406 and 407, to supply direct current over the lines 409 and 410 for the photo-electric cell; and from the lines 406 and 407 current (alternating) is taken for operation of the coils of the several relays or switches I to IX inclusive, under control of the switch 407ª. This switch is so placed that when the arms 70 and 71 of the toggle for the bottom of the weigh-hopper, are locked in lowered position thus being in condition for reception and weighing of a batch, this switch 407ª is closed, thus closing the lines 406 and 407 for supply of current to the relay coils, whereas, when said arms 70 and 71 are raised to discharge a weighed and trimmed batch said switch is opened, thus discontinuing supply of current to the lines 406 and 407.

The general functions of the several relays or switches are as follows; relay I when raised supplies power current to the horizontal damper motors 316 and 317 in parallel to move said damper to the left or open position; relay II when raised supplies power current to the horizontal damper motors 316 and 317 in parallel to move said damper to the right or closed position; relay III when raised supplies power current to the vertical damper motor 332 to raise or open the same; relay IV when raised supplies power current to the vertical damper motor 332 to lower or close said damper; relay V serves as a control relay for impulses from the photo-electric cell under one set of conditions; relay VI serves as a control relay for impulses from the photo-electric cell under another set of conditions; relay VII when raised supplies power current to the trimmer motor for trimming material out of the weigh-hopper, being for right-hand movement of the trimmer slide, that is, towards the right of the machine; relay VIII when raised supplies power current to the trimmer motor for returning movement of the trimmer slide, that is, towards the left-hand position; and relay IX serves to deliver the impulses of current when the light-beam is either interrupted or restored.

With the foregoing explanation, the following sequential operations of the various elements will take place, namely:

Assuming that the weigh-hopper is empty or at least light, so that the arms 70 and 71 are cocked, being in their lowered positions, and toggle effect established, thus closing switch 407ª:

1. Close main switch 401ª. This supplies current to the buses 402, 403 and 404. Switch 405 being open no current reaches the control buses 406 and 407, nor the rectifier 408, and no direct current exists on the D. C. buses 409 and 410.

2. Closing switch 405 results in supplying current to the single-phase buses 406 and 407, and to the rectifier 408, and the D. C. lines 409 and 410; and since the switch 407ª is closed this single-phase current reaches to the "start" and "stop" switches 486 and 483, respectively.

3. Upon pushing the "start" switch the following circuit is established; contacts 487 and 488 are connected; circuit 406, 484, 485, 444, 443, 438, 437, coil 489 (of relay I), 468, 469 (horizontal damper being at right-hand position), 488, 486, 487, and to line 407. This circuit provides for raising relay I to supply power current for opening movement of the horizontal damper.

4. Switch 325 will remain closed until the horizontal damper is fully opened, whereupon contact 468 will be moved from contact 469; and during this opening movement of the horizontal damper contact 470 of switch 321 will engage contact 471 of that switch. Also, during this opening movement of the horizontal damper the reversing switch 326 will be shifted from the position shown in Figure 55 to the opposite position, thus disengaging contact 465 from contact 467, and engaging contact 465 with contact 466.

5. At step "3" above listed we also have the following circuit; 406, 484, 485, 444, 443, 438, 437, 478, 477, coil 491 (of relay III), 488, 486, 487, and to line 407. This raises relay III to supply power current for upward or opening movement of the vertical damper to open the same.

6. As vertical damper rises the switch 343 is reversed, separating contact 474 from contact 476 and connecting contact 474 to contact 475; and at top limit of movement of vertical damper contact 477 of switch 342 is disengaged from contact 478 of that switch.

7. It is thus evident that the power movements of both the horizontal and vertical dampers for opening movements are instituted by pushing the "start" button 486, and that discontinuance of power current supplies for these movements are effected by the functioning of their respective limit switches.

8. Both horizontal and vertical dampers having been fully opened rapid filling of the weigh-hopper follows such action.

9. Over-filling of the weigh-hopper ensues, the weigh-beam 116 and the flag-beam 123 rise, and the photo-electric cell is affected by this change of light condition.

10. Change of light condition of the photo-electric cell results in delivery of an impulse of current through the coil 497 of the relay IX.

11. The first impulse from the photo-electric cell due to rising of the weigh-beam with over-weight results in the following circuit being established; 406, 484, 485, coil 493 (of relay V), 450, 449, 466 (horizontal damper being at opened position), 465, 473, 472, 407. Thus an impulse of current is delivered to the coil 493 of relay V raising said relay momentarily. This is a short impulse of current, however, so provision is made for locking this relay in raised condition as long as necessary.

12. Raising of relay V also establishes a locking circuit for said relay, as follows; 406, 484, 485, coil 493 (of relay V), 450, 449, 441, 442, to line 407. This circuit locks relay V in its raised condition, but it is noted that whenever relay VI may be raised at a later time this locking circuit will be opened and then relay V will be allowed to fall.

13. Relay V having been raised by the first impulse from the photo-electric cell (due to rising of the weigh-beam due to establishment of over-weight), and relay V being thus locked up, we now have the following circuit; 406, 470, 471 (the horizontal damper being at left-hand position), coil 490 (of relay II), 435, 436, back to line 407. This causes power current to be supplied to the motors 316 and 317 of the horizontal damper, in parallel, in direction to move said damper to close same, being to the right.

14. Right-hand movement of the horizontal damper results in permitting the reversing switch 326 to move back to the position shown in Figure 55, opening the contact 465 from contact 466 and placing it against contact 467; and also results in permitting contact 468 of switch 325 to re-engage contact 469 of said switch, and also results in moving contact 470 of switch 321 away from contact 471 of that switch.

15. The vertical damper being still up (since the first impulse from the photo-electric cell did not cause it to move down), we have also the following circuit; 406, 484, 485, 481, 482, 445, 446, coil 495 (of relay VII), 435, 436, back to line 407. This results in raising the relay VII to supply power current to the trimmer to move the slide to the right and cause weigh trimming to occur.

16. Movement of the trimmer slide towards the right results in permitting contact 479 to engage 480, contacts 481 and 482 being normally engaged while the trimmer is in any position other than a possible right-hand extreme position which it will not attain except under extreme conditions, and not under normal trimming conditions.

17. Normally the required amount of weigh-trimming is effected by movement of the trimmer slide towards the right only a portion of its possible full range of movement. As soon as weigh-trimming has been completed so that the weigh-beam falls to the exact position of balance for the desired net weight, the light-beam is intercepted causing a second impulse to be delivered through the coil 497 of the relay IX.

18. When impulse number two comes in from interception of the light beam as above explained, we have the following function; established by the following circuit; 406, 484, 485, coil 494 (of relay VI), 440, 439, 467, 465, 473, 472, and back to line 407. This delivers the second impulse to the coil of relay VI to raise said relay. This impulse is of momentary duration and will not sustain the relay in raised condition. I have therefore made provision for locking this relay in raised position as long as necessary.

19. As soon as relay VI is raised there is established also the following circuit; 406, 484, 485, coil 494 (of relay VI), 451, 452, back to line 407. Thus this relay is locked up once it has been raised by the second impulse from the interception of the light-beam.

20. The raising of relay VI then establishes the following circuit; 406, 474, 475, coil 492 (of relay IV), 447, 448, back to line 407. This raises relay IV which supplies power current to the motor 332 for the vertical damper in direction to lower and close said damper. As this damper moves down contacts 477 and 478 which had been separated are allowed to come together, and at the closed position of this damper contacts 474 and 475 are separated and contacts 474 and 476 are brought together.

21. The completion of lowering movement or closing of the vertical damper, having brought contacts 474 and 476 together, we now have the following circuit; 406, 474, 476, coil 496 (of relay VIII), 480, 479, back to line 407. As soon as the above circuit is established relay VIII supplies power current to the trimmer motor in direction to cause it to move the trimmer in returning direction, and this continues until the returning movement is completed, at which time the limit switch 309 opens the circuit between the contacts 479 and 480 to terminate the trimming action.

22. The raising of relay VI served also to open the locking or holding circuit for relay V due to separation of the contacts 449 and 450, so that relay V was dropped as soon as relay VI was raised fully.

23. It is noted that when the trimming operation has been completed relay VI is left in raised position, locked up. However, as soon as the thus trimmed and weighed batch of material is released by tripping of the toggle pin 72, the rods 70 and 71 swing up so that the switch 407ᵃ is opened for a short interval. This discontinues supply of current over the line 406—407, so that the coil 494 of relay VI is de-energized, and this relay then falls, since its holding or locking circuit has become dead. Upon restoration of current due to down-swing of the rods or bars 70 and 71, and closing of the circuit 406—407, by the switch 407ᵃ, the entire sequence of events and movements must be gone through. Thus each cycle of movements of the various electrical elements is dependent on the original institution of circuit closing by down swing of the rods 70 and 71 to close the switch 407ᵃ, whereupon the weigher elements will proceed automatically to pre-weigh a batch of material to exactness, and have it ready for delivery to the packer (or other unit) when called for by release of the vertically movable bar 284 by the operator.

24. Upon release of the rod or bar 284 by the operator, tripping of the toggle results, with raising of the rods 70 and 71, and opening and subsequent closing of the switch 407ᵃ, so that the institution of a sequence of events by the weigher is dependent on the fact that the operator released the previously pre-weighed batch so that weighing provision must be made for the next packing operation which will shortly follow.

I have spoken of the switch 407ᵃ. This switch is conveniently in the form of a switch element carried by a suitable part of the frame, and as shown in Figure 1 it may be mounted on the post 54 adjacent to the horizontal rod 61 of the weigher. This switch includes suitable contacts, and it has the arm 407ᵈ which when in its lowered position (as shown in Figure 1) causes the contacts to be brought together to close the circuit. When this arm is raised these contacts are separated to open the circuit. A toggle spring 407ᵉ is provided for this arm, said spring serving to retain the arm in either its raised or lowered position, to which it may be moved by the weigher operation. Suitable stops are provided on the switch housing to limit such movements under force of this spring 407ᵉ.

The rod or shaft 61 (which is one of the rods for the blades constituting the bottom of the weigh-hopper) carries the two arms 407ᶜ and 407ᵇ which are so placed that they will engage the arm 407ᵈ of the switch element in proper manner to provide for the desired switch functioning. Thus, when the rod 61 rocks clockwise (in Figure 1) to drop or deliver the pre-weighed batch, the arm 407ᵇ will swing up and engage the arm 407ᵈ, thus tripping the switch to open position; and afterwards, when the rod 61 rocks counter-clockwise (to close the weigh-hopper bottom) the arm 407ᶜ will swing down to engage the switch arm 407ᵈ and trip the switch back to its closed position.

I have spoken of the delivery of impulses of current due to flagging of the light-beam which impinges on the photo-electric cell, and that these impulses serve to actuate certain parts to effect the desired controls. In Figure 55 I have shown the element or unit 500 placed in the lines leading to the coil 497 of the relay IX. This element or unit 500 contains a suitable and sensitive relay or contacting element which will respond to variations of the strength of current flowing through the photo-electric cell circuit, so that when the photo-electric cell is affected by flagging of the light beam said sensitive relay will operate to either open or close the circuit leading to the coil 497. I have chosen to so arrange the parts that such closing of the circuit leading to the coil 497 will occur when the light-beam is flagged, thus delivering the impulses hereinbefore explained for operation of the various circuits and the desired functions.

When an intermittently functioning vent motor is provided as shown in certain of the figures hereof, this motor may be so connected into the circuits disclosed in Figure 55 that proper delivery of current intermittently will be ensured, and in harmony with the time intervals when the vertical damper is opened. For example, said venting motor may be connected for control by the limit switches of the vertical damper; and preferably for control by the lower limit switch 343 of that damper, and by the opening and closing of the contacts 474 and 476 of that switch.

I claim:

1. In a weigher, the combination of a weigh-hopper, weighing means to support said hopper including a movable weight responsive element, and a connection from the weigh-hopper to said weight responsive element, means located at a higher elevation than said hopper to supply material to said hopper by gravity, a horizontal damper mounted for horizontal movement above the hopper, supporting means for said horizontal damper in such movement, a vertical damper mounted for vertical movement above the edge portion of the horizontal damper when said horizontal damper is in one extreme of its movement, supporting means for said vertical damper in such movement, both said dampers coming substantially to edge to edge proximity when in closed positions, to thereby seal off the space above the horizontal damper and behind the vertical damper from the space within the hopper beneath said dampers, reversible power operated means for each of said dampers, trimming means movable horizontally above the hopper and in advance of the vertical plane of movement of the vertical damper, and above the plane of movement of the horizontal damper, and operable to trim material horizontally from the upper portion of the hopper to the space above the horizontal damper, together with means operable in conjunction with said trimming means to vacate a space above the horizontal damper and in alignment with the trimming means, a reversible motor, operating connections between said motor and said trimming means and said vacating means, together with electrical connections to operate said before named parts including said reversible power operated means for each damper and including said reversible motor for said trimming means and said vacating means, and also including connections between said movable weight responsive element and said reversible power operated means and said reversible motor, first for movement of both horizontal and vertical dampers to open positions wherein their proximate edge portions are separated from each other, to thereby permit movement of material into the weigh-hopper by gravity, then to move the horizontal damper to its closed position with the leading edge of said damper substantially in alignment with the vertical plane of movement of the vertical damper, then to move the trimming means and the space vacating means in harmony to trim out material from the burden in the weigh-hopper, then to close the vertical damper by downward movement to bring its lower edge into proximate location with respect to the horizontal damper, and then to restore the trimming and space vacating means to initial positions.

2. In a weigher, the combination of a weigh-hopper, weighing means to support said hopper including a movable weight responsive element, and a connection from the weigh hopper to said weight responsive element, a horizontal damper mounted for horizontal movement above the hopper, supporting means for said horizontal damper in such movement, a vertical damper mounted for vertical movement above the edge portion of the horizontal damper when said horizontal damper is in one extreme of its movement, supporting means for said vertical damper in such movement, both said dampers coming substantially to edge to edge proximity when in closed positions, to thereby seal off the space above the horizontal damper and behind the vertical damper from the space within the hopper beneath said dampers and in advance of the vertical damper plane of vertical movement, the location of said edge to edge proximity position being rearward of the front of the weigh-hopper, reversible power operated means for each of said dampers, gravity means to supply material to the space above the horizontal damper and behind the vertical damper when said dampers are in edge to edge proximate closed positions, said material moving by gravity into the weigh-hopper when said dampers are moved from said positions, and filling the weigh-hopper including the portion thereof in advance of said edge to edge proximate position and above the level of the horizontal damper, trimming means operable horizontally in alignment with the space above the plane of movement of the horizontal damper to thereby trim material from the burden in the weigh-hopper forwardly of the vertical plane of movement of the vertical damper into the space above the horizontal damper, means to vacate a space in the material above the horizontal damper in alignment with the movement of said trimming means, a reversible motor, operating connections between said motor and said trimming means and said vacating means, and electrical connections to operate all said before named parts in sequence including said reversible power operated means for each damper, and including said reversible motor for said trimming means and said vacating means and also including connections between said movable weight responsive element and said reversible power operated means and said reversible motor to first move both dampers into open positions wherein they are moved with their edge portions away from said edge to edge proximate position, then to move the horizontal damper to its closed position, then to move the trimming and vacating means in harmony to trim material into the space above the so-called horizontal damper, then to move the vertical damper into closed position, and then to return both the trimming means and the vacating means to their initial positions.

3. In a weigher, the combination of a weigh-hopper, weighing means to support said hopper, including a movable weight responsive element, and a connection from the weigh hopper to said weight responsive element horizontal and vertical dampers mounted for horizontal and vertical movement to and from a position wherein their edge portions are in proximity to each other, being a closed position, means to support said dampers in such movement independently of the weigh-hopper, said position of proximity of said edge portions being behind the front wall of the weigh-hopper and above the floor of the weigh-hopper, reversible power operated means for each of said dampers, gravity means to supply material to the position above the horizontal damper and behind the vertical damper when said dampers are in closed position, said means being effective to ensure filling of the weigh-hopper to an elevation higher than the plane of the horizontal damper in the space in advance of the plane of the vertical damper, to thereby provide an overweight of material in the burden of the weigh-hopper, together with means operating horizontally to trim overweight material from said space in the front portion of the weigh-hopper into the space above the horizontal damper, a reversible motor, operating connections between said motor and said trimming means, and electrical connections to operate all said before named parts sequentially including said reversible power operated means for each damper and including said reversible motor for said trimming means, and also including connections between said movable weight responsive element and said reversible power operated means and said reversible motor to first move both the horizontal damper and the vertical damper to full opened positions away from the closed position aforesaid, then to close the horizontal damper, then to move the trimming means effectively to trim material from the space within the burden of the weigh-hopper and in advance of the plane of movement of the vertical damper to the space above the horizontal damper, and then to close the vertical damper and return the trimming means to its initial position.

4. In a weigher, the combination of a weigh-hopper, weighing means to support said hopper, including a movable weight responsive element, and a connection from the weigh hopper to said weight responsive element, horizontal and vertical dampers mounted for horizontal and vertical movements to and from a position wherein their edge portions are in proximity to each other, being a closed position, means to support said dampers in such movements independently of the weigh-hopper, said position of proximity of said edge portions being behind the front wall of the weigh-hopper and above the floor of the weigh-hopper, reversible power operated means for each of said dampers, gravity means to supply material to the position above the horizontal damper and behind the vertical damper when said dampers are in closed position, said means being effective to ensure filling of all portions of the weigh-hopper to an elevation higher than the plane of the horizontal damper, to thereby provide an overweight of material in the burden of the weigh-hopper, the horizontal damper moving through the body of the material supported by the weigh-hopper during its closing movement, to thereby segregate the material above the horizontal damper from the burden of material within the weigh-hopper beneath said horizontal damper, together with means to trim material horizontally from the space within the burden of the weigh-hopper above the level of the horizontal damper and ahead of the position of the vertical damper into the space above the horizontal damper and behind the position of the vertical damper, a reversible motor, operating connections between said motor and said trimming means, together with electrical connections to operate all said before named parts in sequence including said reversible power operated means for each damper, and including said reversible motor for said trimming means and also including connections between said movable weight responsive element and said reversible power operated means and said reversible motor, to first move both the horizontal and vertical dampers to open position, then to move the horizontal damper to closed position, then to actuate the trimming means, and then to move the vertical damper to closed position and return the trimming means to initial position.

5. Means as specified in claim 4 in which there is provided on the front portion of the horizontal damper a downwardly slanting edge portion constituting a volumetric trimming means, effective to volumetrically trim the body of material remaining in the weigh-hopper down to a pre-determined level during closing movement of the horizontal damper.

6. Means as specified in claim 4 in which there is provided on the front portion of the horizontal damper a downwardly slanting edge portion constituting a volumetric trimming means effective to volumetrically trim the body of material remaining in the weigh hopper down to a predetermined level during closing movement of the horizontal damper and in which said downwardly slanting portion is adjustable with respect to the body portion of the horizontal damper, effectively to adjust the level at which volumetric trimming is performed by said slanting edge portion during closing movement of the horizontal damper.

7. Means as specified in claim 4 in which there is provided on the front portion of the horizontal damper a downwardly slanting edge portion constituting a volumetric trimming means effective to volumetrically trim the body of material remaining in the weigh hopper down to a predetermined level during closing movement of the horizontal damper and in which there is provided means to restore said edge portion of the horizontal damper to planar registry with the body portion of said damper at conclusion of closing movement of said damper, effectively to ensure planar continuity of all portions of said horizontal damper at conclusion of damper closing movement.

8. Means as specified in claim 4 in which said weighing means and supporting means for the weigh-hopper includes means to suspend the weigh-hopper which suspension means are adjustable to thereby permit adjustment of the elevation of the weigh-hopper with respect to the plane of movement of the horizontal damper during closing movement of said damper to thereby adjust the volume of material sustained by the weigh hopper when the damper is closed.

9. Means as specified in claim 4 in which there is provided means to adjust the capacity of said weigh-hopper including an adjustable wall for said hopper adjustable horizontally to thereby adjust the volumetric contents of said hopper sustained by said hopper when the horizontal damper is closed.

10. A weigh hopper, a weigh beam counterbalancing said hopper, gravity feed means to supply material to said hopper, a damper movable horizontally part way across said hopper between the gravity feed means and the hopper, guides for said damper, whereby upon the closing of said damper it will shear a portion of the excess material fed to said hopper and support the same above the hopper while leaving in the hopper an excess volume, a reversible motor under control of said weigh beam for actuating the damper upon initial overcharging of said hopper, one or more pusher members disposed adjacent the leading edge of said damper when in closed position to push increments of the remaining excess material onto said damper, a motor to operate said pusher members, and means also under control of said weigh beam for controlling said last named motor.

11. A weigh hopper, a weigh beam counterbalancing said hopper, gravity feed means to supply material to said hopper, a damper having a pivoted downwardly inclined leading edge portion, said damper being movable horizontally part way across said hopper between the gravity feed means and the hopper, guides for said damper adapted to elevate said downwardly inclined portion upon approaching the end of its dampering movement, whereby upon the closing of said damper it will shear a portion of the excess material fed to said hopper and support the same above the hopper while leaving in the hopper an excess volume, a reversible motor under control of said weigh beam for actuating the damper upon initial overcharging of said hopper, one or more pusher members disposed adjacent the leading edge of said damper when in closed position to push increments of the remaining excess material onto said damper, a motor to operate said pusher members, and means also under control of said weigh beam for controlling said last named motor.

12. Means as specified in claim 10 in which the weigh-hopper is provided with an adjustable enclosure whereby said weigh-hopper may be adjusted as to volumetric capacity according to specific-weight of material supplied to the weigh-hopper.

13. Means as specified in claim 10 in which the weigh-hopper is provided with a wall movable horizontally with respect to the body of the weigh-hopper whereby the volumetric capacity of said hopper is adjustable, and said counterbalancing means for the weigh-hopper is adjustable to thereby adjust the height at which volumetric trimming is effected above the floor of the weigh-hopper.

14. A weigh hopper having a vertical front wall, a weigh beam counterbalancing said weigh hopper, a damper movable horizontally above and supported independently of said hopper, a reversible motor under control of said weigh beam for actuating said damper, a gravity supply means including a supply hopper to supply said weigh hopper with material, said supply hopper having a downwardly slanting back wall the angularity of which is greater than the angle of repose of the material in said supply hopper, said wall slanting towards said damper adjacent to the back of said weigh hopper effective to force material forwardly in said weigh hopper when said damper is in open position thereby to ensure substantial filling of the forward portion of said weigh hopper when said weigh beam effects the opening of said damper.

15. Means as specified in claim 14, wherein there is provided a vertically movable damper movable in a vertical plane located backwardly of the front wall of the weigh-hopper and to a closed position adjacent to the forwardly moved closed position of the horizontally movable damper to thereby provide, in conjunction with the horizontally movable damper when the latter is moved forwardly to its closed position, a right-angular partition between the supply-hopper and the weigh-hopper, said back wall serving to give a forward component of motion to down-moving material to carry said material into that portion of the weigh-hopper located forwardly of said vertically movable damper.

16. Means as specified in claim 14 in which there is provided trimming means acting in a horizontal plane of movement and above the plane of the horizontally movable damper, a reversible motor in connection with said trimming means, means in connection with said reversible motor and the weigh-beam to control motor operation for operation of the trimming means, to weigh-trim material from the forward portion of the weigh-hopper backwardly onto the closed horizontally movable damper, the back wall slant ensuring delivery of material from the supply-hopper into the forward portion of the weigh-hopper in position for trimming action by said weigh-trimmer.

17. Means as specified in claim 14, together with a partition in the upper portion of the supply-hopper and extending transversely thereof above the central portion of said hopper, said partition having its lower portion slanting downwardly and backwardly towards the back wall of the supply-hopper at an angle of descent greater than the angle of repose of material to be handled by said weigher, whereby material supplied into the upper portion of the supply-hopper at a position between the back of said hopper and said partition is burdened on the back wall of the supply-hopper and said downwardly slanting portion of said partition, to thereby reduce shock of introduction of material into the supply-hopper when the horizontally movable damper is moved to its open position.

18. Means as specified in claim 14, together with a partition in the upper portion of the supply hopper and extending transversely thereof above the central portion of said hopper, said partition having its lower portion slanting downwardly and backwardly towards the back wall of the supply hopper at an angle of descent greater than the angle of repose of material to be handled by said weigher, whereby material supplied into the upper portion of the supply hopper at a position between the back of said hopper and said partition is burdened on the back wall of the supply hopper and said downwardly slanting portion of said partition to thereby reduce shock of introduction of material into the weigh-hopper when the horizontally movable damper is moved to its open position, and in which said partition is adjustable forwardly and backwardly in the supply-hopper and with respect to the back wall of said hopper.

19. Means as specified in claim 14, together with a partition in the upper portion of the supply-hopper and extending transversely thereof above the central portion of said hopper, said partition having its lower portion slanting downwardly and backwardly towards the back wall of the supply-hopper at an angle of descent greater than the angle of repose of material to be handled by said weigher, whereby material supplied into the upper portion of the supply-hopper at a position between the back of said hopper and said partition is burdened on the back wall of the supply hopper and said downwardly slanting portion of said partition to thereby reduce shock of introduction of material into the weigh-hopper when the horizontally movable damper is moved to its open position, and in which the width of said partition is adjustable to thereby permit provision of side clearances between the side edges of said partition and the side walls of the supply-hopper.

20. A weigh hopper having a vertical front wall, a weigh beam counterbalancing said weigh hopper, a damper movable horizontally above and supported independently of said hopper, a reversible motor under control of said weigh beam for actuating said damper, a gravity supply means including a supply hopper to supply said weigh hopper with material, said supply hopper having a downwardly slanting back wall the angularity of which is greater than the angle of repose of the material in said supply hopper, said wall slanting towards said damper adjacent to the back of said weigh hopper, and reaching to a lower elevation than the front wall of said weigh hopper effective to force material forwardly in said weigh hopper when said damper is in open position thereby to ensure substantial filling of the forward portion of said weigh hopper when said weigh beam effects the opening of said damper.

21. A weigh hopper, a weigh beam counterbalancing said hopper through intermediate connections, means to supply material to said hopper, a damper positioned above and supported independently of said hopper, and movable to a closed position to discontinue the supply of material to the hopper when said weigh beam moves to an over-weight position, means under control of the weigh beam for operating said damper, and trimming means comprising a movable trimming block movable when said overweight is reached, over an edge portion of the weigh hopper to push excess material onto said damper.

22. Means as specified in claim 21 wherein said trimming means comprises a series of trimming blocks movable independently of each other in parallel relationship, said trimming means being so formed as to effect trimming movement of said blocks sequentially.

23. Means as specified in claim 21 wherein said trimming means comprises a series of trimming blocks movable independently of each other in parallel relationship, and wherein said trimming means is so constituted that the trimming blocks are moved in overlapping timed relationship, to thereby provide a variable rate of trimming action by said blocks.

24. Means as specified in claim 21 wherein said trimming means comprises a series of trimming blocks movable independently of each other in parallel relationship, and wherein said trimming means is so constituted that the trimming blocks are moved one at a time, the blocks being of different widths to thereby effect a variable rate of trimming.

25. In a weigher, the combination of a weigh-hopper, weighing means to support the same, a supply-hopper for material to be supplied to said weigh-hopper, means to support said supply-hopper above the rear portion of the weigh-hopper for gravity delivery of such material into the weigh-hopper, a horizontally movable damper between the supply-hopper and the weigh-hopper, means to support said damper independently of the weigh-hopper to permit horizontal damper movement of the damper to a closed position rearward of the front closure of the weigh-hopper, means to effect such damper movement, trimming means in conjunction with the above mentioned elements and movable rearwardly over the front portion of the weigh-hopper in alignment with the space above the horizontal damper, power means to move said trimming means, means to supply power to said power means when the weighing means moves to overweight position, pilot material-moving means in conjunction with said parts and movable transversely horizontally above the front portion of the damper when said damper is in closed position, means to move said pilot means conjointly with the movement of the trimming means, there being a compartment of the supply-hopper above the location of movement of the pilot means, the lower portion of said compartment being in communication with the path of movement of the pilot material moving means together with means to lower the air pressure within said compartment during trimming action and during movement of said pilot.

26. In a weigher, the combination of a weigh-hopper, weighing means to support the same, including a movable weight responsive element, and a connection from the weigh-hopper to said weight responsive element a supply-hopper above said weigh-hopper and positioned to deliver material into the weigh-hopper by gravity, horizontally and vertically movable dampers in conjunction with the above mentioned elements and located in a horizontal plane between the weigh-hopper and the supply-hopper and in the vertical plane of the forward wall of the supply-hopper respectively to control communication between said hoppers, said dampers being movable to a closed position in which their proximate edge portions come substantially together at a position above the forward portion of the weigh-hopper, and being movable horizontally back from, and vertically up from, said position, respectively, for opening purposes means to support said dampers independently of the weigh-hopper, a horizontally movable weigh-trimmer movable across the upper forward portion of the weigh-hopper in alignment with the space above the horizontally movable damper effectively to weigh-trim material from the burden of the weigh-hopper backwardly onto the horizontally movable damper, when said damper is in closed position, reversible motors for said dampers, a reversible motor for said weigh-trimmer, means to supply currents to said motors to move both said dampers to full open position, and means under control of the movable weight-responsive element to thereafter supply current to said horizontlly movable damper motor then to move the horizontally movable damper to full closed position, and means under control of the movable weight-responsive element to supply current to the trimmer motor to move the weigh-trimmer in trimming direction, and means under control of the movable weight-responsive element to thereafter supply current to the vertically movable damper motor for closure of said damper and to supply current to the trimmer motor for return of the trimmer to its initial position.

27. Means as specified in claim 26 in which there is also provided means to effect lowering of air pressure in the space directly above the position of delivery of material from the supply-hopper into the weigh-hopper.

ALFRED SOWDEN.

REFERENCES CITED

The following references are of record in the file of this patent:

UNITED STATES PATENTS

| Number | Name | Date |
|---|---|---|
| 250,159 | Mills | Nov. 29, 1881 |
| 600,034 | Richards | Mar. 1, 1898 |
| 615,196 | Richards | Nov. 29, 1898 |
| 869,335 | Staude | Oct. 29, 1907 |
| 890,190 | Stephens | June 9, 1908 |
| 934,849 | Sonander | Sept. 21, 1909 |
| 1,048,446 | Curry | Dec. 24, 1912 |
| 1,189,416 | Zanone | July 4, 1916 |
| 1,663,574 | Venable | Mar. 27, 1928 |
| 1,833,775 | Davitt | Nov. 24, 1931 |
| 2,058,775 | Cundall | Oct. 27, 1936 |
| 2,141,296 | Ferguson | Dec. 27, 1938 |
| 2,269,432 | Beck et al. | Jan. 13, 1942 |